United States Patent
Hanzawa

(10) Patent No.: US 10,873,715 B2
(45) Date of Patent: Dec. 22, 2020

(54) SOLID-STATE IMAGE SENSOR, IMAGING DEVICE, AND METHOD OF CONTROLLING SOLID-STATE IMAGE SENSOR

(71) Applicant: SONY SEMICONDUCTOR SOLUTIONS CORPORATION, Kanagawa (JP)

(72) Inventor: Katsuhiko Hanzawa, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 17 days.

(21) Appl. No.: 16/312,675

(22) PCT Filed: May 10, 2017

(86) PCT No.: PCT/JP2017/017705
§ 371 (c)(1),
(2) Date: Dec. 21, 2018

(87) PCT Pub. No.: WO2018/003305
PCT Pub. Date: Jan. 4, 2018

(65) Prior Publication Data
US 2020/0036930 A1    Jan. 30, 2020

(30) Foreign Application Priority Data
Jul. 1, 2016 (JP) ................. 2016-131851

(51) Int. Cl.
*H04N 5/3745* (2011.01)
*H04N 5/376* (2011.01)
*H04N 5/372* (2011.01)

(52) U.S. Cl.
CPC ......... *H04N 5/37452* (2013.01); *H04N 5/376* (2013.01); *H04N 5/372* (2013.01)

(58) Field of Classification Search
CPC .... H04N 5/37452; H04N 5/376; H04N 5/372; H04N 5/374; H04N 5/3745; H04N 5/347
See application file for complete search history.

(56) References Cited

U.S. PATENT DOCUMENTS 6,567,571 B1 * 5/2003 Kochi .................. H04N 5/335
                                                            250/201.8
9,030,589 B2   5/2015 Sasaki et al.
(Continued)

FOREIGN PATENT DOCUMENTS

| CN | 102821255 A | 12/2012 |
| CN | 106464819 A | 2/2017 |

(Continued)

OTHER PUBLICATIONS

International Search Report and Written Opinion of PCT Application No. PCT/JP2017/017705, dated Aug. 15, 2017, 13 pages of ISRWO.

*Primary Examiner* — Lin Ye
*Assistant Examiner* — Tuan H Le
(74) *Attorney, Agent, or Firm* — Chip Law Group

(57) ABSTRACT

A resolution at the time of addition of pixels is changed in a solid-state image sensor performing pixel addition. In an array unit, a predetermined number of charge storage units that store charges generated through photoelectric conversion are arrayed in a 2-dimensional lattice form. A connection line is wired for each set of the charge storage units arrayed in a predetermined direction. A connection path opening and closing unit opens and closes a path between each of the charge storage units and the connection line corresponding to the charge storage unit. An inter-line path opening and closing unit opens and closes a path between the connection lines. A scanning circuit controls the connection transistor and the inter-line path opening and closing (Continued)

unit so that the amounts of charges of the charge storage units are caused to be added.

14 Claims, 39 Drawing Sheets

(56) References Cited

U.S. PATENT DOCUMENTS

| | | | |
|---|---|---|---|
| 2010/0231774 A1* | 9/2010 | Tashiro | G01S 17/10 |
| | | | 348/311 |
| 2012/0312964 A1 | 12/2012 | Yamashita et al. | |
| 2013/0068929 A1* | 3/2013 | Solhusvik | H01L 27/14634 |
| | | | 250/208.1 |
| 2014/0022427 A1* | 1/2014 | Goto | H04N 5/2355 |
| | | | 348/296 |
| 2014/0263964 A1* | 9/2014 | Yang | H04N 5/347 |
| | | | 250/208.1 |
| 2015/0116538 A1* | 4/2015 | Terauchi | H04N 5/355 |
| | | | 348/229.1 |
| 2017/0117329 A1* | 4/2017 | Maruyama | H01L 27/307 |

FOREIGN PATENT DOCUMENTS

| | | |
|---|---|---|
| JP | 2009-033316 A | 2/2009 |
| JP | 2010-093653 A | 4/2010 |
| JP | 2012-257028 A | 12/2012 |
| JP | 2013-041890 A | 2/2013 |
| JP | 2015-182390 A | 10/2015 |
| KR | 10-2017-0008732 A | 1/2017 |
| WO | 2013/022111 A1 | 2/2013 |
| WO | 2015/182390 A1 | 12/2015 |

\* cited by examiner

SOLID-STATE IMAGE SENSOR, IMAGING DEVICE, AND METHOD OF CONTROLLING SOLID-STATE IMAGE SENSOR

CROSS REFERENCE TO RELATED APPLICATIONS

This application is a U.S. National Phase of International Patent Application No. PCT/JP2017/017705 filed on May 10, 2017, which claims priority benefit of Japanese Patent Application No. JP 2016-131851 filed in the Japan Patent Office on Jul. 1, 2016. Each of the above-referenced applications is hereby incorporated herein by reference in its entirety.

TECHNICAL FIELD

The present technology relates to a solid-state image sensor, an imaging device, and a method of controlling the solid-state image sensor. Particularly, the present technology relates to a solid-state image sensor, an imaging device, and a method of controlling the solid-state image sensor performing pixel addition.

BACKGROUND ART

In the related art, imaging devices with illumination detection functions or motion detection functions of detecting motions of subjects were used to perform imaging under various imaging conditions. At the time of such motion detection or illumination detection, a higher signal to noise (SN) ratio, lower consumption power, and a wider dynamic range are requested than in a case in which imaging is performed for other purposes, but a high resolution or a high frame rate are not requested.

Accordingly, at the time of motion detection or illumination detection, processes of adding a plurality of pixel signals and decreasing resolutions are performed in many cases. For example, a solid-state image sensor in which 4 pixels in 2 rows×2 columns share one floating diffusion layer and pixel signals of the 4 pixels are subjected to analog addition was proposed (for example, see Patent Literature 1). In the pixel addition, power consumption can be reduced and a frame rate can be increased as a resolution of image data is decreased, but precision such as motion detection deteriorates. Therefore, in view of improving convenience, it is preferable to be able to change the resolution of the image data at the time of pixel addition to various values in consideration of power consumption or precision or the like of detection or the like such as motion detection.

CITATION LIST

Patent Literature

Patent Literature 1: JP 2010-93653A

DISCLOSURE OF INVENTION

Technical Problem

In the above-described technology of the related art, image data with a quarter of the resolution of a case in which pixel addition is not performed can be captured by pixel addition of a pixel block unit of 2 rows×2 columns. However, it is difficult to change a resolution at the time of the pixel addition. That is, this is because the resolution may not be decreased by further adding the added pixel signals in the plurality of pixel blocks without connecting floating diffusion layers in mutually different pixel blocks in the above-described solid-state image sensor. Performing AD conversion on signals obtained by performing analog addition on the pixel signals and further digital addition can be considered in order to decrease a resolution, but there is concern of the digital addition increasing power consumption compared to the analog addition and thus it not preferable to perform the digital addition. In this way, there is the problem that it is difficult to change the resolution in the above-described solid-state image sensor.

The present technology is devised in view of the foregoing circumstances and an object of the present technology is to change a resolution at the time of pixel addition in a solid-state image sensor performing pixel addition.

Solution to Problem

The present technology is made in order to solve the above problem. A first aspect of the present technology is a solid-state image sensor and a control method thereof, the solid-state image sensor including: an array unit in which a predetermined number of charge storage units that store charges generated through photoelectric conversion are arrayed in a 2-dimensional lattice form; a connection line wired for each set of the charge storage units arrayed in a predetermined direction; a connection path opening and closing unit configured to open and close a path between each of the charge storage units and the connection line corresponding to the charge storage unit; an inter-line path opening and closing unit configured to open and close a path between the connection lines; and a scanning circuit configured to control the connection path opening and closing unit and the inter-line path opening and closing unit so that amounts of the charges of the charge storage units of an addition target are caused to be added. Thus, it is possible to obtain an operational effect of adding the amounts of charges of the charge storage units of the addition target.

In addition, in the first aspect, the charge storage unit may be a floating diffusion layer. Thus, it is possible to obtain an operational effect of adding the amounts of charges of the floating diffusion layers of the addition target.

In addition, in the first aspect, the connection path opening and closing unit may include, for each charge storage unit, a reset transistor configured to open and close the unit and the connection line corresponding to the charge storage unit. Thus, it is possible to obtain an operational effect of individually opening and closing the path between the charge storage unit and the connection line.

In addition, in the first aspect, a reset transistor configured to initialize the charge storage unit for each charge storage unit may be further included. Thus, it is possible to obtain an operational effect of initializing the charge storage unit.

In addition, in the first aspect, a power path opening and closing unit configured to open and close a path between a power supply and the connection line may be further included. Thus, it is possible to obtain an operational effect of extracting the charges of the charge storage unit to the power supply.

In addition, in the first aspect, in the array unit, a plurality of pixels may be arrayed in a 2-dimensional lattice form, and the plurality of adjacent pixels may share the floating diffusion layer. Thus, it is possible to obtain an operational effect of adding the amount of charges of the floating diffusion layer shared by the plurality of pixels.

In addition, in the first aspect, the charge storage unit may be a photoelectric conversion element. Thus, it is possible to obtain an operational effect of adding the amount of charges of each of the photoelectric conversion elements of the addition target.

In addition, in the first aspect, a signal line wired for each set; and a selection unit configured to open and close a path between each of the charge storage units and the signal line corresponding to the charge storage unit may be further included. Thus, it is possible to obtain an operational effect of outputting the added signal from the signal line.

In addition, in the first aspect, a signal path opening and closing unit configured to open and close a path between the mutually adjacent signal lines and the connection line may be further included. Thus, it is possible to obtain an operational effect of reading the added signal without amplifying it.

In addition, in the first aspect, a signal processing unit configured to perform predetermined signal processing on an analog signal output from each of the signal lines may be further included. Thus, it is possible to obtain an operational effect of performing the signal processing on the analog signal.

In addition, in the first aspect, a predetermined number of the connection lines may be wired for each set, the array unit may be partitioned into a plurality of addition units, the predetermined number of addition units adjacent in the predetermined direction may be connected to mutually different connection lines and the predetermined number of signal lines wired in the predetermined direction, and the scanning circuit may cause the predetermined number of addition units adjacent in the predetermined direction to output pixel signals from mutually different signal lines. Thus, it is possible to obtain an operational effect of simultaneously reading the signals from the predetermined number of addition units.

In addition, in the first aspect, the array unit and the connection transistor may be disposed in a predetermined semiconductor substrate, and the inter-line path opening and closing unit may be disposed in a semiconductor substrate stacked on the predetermined semiconductor substrate. Thus, it is possible to obtain an operational effect of adding the amounts of charges of the mutually adjacent storage accumulation units in the stacked semiconductor substrate.

In addition, a second aspect of the present technology is an imaging device including: an array unit in which a predetermined number of charge storage units that store charges generated through photoelectric conversion are arrayed in a 2-dimensional lattice form; a connection line wired for each set of the charge storage units arrayed in a predetermined direction; a connection path opening and closing unit configured to open and close a path between each of the charge storage units and the connection line corresponding to the charge storage unit; an inter-line path opening and closing unit configured to open and close a path between the connection lines; a scanning circuit configured to control the connection path opening and closing unit and the inter-line path opening and closing unit so that amounts of the charges of the charge storage units of an addition target are caused to be added; and a recording unit configured to record image data including pixel signals in accordance with the amounts of the charges. Thus, it is possible to obtain an operational effect of adding the amounts of charges of the charge storage units of the addition target and recording the image data.

Advantageous Effects of Invention

According to the present technology, it is possible to obtain an excellent advantageous effect of enabling a resolution to be changed at the time of pixel addition in a solid-state image sensor performing pixel addition. Note that the effects to be described herein are not necessarily limitative and may refer to any one of the effects to be described in this specification.

MODE(S) FOR CARRYING OUT THE INVENTION

Hereinafter, modes for carrying out the present technology (hereinafter referred to as embodiments) will be described. The description will be made in the following order.
1. First Embodiment (Example in Which Addition Unit Is Changed through Control of Switch)
2. Second Embodiment (Example in Which Addition Unit Is Changed through Control of Switch and Amplification Transistor Is Bypassed)
3. Third Embodiment (Example in Which Addition Unit Is Changed through Control of Switch and Plurality of Block Rows Are Simultaneously Read)
4. Fourth Embodiment (Example in Which Addition Unit Is Changed through Control of Switch in Stacked Solid-state Image Sensor)
5. Fifth Embodiment (Example in Which Plurality of Pixels Share Floating Diffusion Layer and Addition Unit Is Changed through Control of Switch)

1. First Embodiment

[Configuration Example of Imaging Device]

Figure 1:
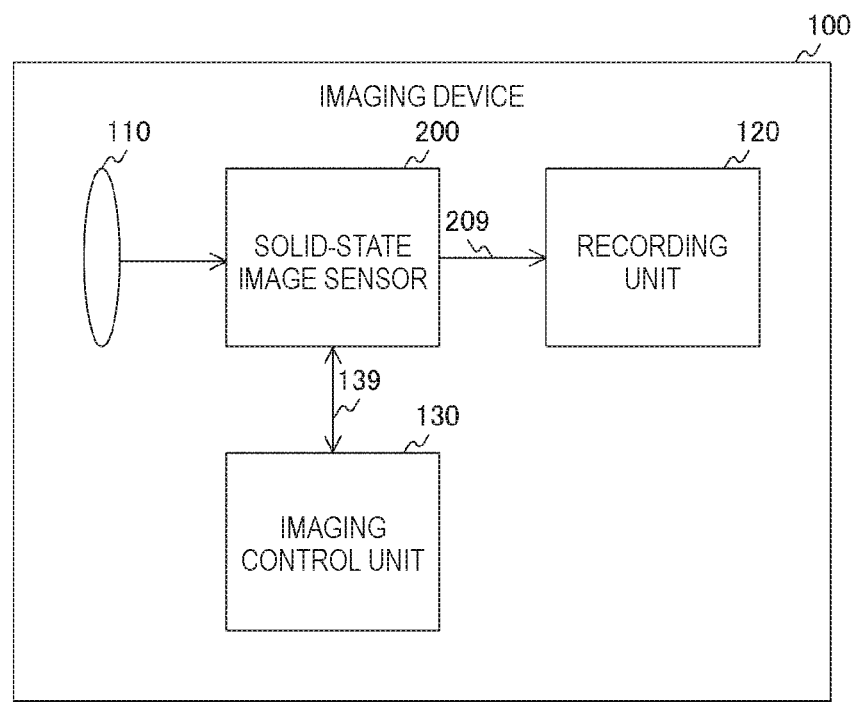
FIG. 1 is a block diagram illustrating a configuration example of an imaging device according to a first embodiment of the present technology.

FIG. 1 is a block diagram illustrating a configuration example of an imaging device 100 according to a first embodiment. The imaging device 100 is a device that captures image data and includes an imaging lens 110, a solid-state image sensor 200, a recording unit 120, and an imaging control unit 130. An action cam, an in-vehicle camera, or the like is assumed as the imaging device 100.

The imaging lens 110 condenses light and guides the light to the solid-state image sensor 200. The solid-state image sensor 200 generates image data under the control of the imaging control unit 130. The solid-state image sensor 200 supplies the generated image data to the recording unit 120 via a signal line 209. The recording unit 120 records the image data.

The imaging control unit 130 controls the entire imaging device 100. The imaging control unit 130 supplies a vertical synchronization signal or the like indicating an imaging timing to the solid-state image sensor 200 via the signal line 139.

Note that the imaging lens 110, the solid-state image sensor 200, the recording unit 120, and the imaging control unit 130 are disposed in the same device, but these units can also be distributed and disposed in a plurality of devices. For example, the imaging lens 110 may be disposed in a lens unit and the solid-state image sensor 200 and the like may be disposed in the imaging device 100.

[Configuration Example of Solid-State Image Sensor]

Figure 2:
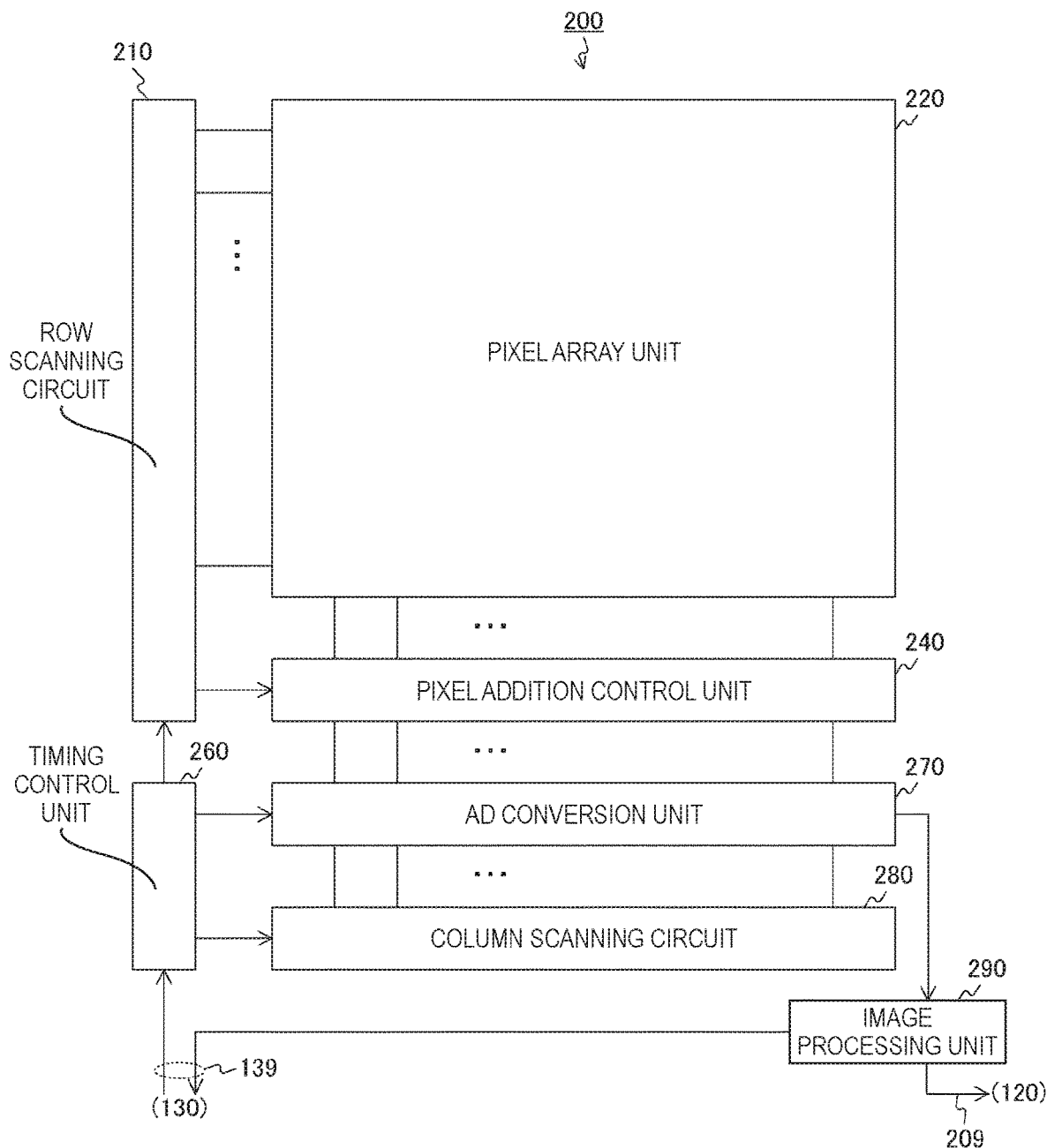
FIG. 2 is a block diagram illustrating a configuration example of a solid-state image sensor according to the first embodiment of the present technology.

FIG. 2 is a block diagram illustrating a configuration example of the solid-state image sensor 200 according to the first embodiment. The solid-state image sensor 200 includes a row scanning circuit 210, a pixel array unit 220, a pixel addition control unit 240, a timing control unit 260, an AD conversion unit 270, a column scanning circuit 280, and an image processing unit 290. In addition, each of the circuits in the solid-state image sensor 200 is provided on a single semiconductor substrate.

In addition, in the pixel array unit 220, a plurality of pixel circuits are provided in a 2-dimensional lattice form. Hereinafter, a set of the pixel circuits arrayed in a predetermined direction (the horizontal direction or the like) is referred to as a "row" and a set of the pixel circuits arrayed in a direction perpendicular to the rows is referred to as a "column." Note that the pixel array unit 220 is an example of an array unit described in the claims.

The row scanning circuit 210 drives the pixel circuits to cause pixel signals to be output. In addition, the row scanning circuit 210 controls the pixel addition control unit 240 and the pixel array unit 220 so that the pixel signals of a plurality of adjacent pixels are caused to be added as necessary. Then, the pixel addition control unit 240 outputs the pixel signals to the AD conversion unit 270. Note that the row scanning circuit 210 is an example of a scanning circuit described in the claims.

The timing control unit 260 controls a timing at which each of the row scanning circuit 210, the AD conversion unit 270, and the column scanning circuit 280 operates. The AD conversion unit 270 performs AD conversion on the pixel signals to generate pixel data. The column scanning circuit 280 controls the AD conversion unit 270 so that the pixel data is caused to be transmitted to the image processing unit 290.

The image processing unit 290 performs various kinds of image processing on the image data formed by the pixel data. In the image processing, for example, a demosaic process, a white balance process, or the like is performed. The image data after the image processing is transmitted to the recording unit 120. In addition, in a case in which the pixel addition is performed, a motion detection process or an illumination detection process is performed. In the motion detection process, presence or absence of a motion of a subject in an image, a motion vector, or the like is detected in accordance with an inter-frame difference method, a background difference method, or the like.

A detection result of a motion or illumination is transmitted to the imaging control unit 130. The detection result of the motion is used in various applications such as an application that changes a frame rate in a case in which there is a motion. In addition, the detection result of the illumination is used in control of an exposure amount or the like.

Note that the image processing unit 290 is disposed inside the solid-state image sensor 200, but the image processing unit 290 may be disposed outside of the solid-state image sensor 200.

[Configuration Example of Pixel Array Unit]

Figure 3:
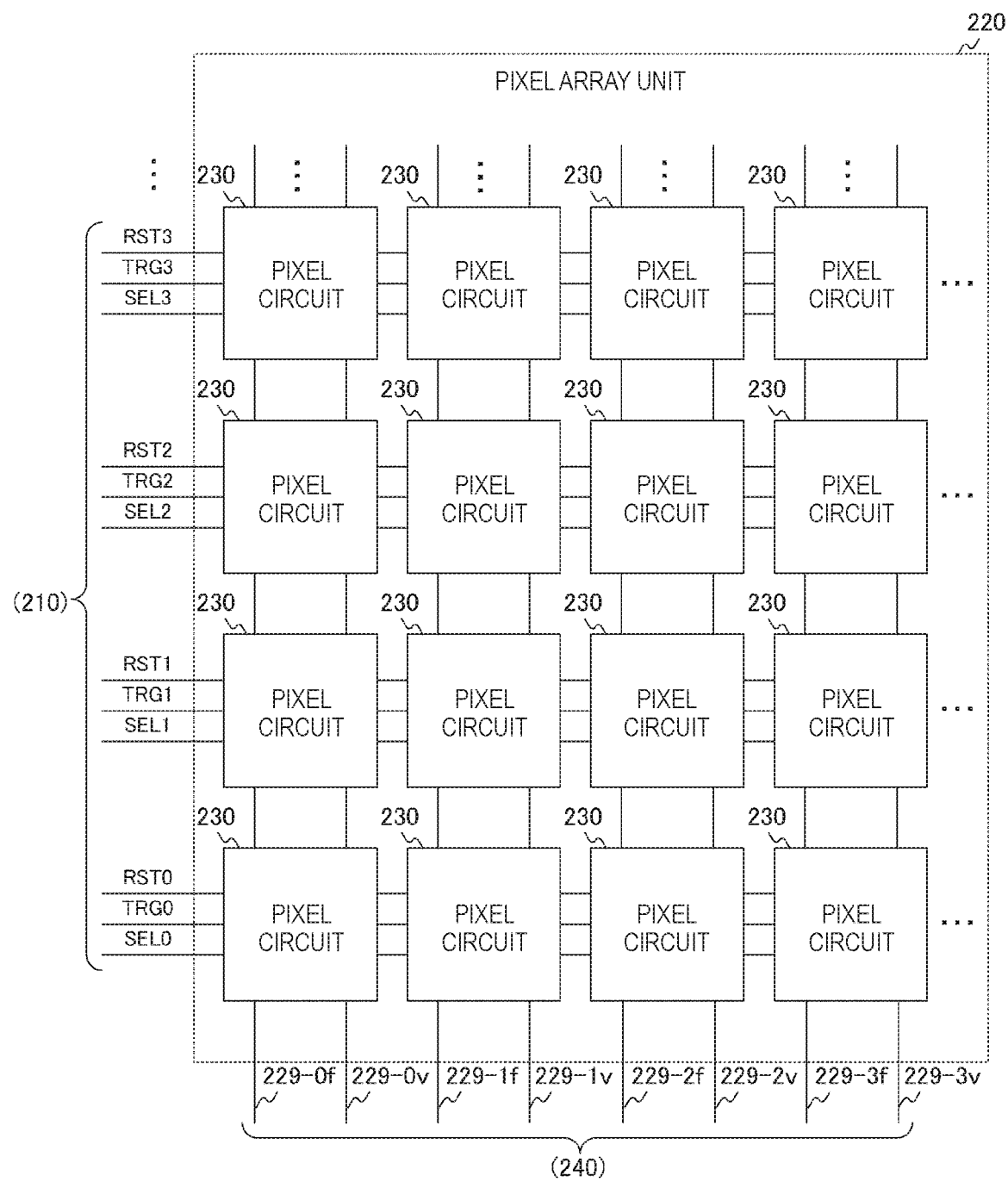
FIG. 3 is a block diagram illustrating a configuration example of a pixel array unit according to the first embodiment of the present technology.

FIG. 3 is a block diagram illustrating a configuration example of the pixel array unit 220 according to the first embodiment of the present technology. In the pixel array unit 220, the plurality of pixel circuits 230 are arrayed in the 2-dimensional lattice form. In the pixel array unit 220, the number of rows is assumed to be N (where N is an integer equal to or greater than 2) and the number of columns is assumed to be M (where M is an integer equal to or greater than 2).

In addition, three horizontal signal lines are wired for each row in the horizontal direction, and one connection line 229-$mf$ and one vertical signal line 229-$mv$ (where m is an integer of 0 to M−1) are wired for each column in the vertical direction. Of the three horizontal signal lines corresponding to a row, one line is a reset line along which a reset signal RSTn (where n is an integer of 0 to N−1) is transmitted, another line is a transmission line along which a transmission signal TRGn is transmitted, and the remaining one is a selection line along which a selection signal SELn is transmitted. The reset signal RSTn, the transmission signal TRGn, and the selection signal SELn are generated by the row scanning circuit 210 and are output to an n-th column.

Figure 4:
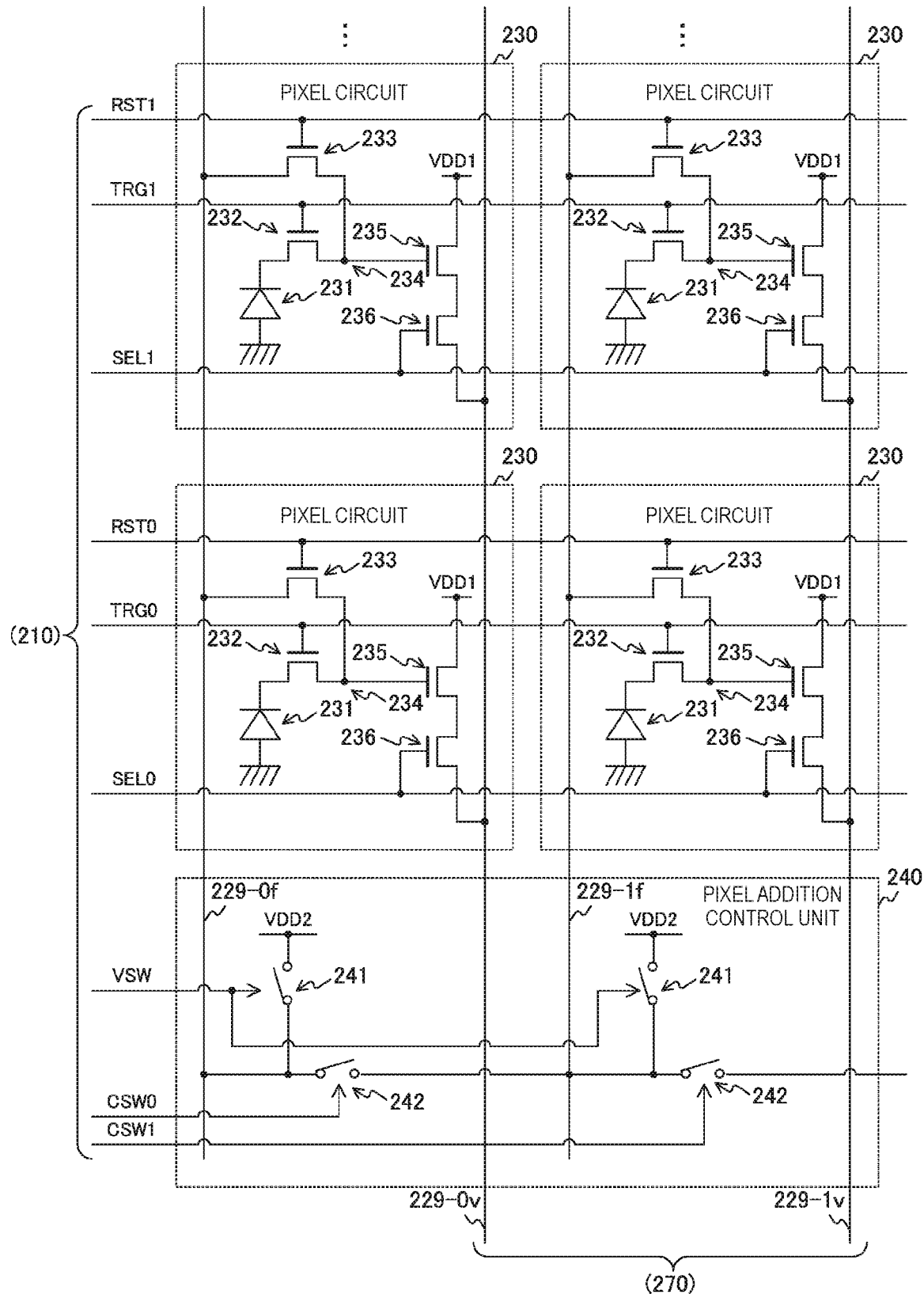
FIG. 4 is a circuit diagram illustrating a configuration example of a pixel circuit and a pixel addition control unit according to the first embodiment of the present technology.

FIG. 4 is a circuit diagram illustrating a configuration example of the pixel circuit 230 and the pixel addition control unit 240 according to the first embodiment. The pixel circuit 230 includes a photoelectric conversion element 231, a transmission transistor 232, a reset transistor 233, a floating diffusion layer 234, an amplification transistor 235, and a selection transistor 236. As the transmission transistor 232, the reset transistor 233, the amplification transistor 235, and the selection transistor 236, for example, N-type metal oxide semiconductor (MOS) transistors are used.

The photoelectric conversion element 231 photoelectrically converts incident light to generate charges. The transmission transistor 232 transmits the charges from the photoelectric conversion element 231 to the floating diffusion layer 234 in accordance with the transmission signal TRGn for instructing to transmit the charges.

The reset transistor 233 opens and closes a path between the corresponding connection line 229-$mf$ and floating diffusion layer 234 in accordance with the reset signal RSTn for instructing to initialize the floating diffusion layer 234. Note that the reset transistor 233 is an example of a connection path opening and closing unit described in the claims.

The floating diffusion layer 234 stores the charges to generate a voltage in accordance with the amount of stored charges. Note that the floating diffusion layer 234 is an example of a charge storage unit described in the claims.

The amplification transistor 235 amplifies the voltage of the floating diffusion layer 234. The selection transistor 236 opens and closes a path between the corresponding vertical signal line 229-$mv$ and amplification transistor 235 in accordance with the selection signal SELn for selecting the n-th row. Note that the selection transistor 236 is an example of a selection unit described in the claims.

In addition, the pixel addition control unit 240 includes switches 241 and 242 for each column. A switch 242 in an m-th column is disposed between a connection line 229-$mf$ and a connection line 229-$(m+1)f$.

The switch 241 opens and closes a path between a power supply and the connection line 229-$mv$ of a corresponding column in accordance with a power switch signal VSW. The power switch signal VSW is a signal for instructing whether or not to initialize the amount of charges of the floating diffusion layer 234 and is generated by the row scanning circuit 210. The switch 241 is controlled to a closed state in the case of initialization and is controlled to an open state in the case of non-initialization. Note that the switch 241 is an example of an inter-line path connection unit described in the claims.

The switch 242 opens and closes a path between the connection line 229-$mv$ of the corresponding column and the connection line 229-$(m+1)v$ adjacent to this correction line in accordance with a column switch signal CSWm. The column switch signal CSWm is a signal for instructing whether or not to add a pixel signal of the m-th column and a pixel signal of the (m+1)-th column and is generated by the row scanning circuit 210. In a case in which the pixel signals of the m-th column and the (m+1)-th column are added, the switch 242 between these rows is controlled to a closed state. In a case in which the pixel signals of these columns are not added, the switch 242 between these rows is controlled to an open state. Note that the switch 242 is an example of a power supply path connection unit described in the claims.

In the above-described configuration, the row scanning circuit 210 can add the pixel signals in any pixel block formed by a plurality of adjacent pixels. The row scanning circuit 210 controls the reset signals RSTn corresponding to rows of an addition target to a high level so that the floating diffusion layers 234 in the rows are caused to be connected to the connection line 229-*mf*. In addition, the row scanning circuit 210 controls the column switch signals CSWm corresponding to the columns of an addition target to a high level so that the connection lines 229-*mv* of the columns are caused to be mutually connected.

Through such control, all the floating diffusion layers 234 of the pixels in the pixel block are connected via the connection line 229-*mf* and the amounts of charges of the floating diffusion layers 234 are added and averaged. In addition, the row scanning circuit 210 controls the selection signals SELn of a row to which the pixels in the pixel block belong to a high level so that the added pixel signals are caused to be output.

In addition, the row scanning circuit 210 controls the power switch signal VSW to a high level and controls the reset signal RSTn corresponding to the pixel block to a high level at the time of exposure start. Through the control, the amounts of charges of the floating diffusion layers 234 in the pixel block are initialized.

Note that the floating diffusion layer 234 is disposed for each pixel. As will be described below, the floating diffusion layer 234 may be configured to be shared by a plurality of pixels. In addition, the solid-state image sensor 200 may add pixel signals of pixels detecting a phase difference, pixels with different areas, pixels in which layers with different transmittance are provided, and the like.

[Configuration Example of Pixel Addition Control Unit]

Figure 5:
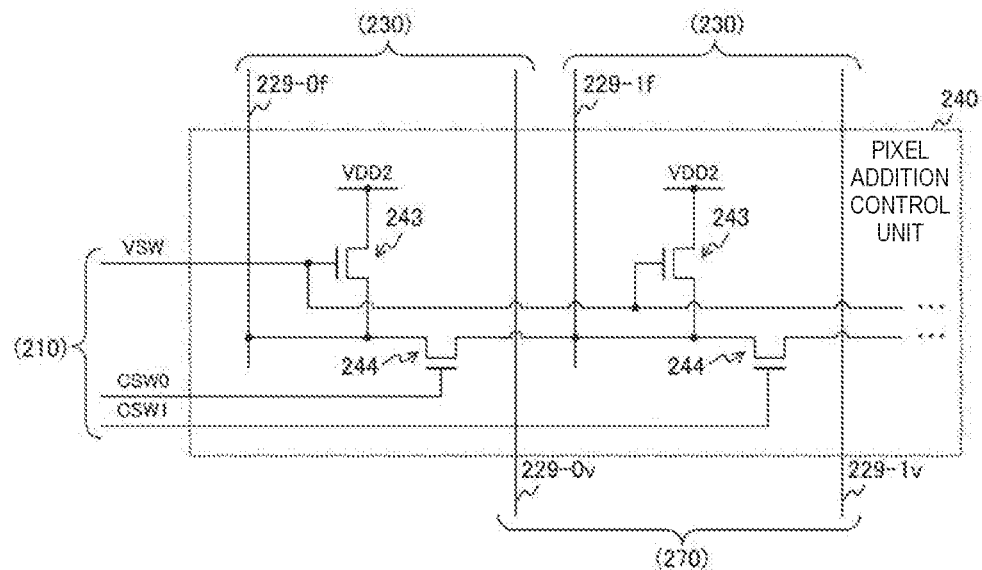
FIG. 5 is a circuit diagram illustrating a configuration example of the pixel addition control unit according to the first embodiment of the present technology.

FIG. 5 is a circuit diagram illustrating a configuration example of the pixel addition control unit 240 according to the first embodiment. For example, N-type MOS transistors 243 and 244 are used as the switches 241 and 242.

Note that P-type MOS transistors may be used instead of N-type MOS transistors. In a case in which the P-type MOS transistors are used, a high level and a low level in the power switch signal VSW and the column switch signal CSWm may be reversed. In addition, N-type transistors and P-type transistors may be combined. For example, some of the plurality of switches 241 may be set as N-type transistors and the remaining switches may be set as P-type transistors. The same applies to the switches 242. In a case in which N-type transistors and P-type transistors are combined, two kinds of signals with different polarity may be prepared for the N-type transistors and the P-type transistors with regard to the power switch signal VSW or the like. Alternatively, all the switches 241 may be set as N-type transistors and all the switches 242 may be set as P-type transistors.

Figure 6:
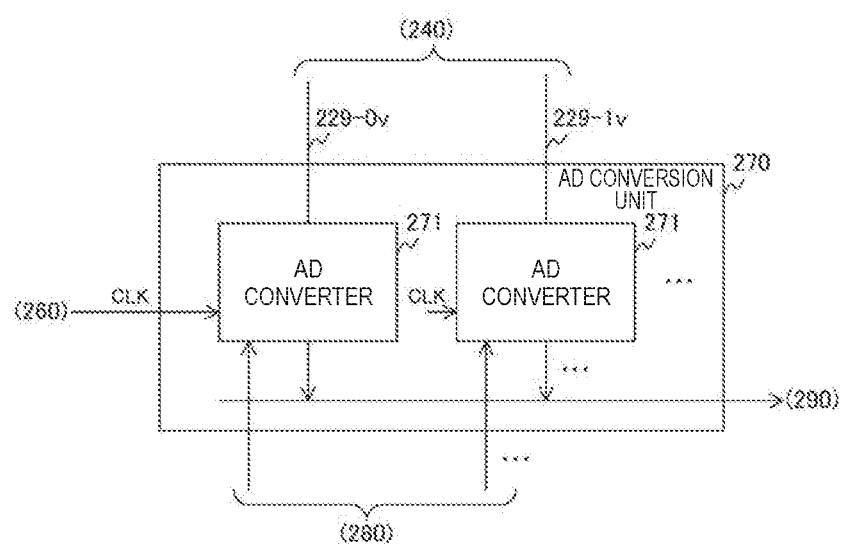
FIG. 6 is a block diagram illustrating one configuration example of an AD conversion unit according to the first embodiment of the present technology.

FIG. 6 is a block diagram illustrating one configuration example of the AD conversion unit 270 according to the first embodiment. In the AD conversion unit 270, an AD converter 271 is provided for each column. The AD converter 271 in an m-th column is connected to the vertical signal line 229-*mv*. The AD converter 271 converts an analog pixel signal from the vertical signal 229-*mv* into digital pixel data in synchronization with a clock signal CLK from the timing control unit 260. In the AD conversion, for example, one of a single slope type, a sequential comparison AD conversion type, and a delta sigma type is used. The AD conversion type is not limited to these types and another type may be used. Then, the AD converter 271 transmits the pixel data to the image processing unit 290 under the control of the column scanning circuit 280.

Note that the AD converter 271 performs only the AD conversion, but the present technology is not limited to the AD conversion and another process may be performed in the case of signal processing. For example, the AD converter 271 may further perform a correlated double sampling (CDS) process. Note that the AD conversion unit 270 is an example of a signal processing unit described in the claims.

In addition, the AD converter 271 is provided for each vertical signal line 229-*mv*, but the AD converter 271 may be further provided for each connection line 229-*mf*. In this configuration, the row scanning circuit 210 sets the selection signal SELn to a high level and causes the AD converter 271 connected to the vertical signal line 229-*mv* to perform the AD conversion on the pixel signal in a case in which the pixel addition is not performed. In addition, in the case in which the pixel addition is performed, the row scanning circuit 210 sets the selection signal SELn to a low level and causes the AD converter 271 connected to the connection line 229-*mf* to perform the AD conversion on the added signal.

Figure 7:
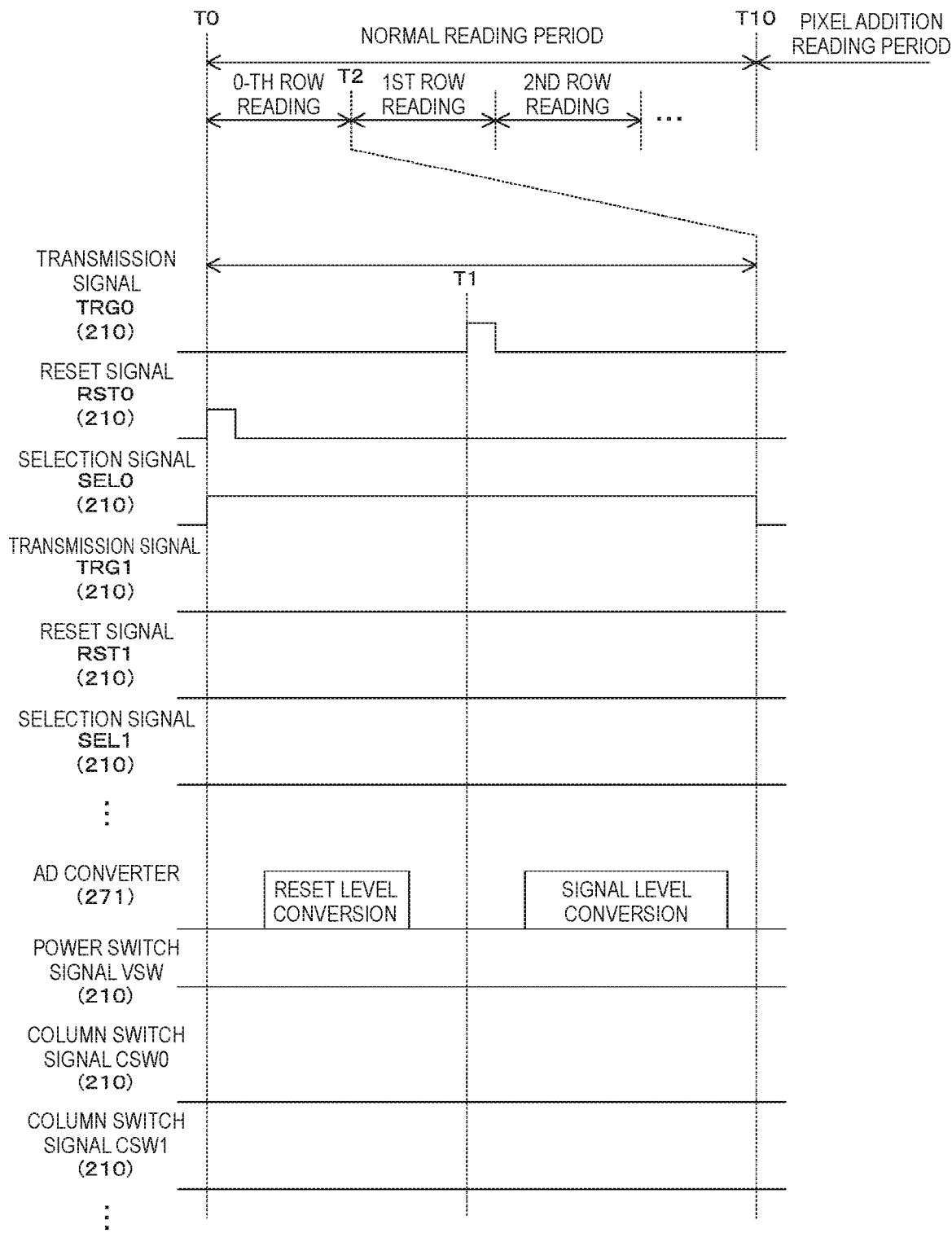
FIG. 7 is a timing chart illustrating an example of an operation within a normal reading period of the solid-state image sensor according to the first embodiment of the present technology.

FIG. 7 is a timing chart illustrating an example of an operation within a normal reading period of the solid-state image sensor according to the first embodiment. The normal reading period is a period in which a pixel signal is read without performing the pixel addition.

At timing T0, the row scanning circuit 210 controls the reset signal RST0 to the high level throughout a predetermined pulse period. Through this control, the floating diffusion layer 234 is reset. In addition, the row scanning circuit 210 controls a selection signal SEL0 to the high level. Note that the power switch signal VSW is set to the high level continuously from before a timing T0.

At a timing T1 after timing T0, the row scanning circuit 210 controls a transmission signal TRG0 to the high level throughout the predetermined pulse period. Through this control, the charges of the photoelectric conversion elements 231 in the 0-th row are transmitted to the floating diffusion layers 234. In addition, the row scanning circuit 210 controls the selection signal SEL0 to the low level at a timing T2 after the timing T1. Through this control, the reading of the 0-th row ends.

In addition, the AD converters 271 of each column sample a level of the pixel signals as a reset level from the timing T0 to the timing T1. Then, from the timing T1 to a timing T2, the AD converters 271 sample a level of the pixel signals as a signal level. The image processing unit 290 at the rear stage of the AD conversion unit 270 performs the CDS process of calculating a difference between the reset level and the signal level.

After the timing T2, reading after the first row is sequentially performed. The reset and the transmission of each row start when a given time has elapsed from a timing of the reset and the transmission of the previous row. Note that the solid-state image sensor 200 reads all the pixels, but decimates some of the rows or the columns and read the pixels.

Figure 8:
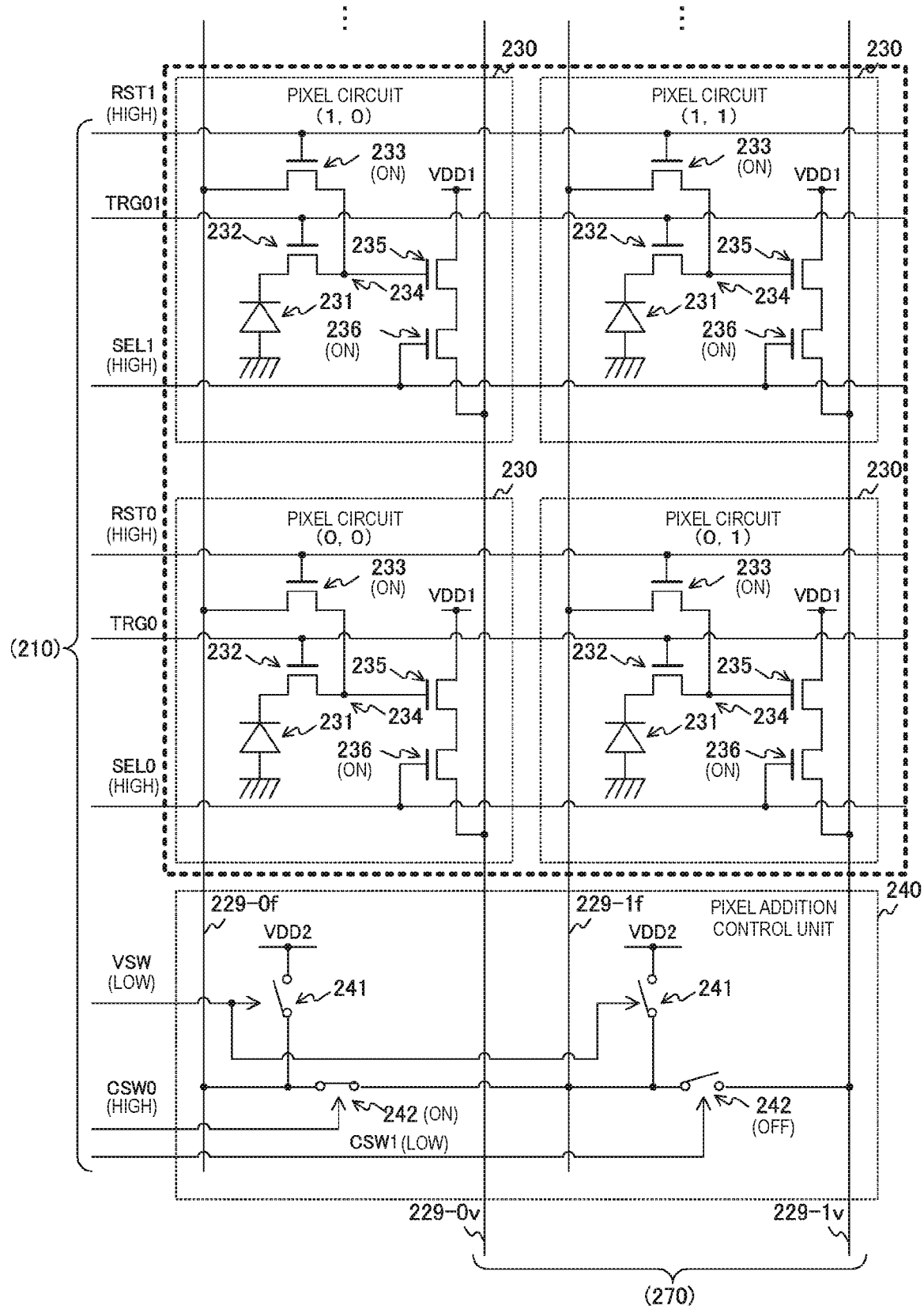
FIG. 8 is an explanatory diagram illustrating pixel addition control according to the first embodiment of the present technology.

FIG. 8 is an explanatory diagram illustrating pixel addition control according to the first embodiment. A portion surrounded by a dotted line indicates a pixel block formed by pixels of an addition target. For example, pixel signals of pixels in the 0th row and the 0th column, the 0th row and the 1st column, the 1st row and 0th column, and the 1st row and 1st column are assumed to be added.

The row scanning circuit 210 controls the reset transistor 233 in the 0th row and the 1st row to an ON state in accordance with the reset signals RST0 and the RST1 with the high level. The reset transistors 233 in the other remaining rows are controlled to an OFF state.

In addition, the row scanning circuit 210 controls the switches 242 between the 0th column and the 1st column to the ON state in accordance with the column switch signal CSW0 with the high level. Since the first column and the second column are not the addition target, the switches 242 between the 1st column and the 2nd column are controlled to the OFF state.

Through such control, the floating diffusion layers 234 in the 0th column are connected to the connection line 229-0f and the floating diffusion layers 234 in the 1st column are connected to the connection line 229-1f. Then, the connection lines 229-0f and 229-1f are also connected. Accordingly, all the floating diffusion layers 234 in the pixel block are connected via the connection lines 229-0f and 229-1f. Thus, the pixel signals of the pixels in the pixel block are added.

In addition, the row scanning circuit 210 controls the selection transistors 236 in the 0th row and the 1st row to the ON state in accordance with the selection signals SEL0 and SEL1 with the high level. Through this control, the added signal output from the vertical signal line 229-0v or 229-1v. The row scanning circuit 210 enables the AD converter 271 in one of the 0th column and the 1st column so that causes the AD conversion is caused to be performed on the added signal.

Figure 9:
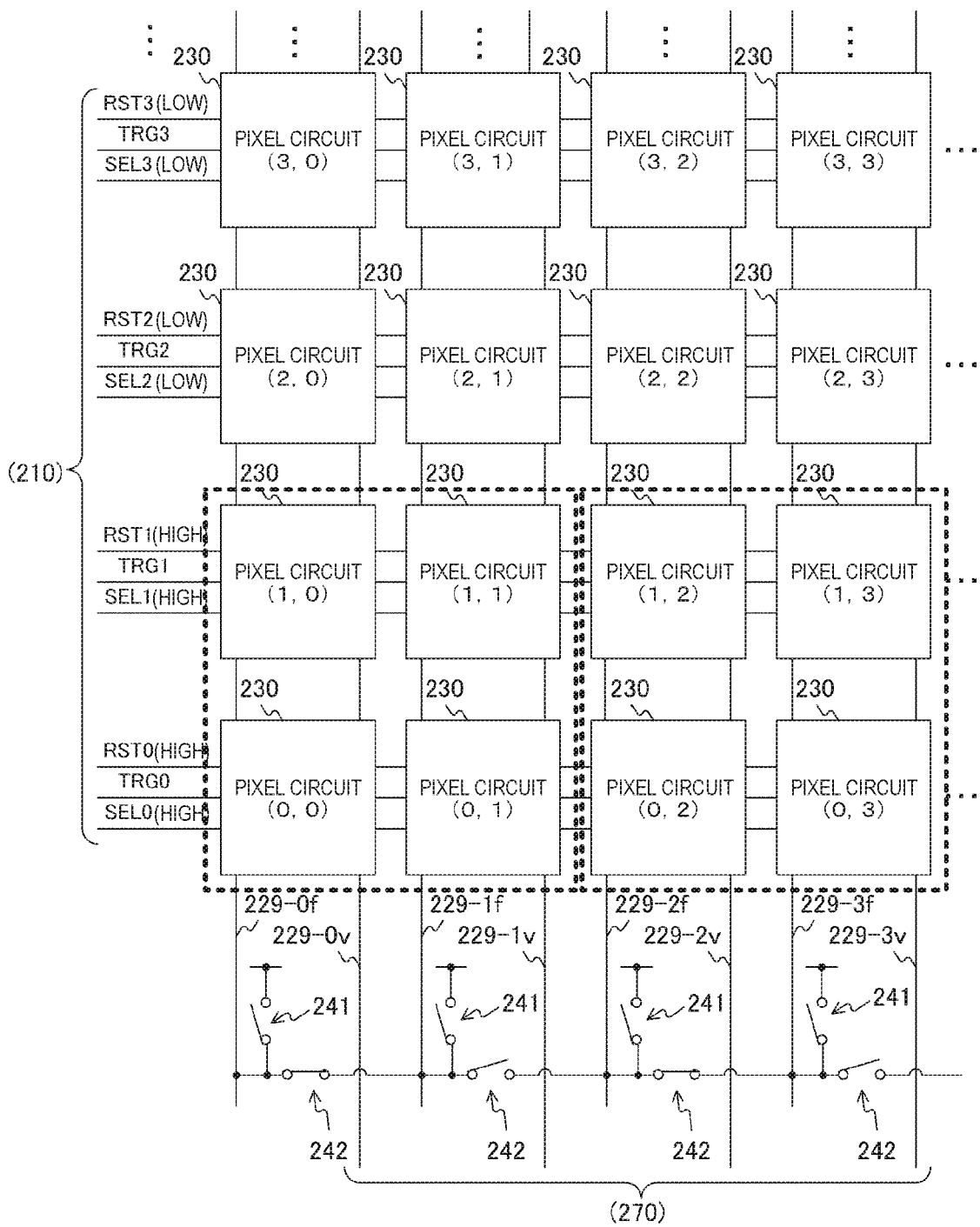
FIG. 9 is a diagram illustrating the solid-state image sensor in a case in which a plurality of pixel blocks of 2 rows×2 columns are set as an addition unit according to the first embodiment of the present technology.

FIG. 9 is a diagram illustrating the solid-state image sensor in a case in which a plurality of pixel blocks of 2 rows×2 columns are set as an addition unit according to the first embodiment. In the drawing, a portion surrounded by a dotted line indicates a pixel block formed by pixels of an addition target. For example, the pixel signals of the pixels in the 0th row and the 0th column, the 0th row and the 1st column, the 1st row and 0th column, and the 1st row and 1st column are assumed to be added. In addition, the pixel signals of the pixels in the 0th row and the 2nd column, the 0th row and the 3rd column, the 1st row and 2nd column, and the 1st row and 3rd column are assumed to be added.

The row scanning circuit 210 controls the reset transistors 233 in the 0th row and the 1st row to the ON state in accordance with the reset signals RST0 and RST1 with the high level. In addition, the row scanning circuit 210 controls the switches 242 between the 0th column and the 1st column and the switches 242 between the 2nd column and the 3rd column to the ON state in accordance with the column switch signals CSW0 and CSW2 with the high level. Then, the row scanning circuit 210 controls the selection transistors 236 in the 0th row and the 1st row to the ON state in accordance with the selection signals SEL0 and SEL1 with the high level. Note that only one of the selection signals SEL0 and SEL1 may be controlled to the ON state.

Figure 10:
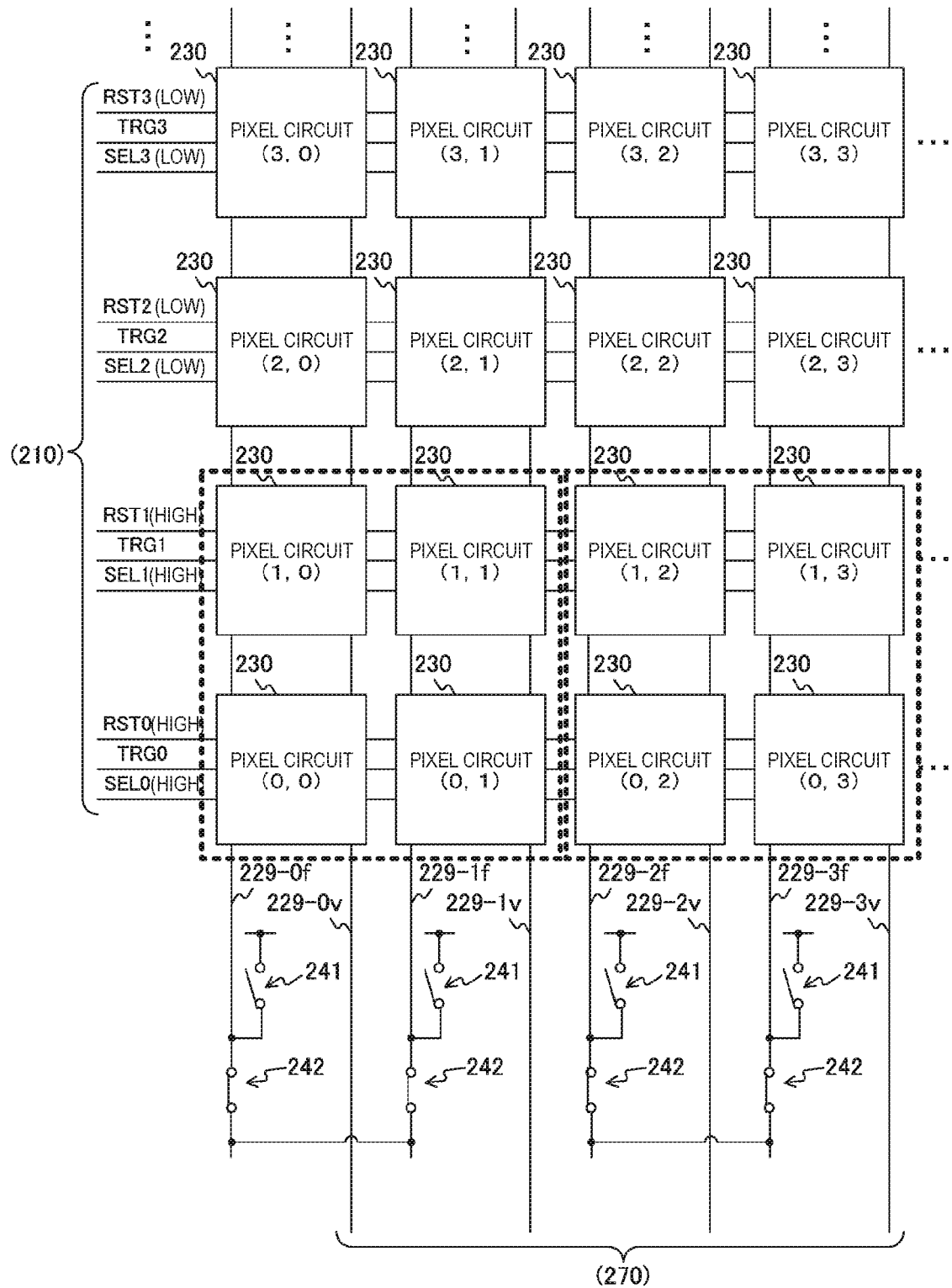
FIG. 10 is a block diagram illustrating an example of the solid-state image sensor in which connection of a switch is changed according to the first embodiment of the present technology.

Note that the switches 242 in the m-th column are disposed between the connection line 229-mf and the connection line 229-(m+1)f, but the present technology is not limited to this configuration. For example, as exemplified in FIG. 10, one end of each of the switches 241 in the m-th column may be connected to the connection line 229-mf and the other end of each of the switches 241 of a plurality of adjacent columns (two columns or the like) may be connected in common to a common line wired in the horizontal direction. In this case, ON resistance in the horizontal direction can be reduced, but the number of connections in the horizontal direction is determined depending on a physical structure. Therefore, only the number of additions in the vertical can be changed.

Figure 11:
FIG. 11 is a timing chart illustrating an example of an operation of the solid-state image sensor in a case in which a plurality of pixel blocks of 2 rows×2 columns are set as an addition unit according to the first embodiment of the present technology.

FIG. 11 is a timing chart illustrating an example of an operation of the solid-state image sensor in a case in which a plurality of pixel blocks of 2 rows×2 columns are set as an addition unit according to the first embodiment. At the time of the pixel addition, a set of the pixel blocks arrayed in a predetermined direction (the horizontal direction or the like) is referred to as a "block row" and a set of the pixel blocks arrayed in a direction vertical to the row is referred to as a "block column."

At a timing T10, the row scanning circuit 210 controls the reset signals RST0 and RST1 to the high level and controls the power switch signal VSW to the high level throughout a predetermined pulse period. Through this control, the floating diffusion layers 234 are reset. In addition, the row scanning circuit 210 controls the selection signals SEL0 and SEL1 to the high level.

In addition, at the timing T10, the row scanning circuit 210 controls the column switch signal CSWm (CSW0 or CSW2, or the like) of an odd column to the high level. Thus, the two adjacent columns are added.

In addition, the row scanning circuit 210 controls the reset signals RST0 and RST1, the selection signals SEL0 and SEL1, and the column switch signal CSWm of the odd column to the low level at a timing T12 after the timing T10. Through this control, the reading of the 0th block row ends.

Then, at a timing T11 after the timing T10, the row scanning circuit 210 controls the transmission signals TRG0 and the TRG1 to the high level throughout the pulse period. Thus, the charges of the photoelectric conversion elements 231 are transmitted to the floating diffusion layers 234.

In addition, the AD converters 271 in the odd column sample a reset level from the timing T10 to the timing T11 and sample a signal level from the timing T11 to the timing T12. After the timing T12, the reading of the block rows subsequent to the 1st block is sequentially performed in a similar procedure. Note that the solid-state image sensor 200 reads all the pixel blocks, but may decimates some of the block rows or the block columns and read the pixel blocks. In addition, the AD converters 271 in the odd row perform the AD conversion, but the AD converters 271 in an even row instead of the odd row may perform the AD conversion.

Figure 12:
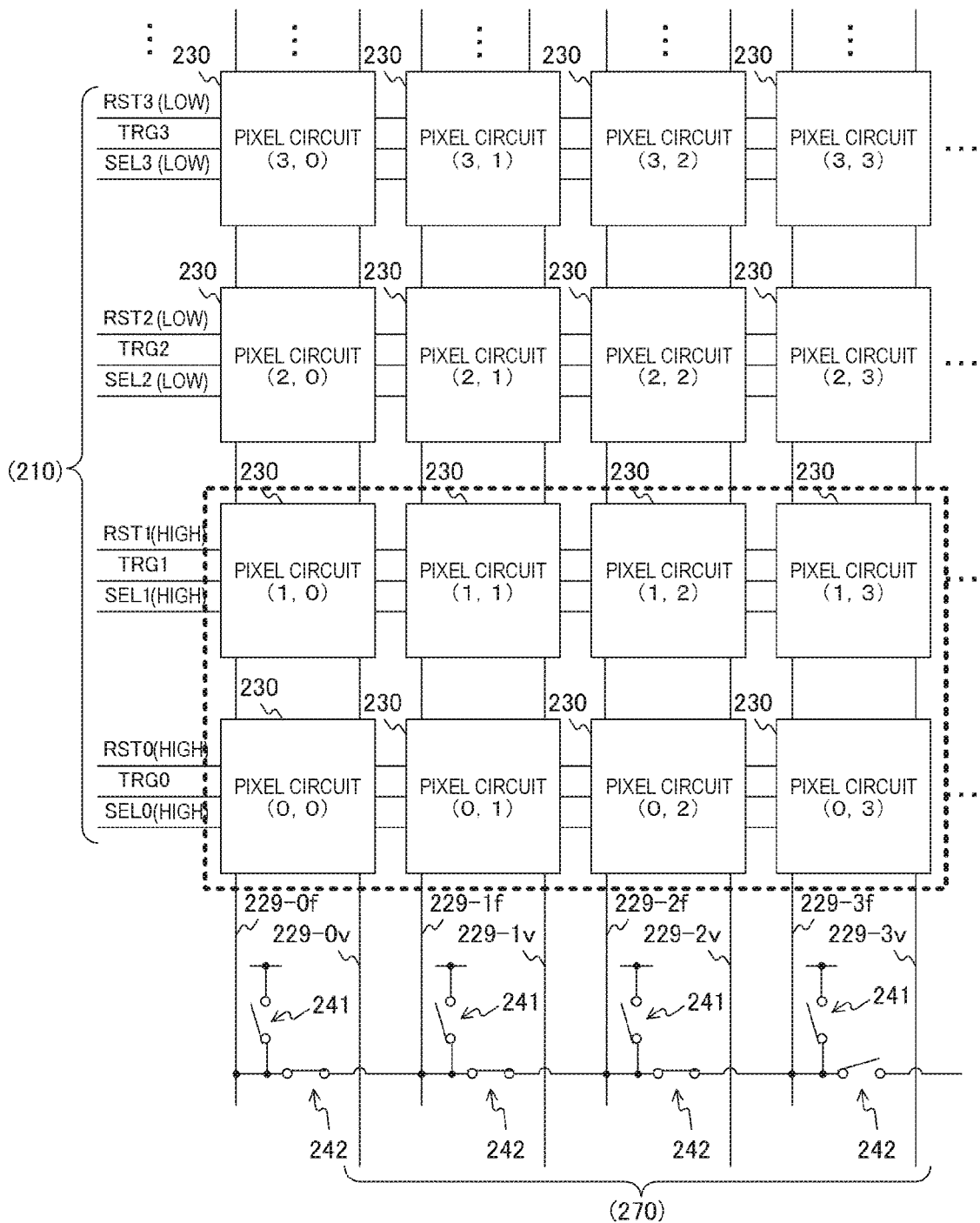
FIG. 12 is a diagram illustrating the solid-state image sensor in the case in which pixel blocks of 2 rows×4 columns are set as an addition unit according to the first embodiment of the present technology.

FIG. 12 is a diagram illustrating the solid-state image sensor in the case in which pixel blocks of 2 rows×4 columns are set as an addition unit according to the first embodiment. In the drawing, a portion surrounded by a dotted line indicates a pixel block formed by pixels of an addition target. For example, the pixel signals of 8 pixels in the 0th row and the 0th column, the 0th row and the 1st column, the 1st row and 0th column, the 1st row and the 1st column, the 0th row and the 2nd column, the 0th row and the 3rd column, the 1st row and the 2nd column, and the 1st row and 3rd column are assumed to be added.

The row scanning circuit 210 controls the reset transistors 233 in the 0th row and the 1st row to the ON state in accordance with the reset signals RST0 and RST1 with the high level. In addition, the row scanning circuit 210 controls the switches 242 between the 0th column to the 2nd column to the ON state in accordance with the column switch signals CSW0, CSW1, and CSW2 with the high level. Then, the row scanning circuit 210 controls the selection transistors 236 in the 0th row and the 1st row to the ON state in accordance with the selection signals SEL0 and SEL1 with the high level.

Figure 13:
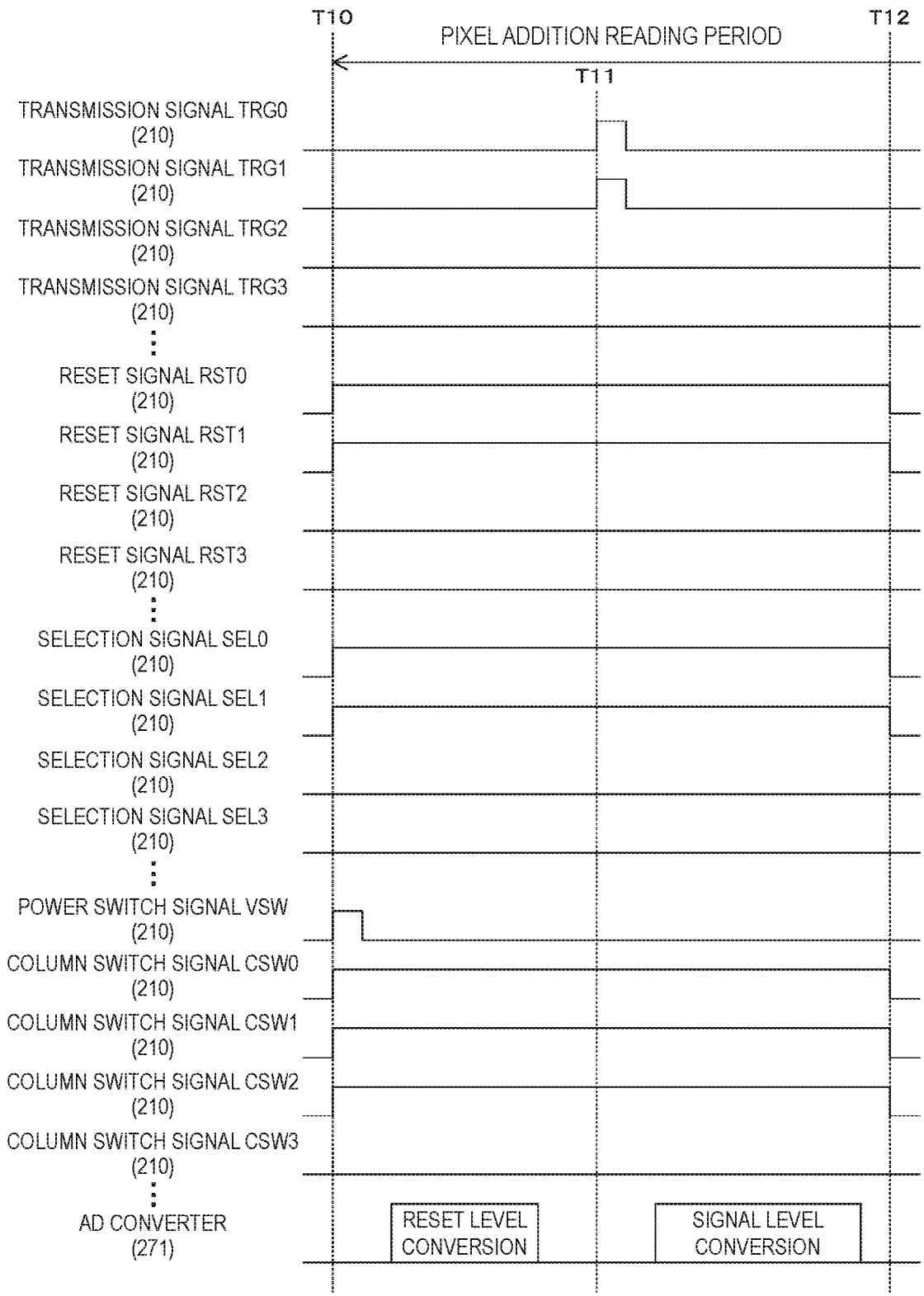
FIG. 13 is a timing chart illustrating an example of an operation of the solid-state image sensor in the case in which pixel blocks of 2 rows×4 columns are set as an addition unit according to the first embodiment of the present technology.

FIG. 13 is a timing chart illustrating an example of an operation of the solid-state image sensor in the case in which pixel blocks of 2 rows×4 columns are set as an addition unit according to the first embodiment.

At the timing T10, the row scanning circuit 210 controls the reset signals RST0 and RST1 to the high level and controls the power switch signal VSW to the high level throughout a predetermined pulse period. Through this control, the floating diffusion layers 234 are reset. In addition, the row scanning circuit 210 controls the selection signals SEL0 and SEL1 to the high level.

In addition, at the timing T10, the row scanning circuit 210 controls the column switch signals CSWm(4k), CSW (4k+1), and CSW(4k+2) to the high level. Here, k is an integer equal to or greater than 0. Thus, the four adjacent columns are added.

In addition, the row scanning circuit 210 controls the reset signals RST0 and RST1 and the selection signals SEL0 and SEL1 to the low level at the timing T12 after the timing T10. At the timing T12, the column switch signals CSWm(4k), CSW(4k+1), and CSW(4k+2) are also controlled to the low level. Through this control, the reading of the 0th block row ends.

Then, at a timing T11 after the timing T10, the row scanning circuit 210 controls the transmission signals TRG0 and the TRG1 to the high level throughout the pulse period. Thus, the charges of the photoelectric conversion elements 231 are transmitted to the floating diffusion layers 234.

In addition, the AD converters 271 in one (4k-th column or the like) of the four adjacent columns sample a reset level from the timing T10 to the timing T11 and sample a signal level from the timing T11 to the timing T12. After the timing T12, the reading of the block rows subsequent to the 1st block is sequentially performed in a similar procedure.

Figure 14:
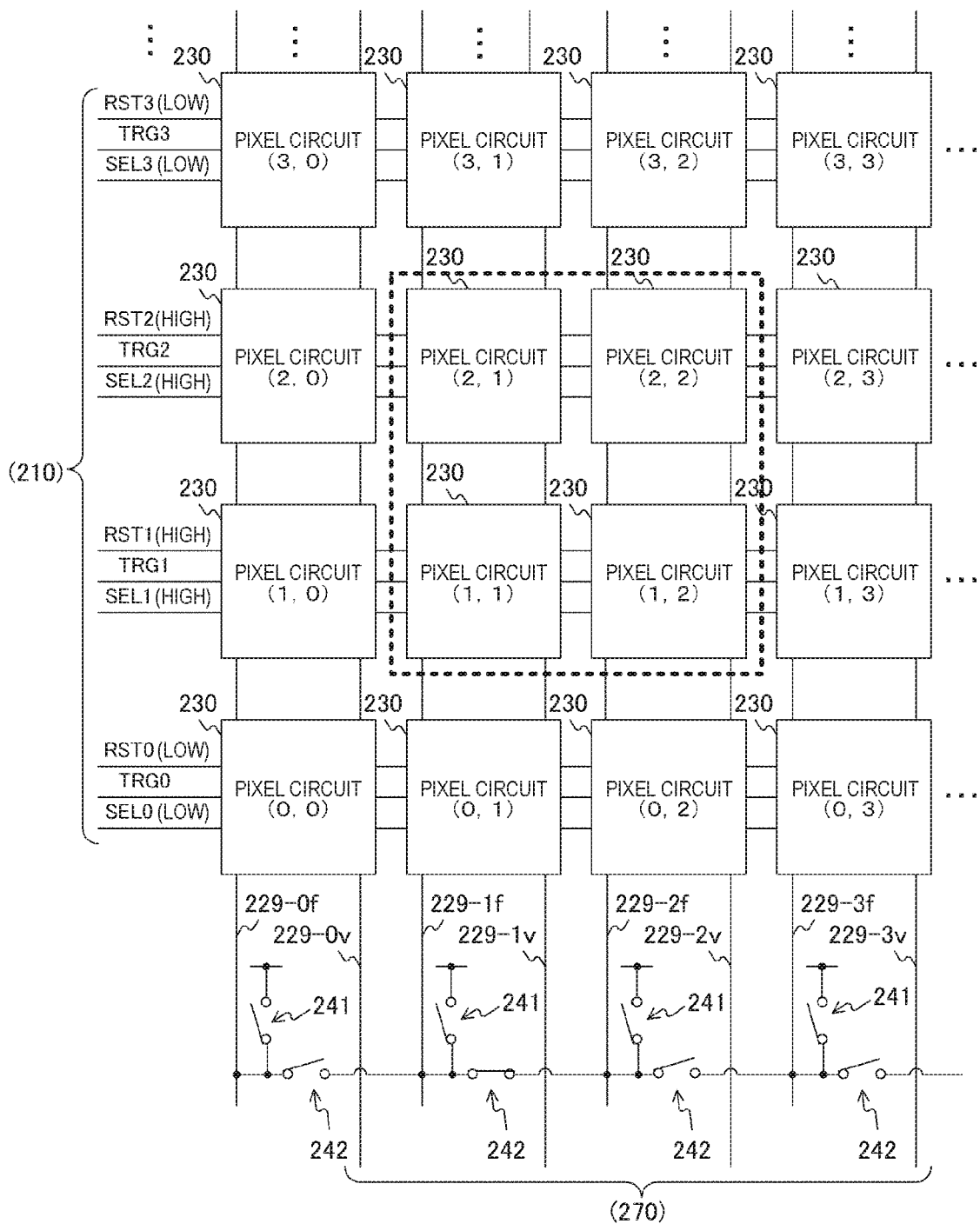
FIG. 14 is a diagram illustrating the solid-state image sensor in the case in which pixel blocks of 2 rows×2 columns are set as an addition unit according to the first embodiment of the present technology.

FIG. 14 is a diagram illustrating the solid-state image sensor in the case in which pixel blocks of 2 rows×2 columns are set as an addition unit according to the first embodiment. In the drawing, a portion surrounded by a dotted line indicates a pixel block formed by pixels of an addition target. For example, the pixel signals of the pixels in the 1st row and the 1st column, the 1st row and the 2nd column, the 2nd row and 1st column, and the 2nd row and the 2nd column are assumed to be added.

The row scanning circuit 210 controls the reset transistors 233 in the 1st row and the 2nd row to the ON state in accordance with the reset signals RST1 and RST2 with the high level. In addition, the row scanning circuit 210 controls the switches 242 between the 1st column and the 2nd column to the ON state in accordance with the column switch signal CSW1 with the high level. Then, the row scanning circuit 210 controls the selection transistors 236 in the 1st row and the 2nd row to the ON state in accordance with the selection signals SEL1 and SEL2 with the high level. Through such control, the pixel signals in the pixel block of 2 rows×2 columns in the middle are added.

Figure 15:
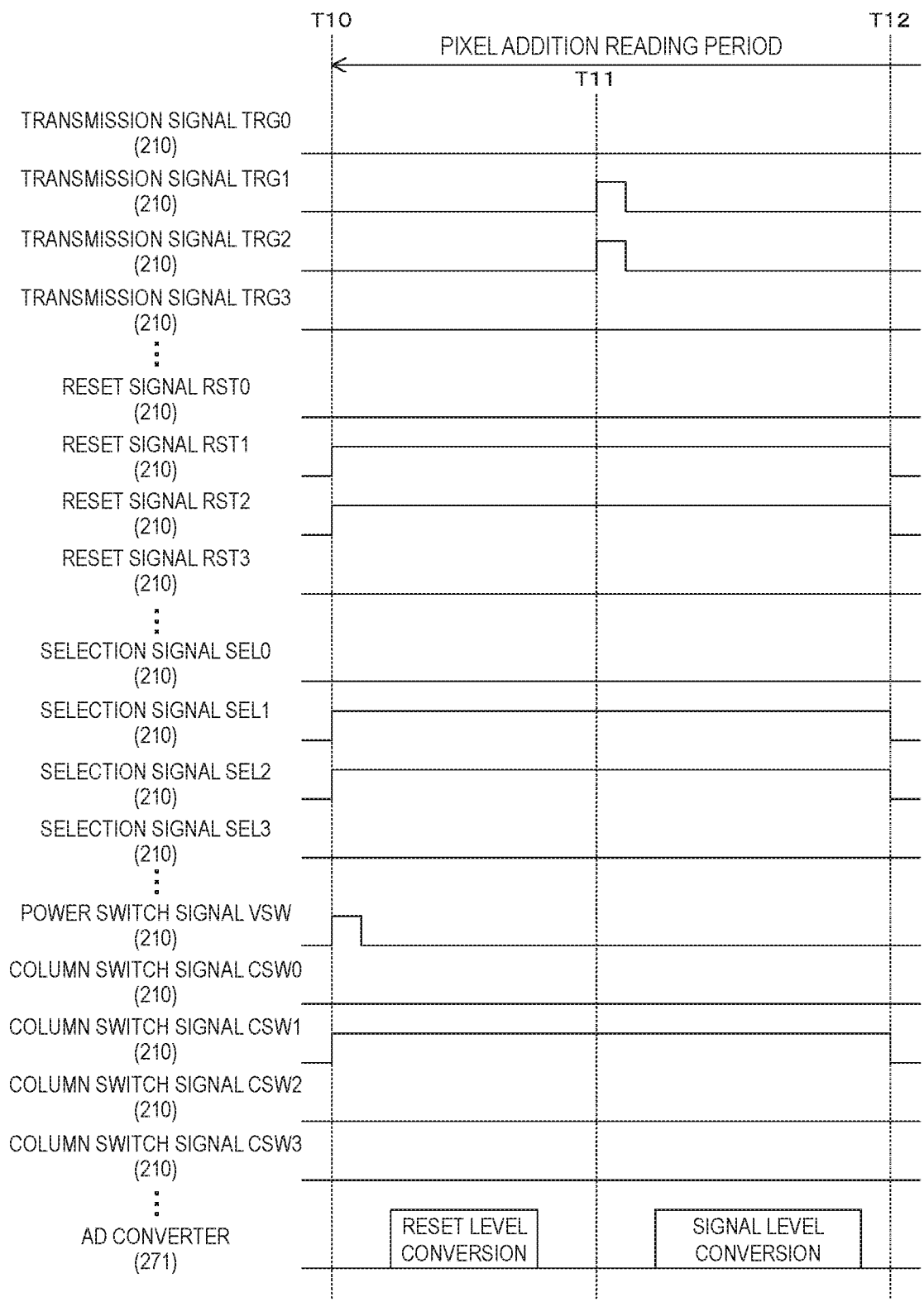
FIG. 15 is a timing chart illustrating an example of an operation of the solid-state image sensor in the case in which pixel blocks of 2 rows×2 columns are set as an addition unit according to the first embodiment of the present technology.

FIG. 15 is a timing chart illustrating an example of an operation of the solid-state image sensor in the case in which pixel blocks of 2 rows×2 columns are set as an addition unit according to the first embodiment.

At the timing T10, the row scanning circuit 210 controls the reset signals RST1 and RST2 to the high level and controls the power switch signal VSW to the high level throughout a predetermined pulse period. Through this control, the floating diffusion layers 234 are reset. In addition, the row scanning circuit 210 controls the selection signals SEL1 and SEL2 to the high level.

In addition, at the timing T10, the row scanning circuit 210 controls the column switch signal CSW1 to the high level. Thus, the 1st and 2nd columns are added.

In addition, the row scanning circuit 210 controls the reset signals RST1 and RST2, the selection signals SEL1 and SEL2, and the column switch signal CSW1 to the low level at the timing T12 after the timing T10. Through this control, the reading of the pixel block ends.

Then, at a timing T11 after the timing T10, the row scanning circuit 210 controls the transmission signals TRG1 and the TRG2 to the high level throughout the pulse period. Thus, the charges of the photoelectric conversion elements 231 are transmitted to the floating diffusion layers 234.

In addition, the AD converters 271 in the 1st column (or the 2nd column) sample a reset level from the timing T10 to the timing T11 and sample a signal level from the timing T11 to the timing T12.

As exemplified in FIGS. 10 to 15, the solid-state image sensor 200 can voluntarily change the addition unit during the operation under the control of the reset transistors 233 and the switches 242. The rows to be added can be changed under the control of the reset transistors 233. In addition, the columns to be added can be changed under the control of the switches 242.

[Operation Example of Solid-State Image Sensor]

Figure 16:
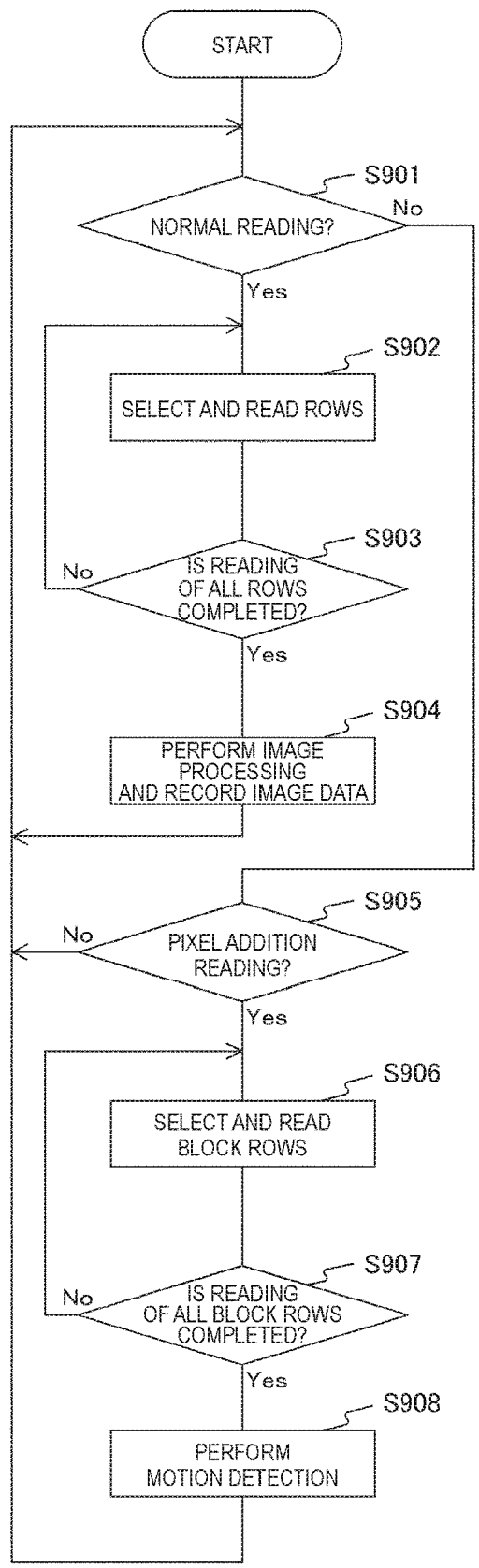
FIG. 16 is a flowchart illustrating an example of an operation of the solid-state image sensor according to the first embodiment of the present technology.

FIG. 16 is a flowchart illustrating an example of an operation of the solid-state image sensor 200 according to the first embodiment. The operation starts, for example, when a manipulation of causing imaging of image data or motion detection to be started is performed.

First, the solid-state image sensor 200 determines whether or not a period is the normal reading period (step S901). In a case in which the period is the normal reading period (Yes in step S901), the solid-state image sensor 200 selects rows to be read and perform reading (step S902). Then, the solid-state image sensor 200 determines whether or not the reading of all the rows of a reading target is completed (step S903). In a case in which the reading of all the rows is not completed (No in step S903), the solid-state image sensor 200 repeatedly performs steps subsequent to step S902.

In a case in which the reading of all the rows is completed (Yes in step S903), the solid-state image sensor 200 performs image processing on image data and records the image data (step S904).

In addition, in a case in which a period is not the normal reading period, the solid-state image sensor 200 determines whether or not the period is a pixel addition reading period (step S905). In a case in which the period is the pixel addition reading period (Yes in step S905), the solid-state image sensor 200 selects the block rows of a reading target and performs the reading (step S906). Then, the solid-state image sensor 200 determines whether or not the reading of all the block rows of the reading target is completed (step S907). In a case in which the reading of all the block rows is not completed (No in step S907), the solid-state image sensor 200 repeatedly performs steps subsequent to step S906.

In a case in which the reading of all the block rows is completed (Yes in step S907), the solid-state image sensor 200 performs motion detection on the basis of image data generated through the pixel addition (step S908).

In a case in which the period is not the pixel addition reading period (No in step S905) or after step S904 or step S908, the solid-state image sensor 200 repeatedly performs steps subsequent to step S901.

In this way, according to the first embodiment of the present technology, since the reset transistors 233 and the switches 242 are controlled so that the amounts of charges of the plurality of floating diffusion layers 234 are added, the addition unit in the pixel addition can be voluntarily changed. By changing the addition unit, it is possible to change the resolution of the image data in the pixel addition.

First Modification Example

In the above-described first embodiment, the switches 241 and 242 have been provided for each column in the pixel addition control unit 240 to control the pixel addition, but the number of switches may be increased with an increase in the number of columns and the circuit size of the pixel addition control unit 240 may increase. The solid-state image sensor 200 according to a first modification example of the first embodiment differs from that of the first embodiment in that a circuit size of the pixel addition control unit 240 is reduced.

Figure 17:
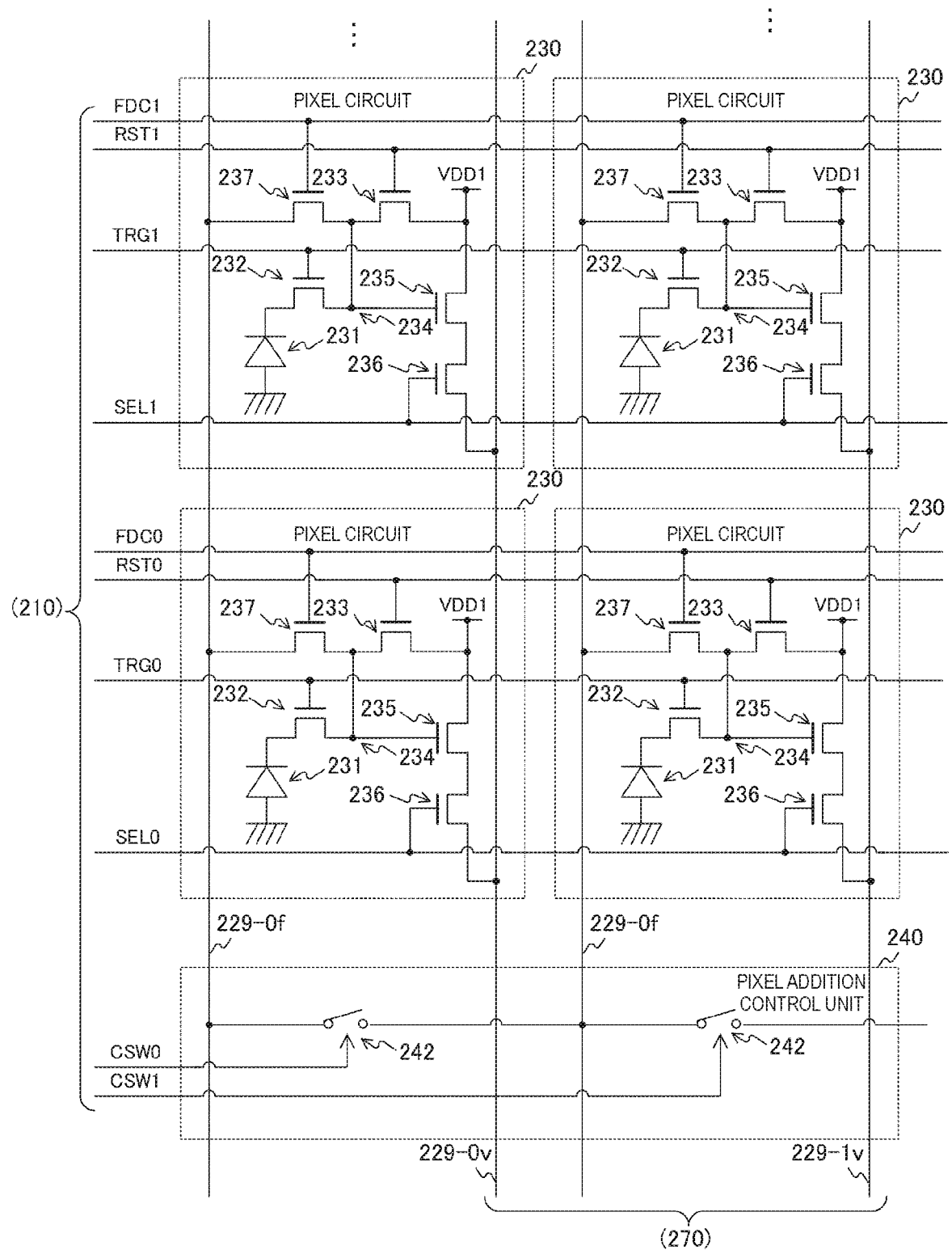
FIG. 17 is a circuit diagram illustrating a configuration example of a pixel circuit and a pixel addition control unit according to a first modification example of the first embodiment of the present technology.

FIG. 17 is a circuit diagram illustrating a configuration example of the pixel circuit 230 and the pixel addition control unit 240 according to a first modification example of the first embodiment. The pixel circuit 230 according to the first modification example of the first embodiment differs from that of the first embodiment in that a connection transistor 237 is further included.

The connection transistor 237 opens and closes a path between the floating diffusion layer 234 and the connection line 229-*mf* along an FD connection signal FDCn. The FD connection signal FDCn is a signal for instructing connection to the connection line 229-*mf* of the floating diffusion layer 234 and is generated by the row scanning circuit 210. Note that the connection transistor 237 is an example of a connection path opening and closing unit described in the claims.

In addition, the reset transistor 233 according to the first modification example of the first embodiment opens and closes a path between the floating diffusion layer 234 and a power supply in accordance with the reset signal RSTn. In addition, the pixel addition control unit 240 according to the first modification example of the first embodiment does not include the switch 241.

The row scanning circuit 210 can transmit only the reset signal RSTn instead of the reset signal RSTn and the power switch signal VSW and initialize the floating diffusion layer 234. Therefore, it is not necessary to provide the switch 241 for initialization in the pixel addition control unit 240.

Note that in a case in which initialization is performed with a different voltage from that at the time of the normal reading when the pixel addition is performed, the switch 241 can further be added.

In this way, according to the first modification example of the first embodiment of the present technology, since the connection transistor 237 is provided in addition to the reset transistor 233, the floating diffusion layer 234 can be initialized even when the switch 241 for initialization is not provided in the pixel addition control unit 240. Thus, it is possible to reduce the circuit size of the pixel addition control unit 240.

Second Modification Example

In the first modification example of the first embodiment described above, the photoelectric conversion element 231 has been connected only to the floating diffusion layer 234. Therefore, the photoelectric conversion element 231 may not be connected unless two or more transistors are involved. In a case in which only one transistor is involved, a circuit configuration in which the photoelectric conversion element 231 is connected to one of the floating diffusion layer 234 and the connection line 229-*mf* via the transistor may be realized. The solid-state image sensor 200 according to the second modification example of the first embodiment differs from that of the first modification example of the first embodiment in that the number of transistors between the connection line 229-*mf* and the photoelectric conversion element 231 is one.

Figure 18:
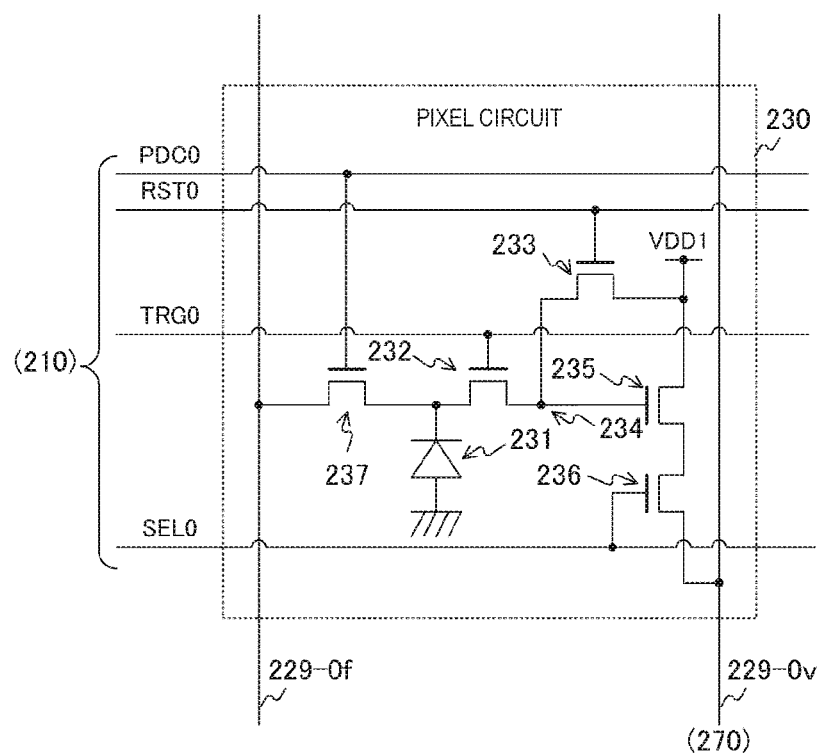
FIG. 18 is a circuit diagram illustrating a configuration example of a pixel circuit according to a second modification example of the first embodiment of the present technology.

FIG. 18 is a circuit diagram illustrating a configuration example of the pixel circuit 230 according to the second modification example of the first embodiment. The connection transistor 237 according to the second modification example of the first embodiment opens and closes a path between the photoelectric conversion element 231 and the connection line 229-*mf* in accordance with a PD connection signal PDCn. The PD connection signal PDCn is a signal for instructing connection to the connection line 229-*mf* of the photoelectric conversion element 231 and is generated by the row scanning circuit 210. Note that the photoelectric conversion element 231 is an example of a charge storage unit described in the claims.

In this way, according to the second modification example of the first embodiment of the present technology, since the photoelectric conversion element 231 is connected to the connection line 229-*mf* or the floating diffusion layer 234, the number of transistors between the connection line and the photoelectric conversion element can be set to one and ON resistance can thus be reduced.

2. Second Embodiment

According to the above-described first embodiment, power consumption has been reduced by performing the pixel addition to decrease the resolution, but it is difficult to further reduce power consumption without further decreasing the resolution. The solid-state image sensor 200 according to the second embodiment differs from that of the first embodiment in that power consumption is further reduced.

Figure 19:
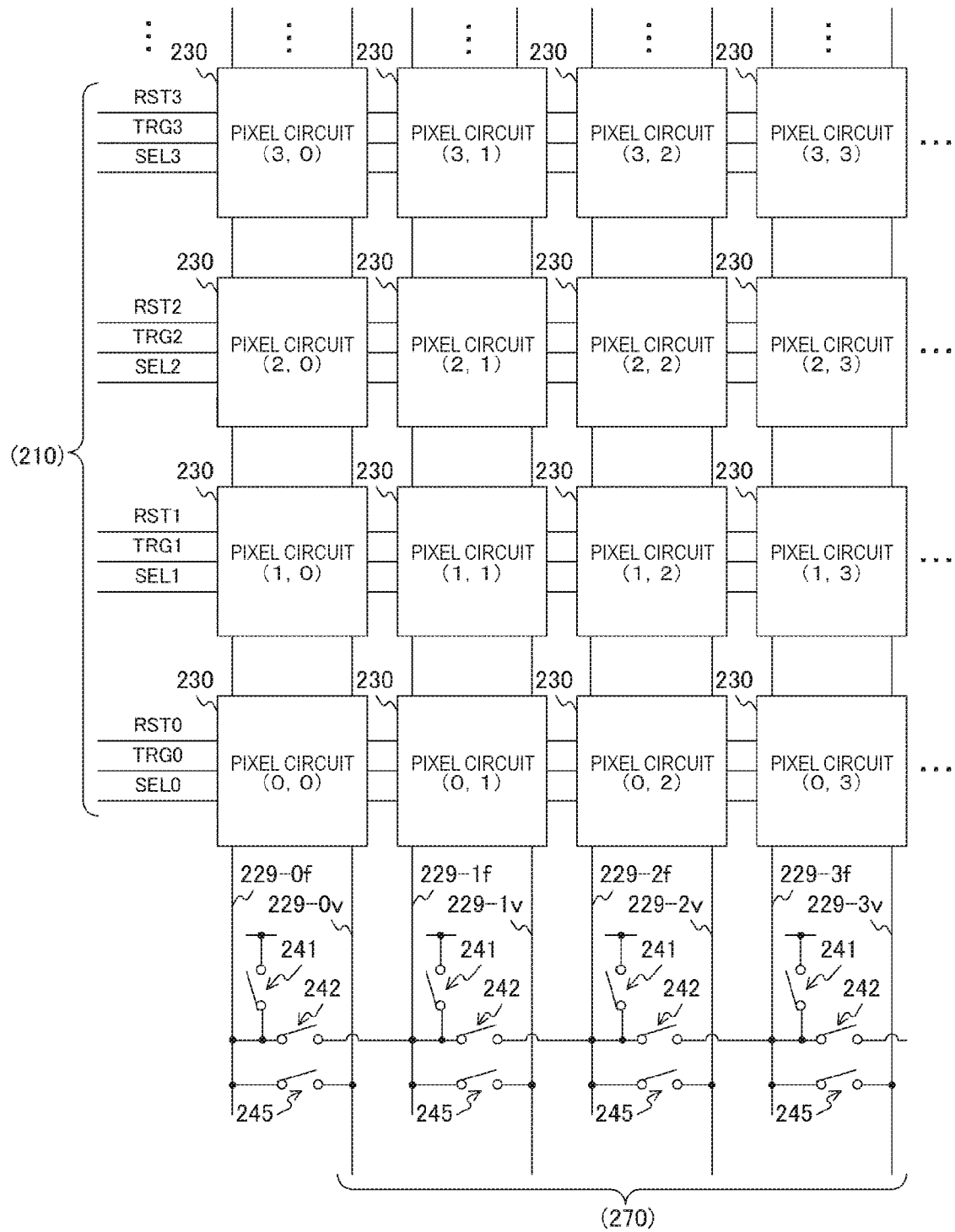
FIG. 19 is a block diagram illustrating a configuration example of a pixel array unit and a pixel addition control unit according to a second embodiment of the present technology.

FIG. 19 is a block diagram illustrating a configuration example of the pixel array unit 220 and the pixel addition control unit 240 according to a second embodiment. The pixel addition control unit 240 according to the second embodiment differs from that of the first embodiment in that a switch 245 is further included for each column.

The switch 245 opens and closes a path between the connection line 229-*mf* and the vertical signal line 229-*mv* in accordance with a signal line connection signal FD2VSm. The signal line connection signal FD2VSm is a signal for instructing connection between the connection line 229-*mf* and the vertical signal line 229-*mv* and is generated by the row scanning circuit 210. Note that the switch 245 is an example of a signal path opening and closing unit described in the claims.

The row scanning circuit 210 sets the selection signal SELn corresponding to a pixel block to a low level, controls the signal line connection signal FD2VSm corresponding to the pixel block to a high level so that the connection line 229-*mf* is caused to be connected to the vertical signal line 229-*mv*. Through this control, the added pixel signal is output to the AD converter 271 without involving the amplification transistor 235 and the selection transistor 236. Therefore, compared to the first embodiment in which amplification is performed by the amplification transistor 235, it is possible to reduce the power consumption.

In this way, according to the second embodiment of the present technology, since the switch 245 opens and closes the path between the connection line 229-*mf* and the vertical signal line 229-*mv*, the pixel signal can be read without being amplified by bypassing the amplification transistor 235. Thus, compared to the case in which the pixel signal is amplified, it is possible to further reduce the power consumption.

3. Third Embodiment

In the above-described first embodiment, the AD conversion is performed by reading the block rows one by one, but a time necessary for reading is lengthened with an increase in the number of the rows of the block rows, thereby increasing power consumption. When the plurality of block rows are simultaneously read, it is possible to shorten the time necessary for the reading and reduce the power consumption. The solid-state image sensor 200 according to the third embodiment differs from that of the first embodiment in that the plurality of block rows are simultaneously read and the AD conversion is performed.

Figure 20:
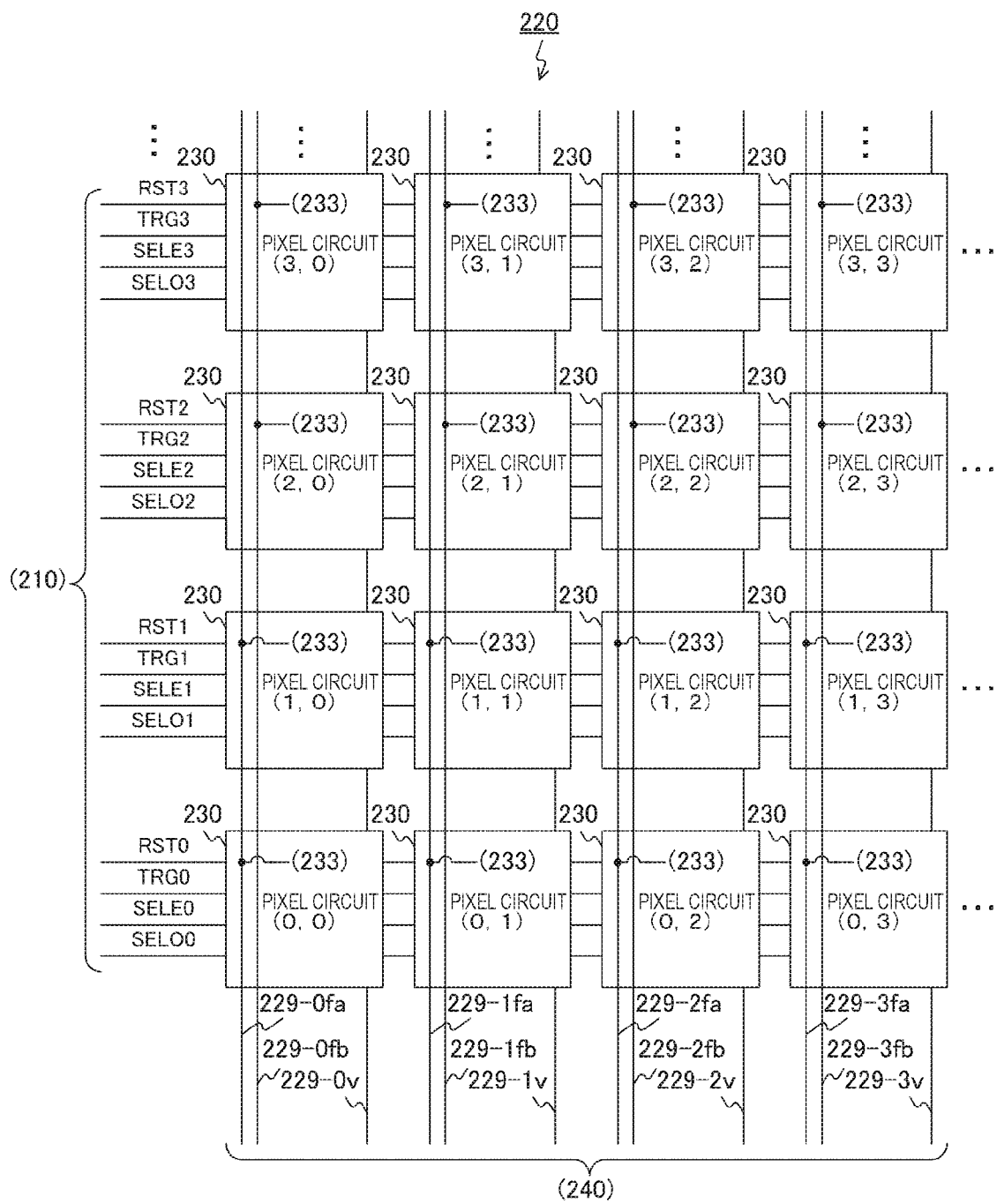
FIG. 20 is a block diagram illustrating a configuration example of a pixel array unit according to a third embodiment of the present technology.

FIG. 20 is a block diagram illustrating a configuration example of the pixel array unit 220 according to the third embodiment. In the pixel array unit 220 according to the third embodiment, two connection lines 229-mfa and 229-mfb are wired for each row. The connection line 229-mfa is connected to the reset transistor 233 of an odd block row. On the other hand, the connection line 229-mfb is connected to the reset transistor 233 of an even block row. In addition, a pixel block is formed by 2 rows×2 columns. Note that the block size may be larger and formed by, for example, 8 rows×8 columns. When the block size is formed by 8 rows×8 columns, addition of 2 rows×2 columns, addition of 4 rows×4 columns, the addition of 8 rows×8 columns, or the like can be performed.

Figure 21:
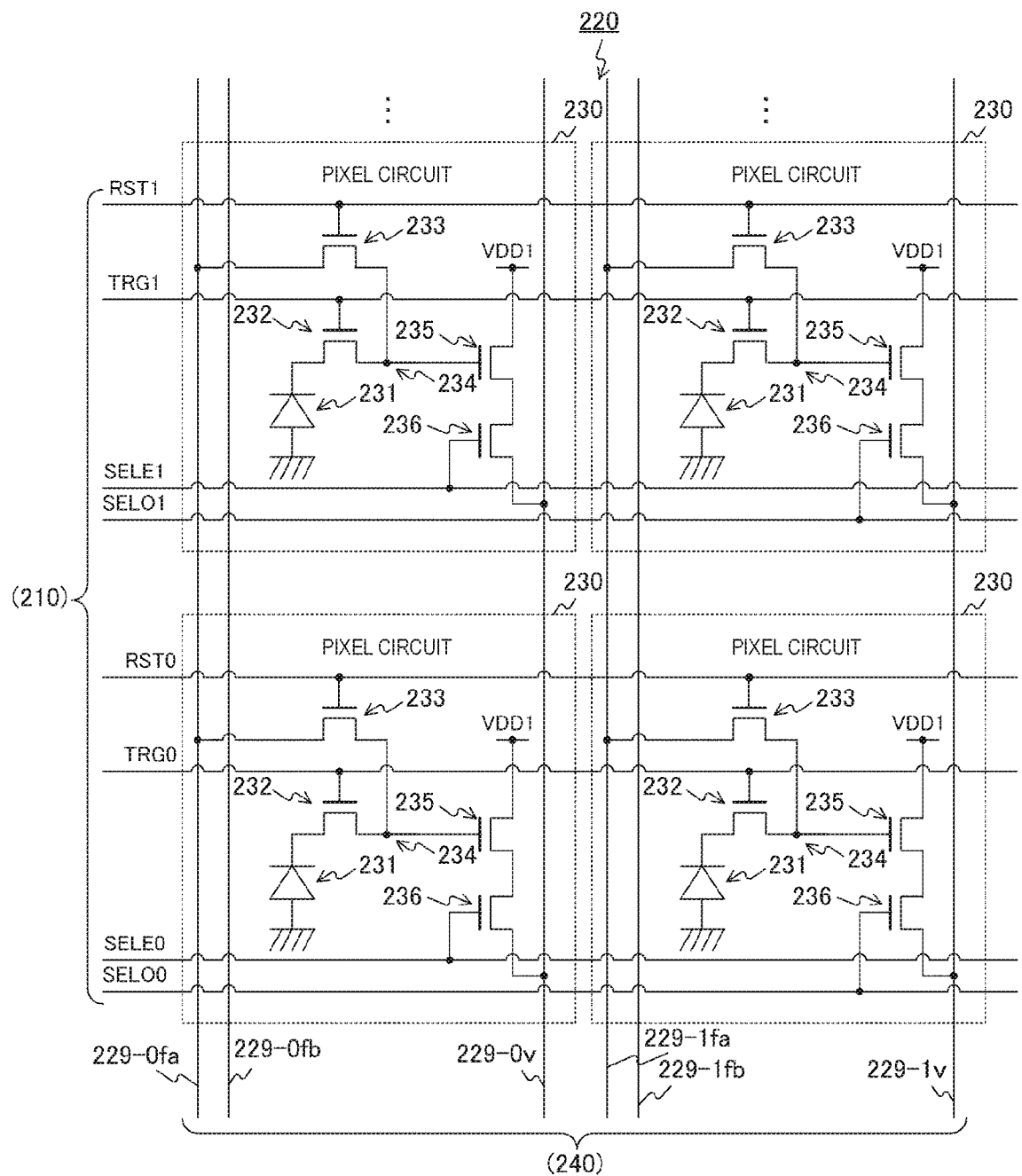
FIG. 21 is a circuit diagram illustrating a configuration example of a pixel circuit according to the third embodiment of the present technology.

FIG. 21 is a circuit diagram illustrating a configuration example of the pixel circuit 230 according to the third embodiment. Four horizontal signal lines are wired for each row of the pixel circuit 230. Of the four horizontal signal lines corresponding to the rows, one line is a reset line in which a reset signal RSTn is transmitted, another line is a transmission line in which a transmission signal TRGn is transmitted, and the two remaining lines are selection lines in which selection signals SELOn and SELEn are transmitted.

Here, the selection signal SELOn is a signal for selecting an odd column of an n-th row and the selection signal SELEn is a signal for selecting an even column of the n-th row. The selection signal SELOn is input to a gate of the selection transistor 236 of an odd column of the n-th row and the selection signal SELEn is input to a gate of the selection transistor 236 of an even column of the n-th row.

Figure 22:
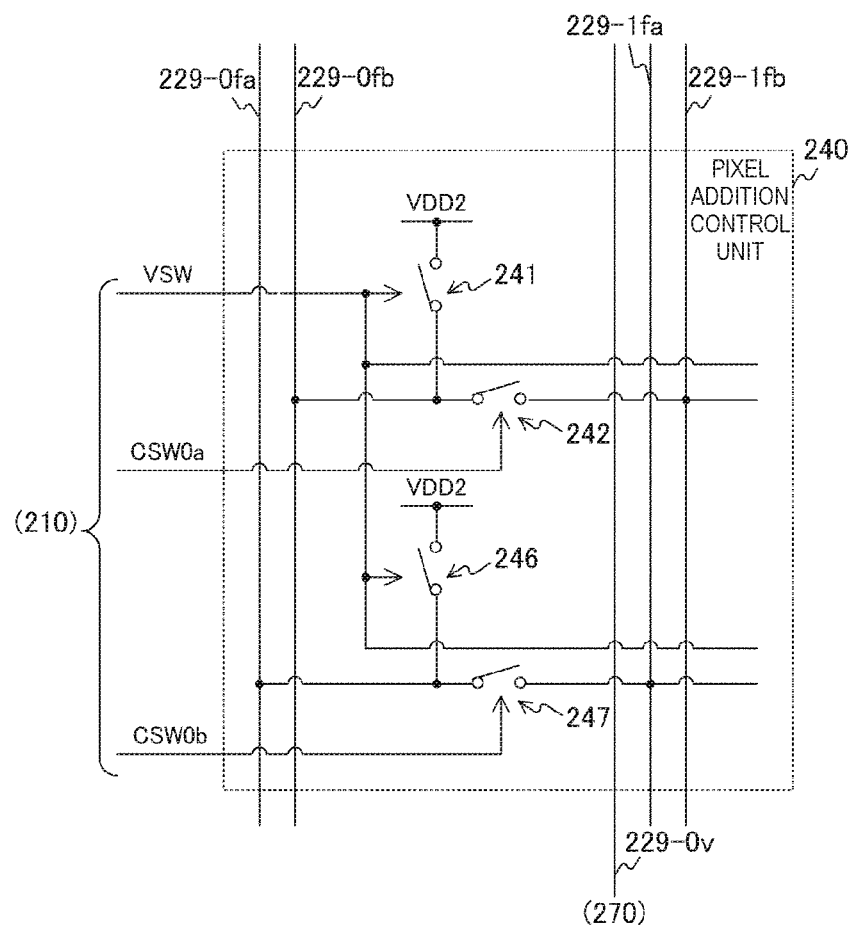
FIG. 22 is a circuit diagram illustrating a configuration example of a pixel addition control unit according to the third embodiment of the present technology.

FIG. 22 is a circuit diagram illustrating a configuration example of the pixel addition control unit 240 according to the third embodiment. The pixel addition control unit 240 according to the third embodiment further includes switches 246 and 247 for each column.

The switch 242 of an m-th column opens and closes a path between a connection line 229-mfa and a connection line 229-(m+1)fa in accordance with a column switch signal CSWma. The switch 247 of the m-th column opens and closes a path between a connection line 229-mfb and a connection line 229-(m+1)fb in accordance with a column switch signal CSWmb.

In addition, the switch 241 of the m-th column opens and closes a path between the connection line 229-mfa and a power supply in accordance with a power switch signal VSW. The switch 246 of the m-th column opens and closes a path between the connection line 229-mfb and a power supply in accordance with the power switch signal VSW.

Figure 23:
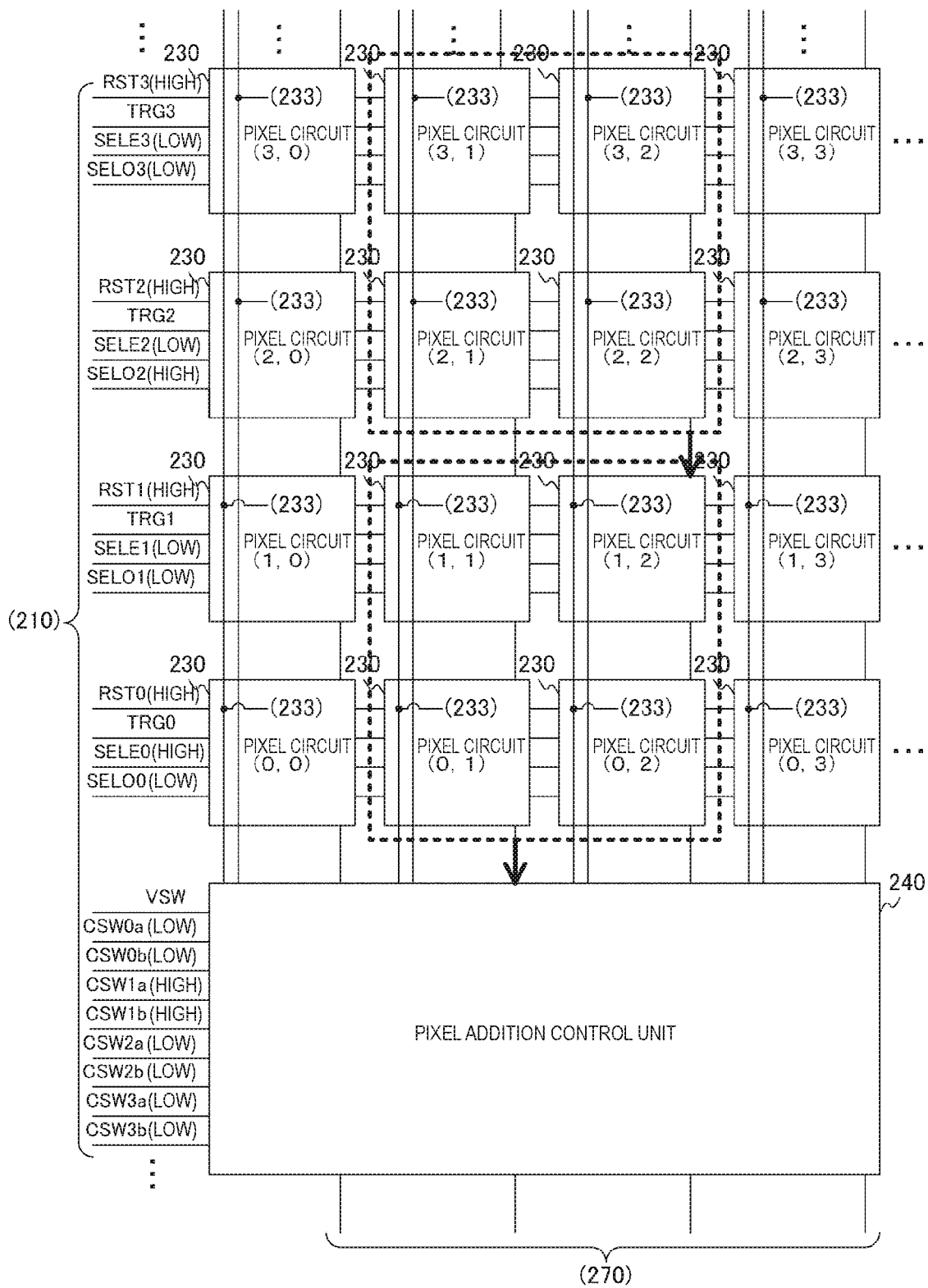
FIG. 23 is a diagram illustrating a solid-state image sensor in a case in which a plurality of pixel blocks of 2 rows×2 columns are set as an addition unit according to the third embodiment of the present technology.

FIG. 23 is a diagram illustrating a solid-state image sensor in a case in which a plurality of pixel blocks of 2 rows×2 columns are set as an addition unit according to the third embodiment. A portion surrounded by a dotted line in the drawing indicates a pixel block formed by pixels of an addition target. For example, pixel signals of four pixels in the 0th row and the 1st column, the 0th row and the 2nd column, the 1st row and 1st column, and the 1st row and 2nd column are assumed to be added. In addition, pixel signals of four pixels in the 2nd row and the 1st column, the 2nd row and the 2nd column, the 3rd row and 1st column, and the 3rd row and 2nd column are assumed to be added.

The row scanning circuit 210 controls the reset transistor 233 in the 0th to 3rd columns to an ON state in accordance with the reset signals RST0 to RST3 with the high level. In addition, the row scanning circuit 210 controls the switches 242 and 247 in the first column to the ON state in accordance with column switch signals CSW1a and CSW1b with a high level. Then, the row scanning circuit 210 controls the selection transistors 236 of an even column of the 0th row and an odd column of the 2nd row in accordance with selection signals SELE0 and SELO2 with a high level. Through this control, signals of a pixel block corresponding to the 0th row and the 1st row are output from the 1st column and signals of a pixel block corresponding to the 2nd row and the 3rd row are output from the 2nd column. Accordingly, the AD converters 271 in the 1st column and the 2nd column can simultaneously perform the AD conversion on the pixel signals of the two pixel blocks.

Note that two connection lines are wired for each column, but three or more connection lines may be wired for each column. In a case in which c (where c is an integer equal to or greater than 3) connection lines are wired for each column, c addition units (pixel blocks) adjacent in the vertical direction are connected to mutually different connection lines. In addition, the number of columns of the addition unit is c columns. Then, the c addition units adjacent in the vertical direction simultaneously output the pixel signals from the mutually different vertical signal lines under the control of the row scanning circuit 210.

In addition, the pixel block formed by the plurality of adjacent pixels is set as the addition unit, but a set of a plurality of pixels which are not adjacent can also be set as an addition unit. For example, one of the two connection lines for each column is connected to 4p (where p is an integer equal to or greater than 0) rows and 4p+2 rows and the other connection line may be connected to 4p+1 rows and 4p+3 rows. Thus, mutually distant rows can be added. In addition, the solid-state image sensor 200 adds the pixel signals irrespective of color, but may add the pixel signals in accordance with color.

Figure 24:
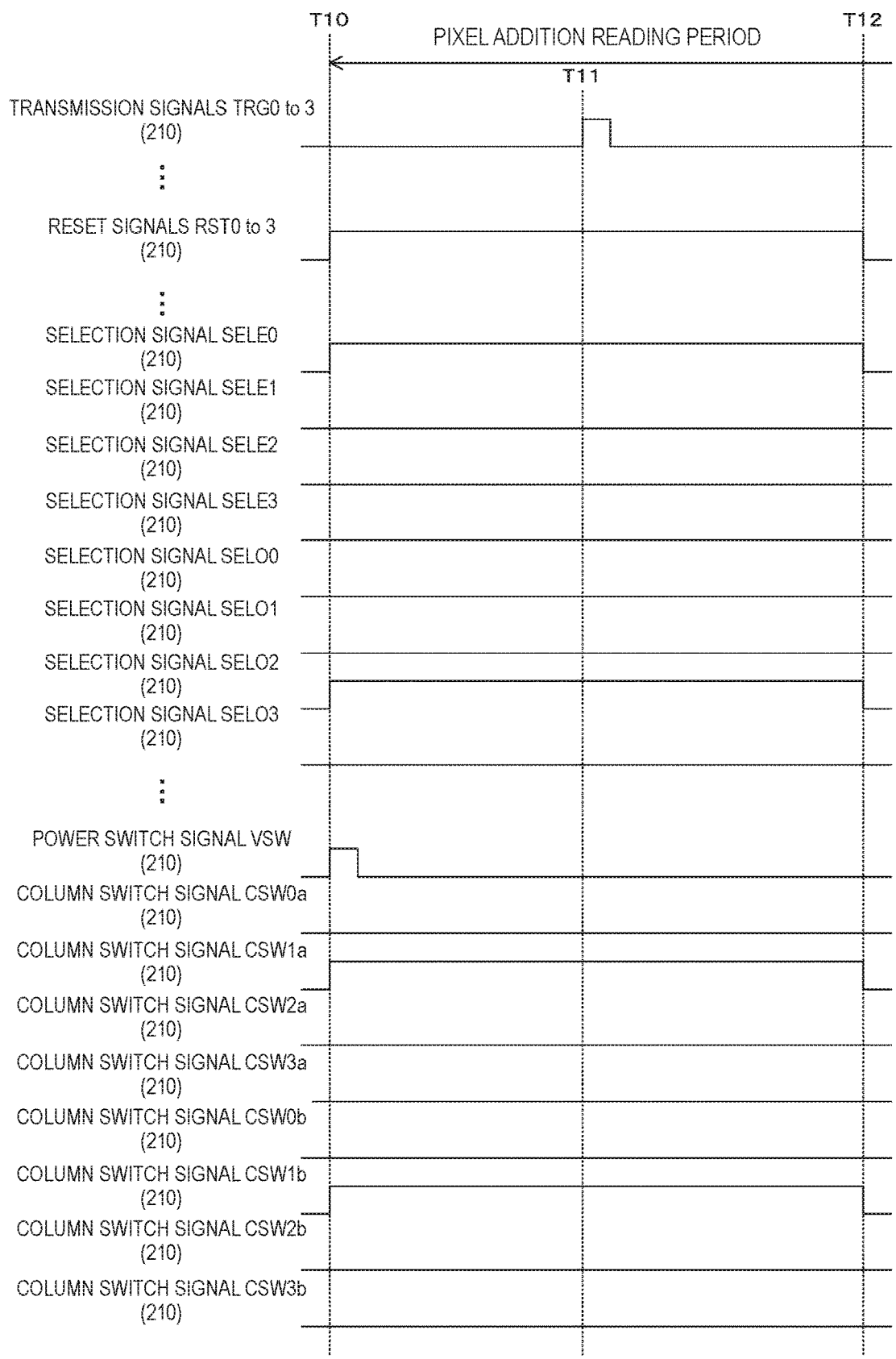
FIG. 24 is a timing chart illustrating an example of an operation of the solid-state image sensor in the case in which the plurality of pixel blocks of 2 rows×2 columns are set as an addition unit according to the third embodiment of the present technology.

FIG. 24 is a timing chart illustrating an example of an operation of the solid-state image sensor 200 in the case in which a plurality of pixel blocks of 2 rows×2 columns are set as an addition unit according to the third embodiment.

At the timing T10, the row scanning circuit 210 controls the reset signals RST0 to RST3 and the selection signals SELE0 and SELO2 to the high level. In addition, the row scanning circuit 210 controls the power switch signal VSW to the high level throughout a predetermined pulse period.

In addition, at the timing T10, the row scanning circuit 210 controls the column switch signals CSW1a and CSW1b to the high level.

In addition, at the timing T12 after the timing T10, the row scanning circuit 210 controls the reset signals RST0 to RST3, the selection signals SELE0 and SELO2, and the column switch signals CSW1a and CSW1b to the low level.

Then, at the timing T11 after the timing T10, the row scanning circuit 210 controls the transmission signals TRG0 to TRG3 to the high level throughout the pulse period.

In addition, the AD converters 271 in the 1st column and the 2nd column sample the reset level from the timing T10 to the timing T11 and sample a signal level from the timing T11 to the timing T12.

In this way, according to the third embodiment of the present technology, since two pixel blocks adjacent in the vertical direction output the pixel signals from mutually different columns, the pixel signals of the pixel blocks can be simultaneously subjected to the AD conversion.

4. Fourth Embodiment

According to the above-described first embodiment, all the circuits (the pixel array unit 220, the pixel addition control unit 240, and the like) in the solid-state image sensor 200 have been disposed on one semiconductor substrate. However, for a given optical size (the pixel array unit 220), it is necessary to miniaturize pixels in order to improve a resolution. This miniaturization results in an increase in a circuit area except for the pixels, such as an area of the AD converters 271 with an increase in the number of AD converters 271. That is, an area of the semiconductor substrate increases. Thus, when the solid-state image sensors 200 are stacked on a plurality of semiconductor substrates, the pixel array unit 220 is disposed on one substrate, and the others are disposed on the other substrates, the area of the semiconductor substrates can be further reduced than in a case in which the solid-state image sensors are not stacked. The solid-state image sensor 200 according to the fourth embodiment differs from that of the first embodiment in that a stacked structure of the solid-state image sensors 200 is realized to reduce the area of the semiconductor substrates.

Figure 25:
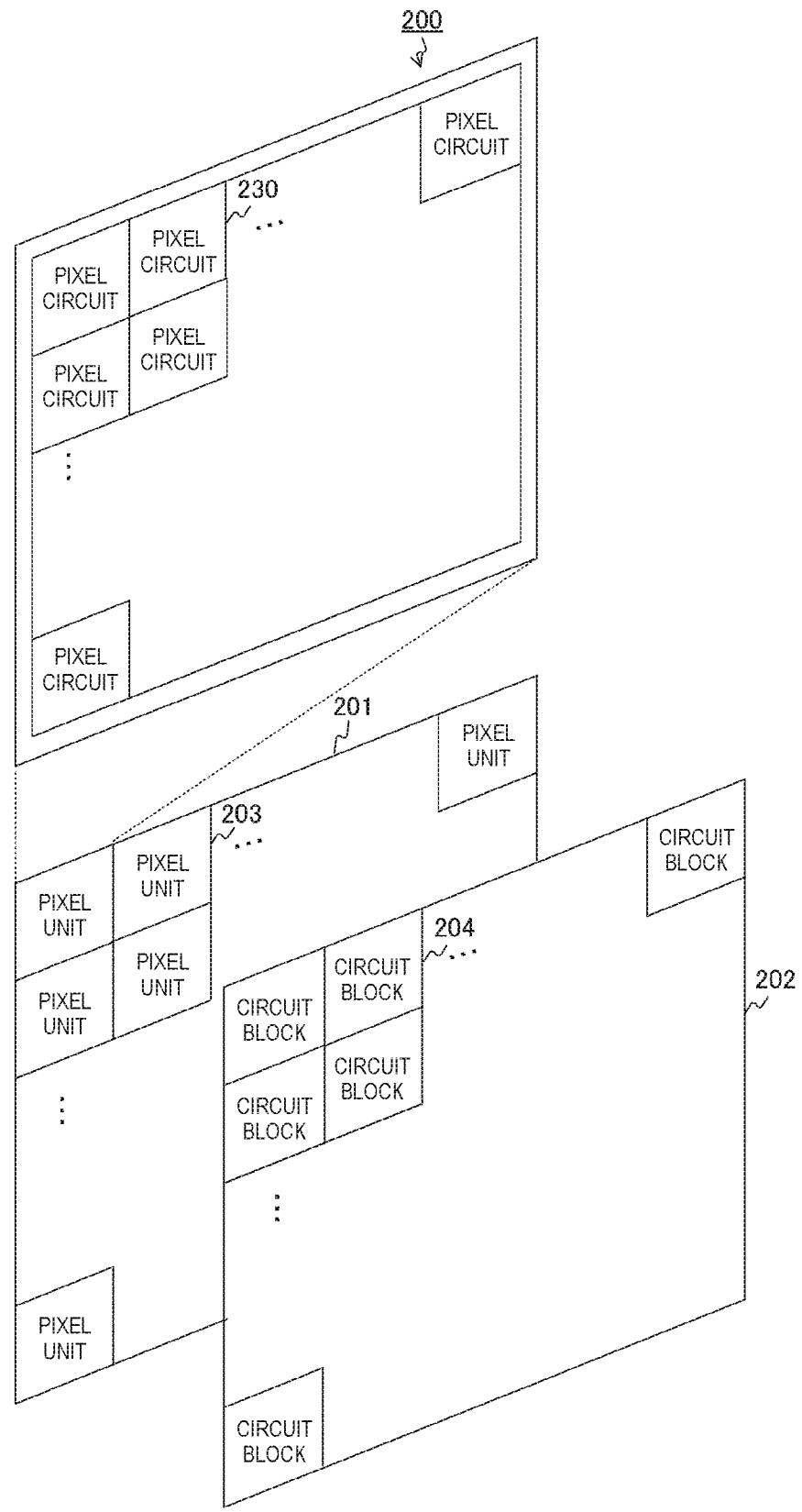
FIG. 25 is a general diagram illustrating a configuration example of a solid-state image sensor according to a fourth embodiment of the present technology.

FIG. 25 is a general diagram illustrating a configuration example of the solid-state image sensor 200 according to the fourth embodiment. The fourth solid-state image sensor 200 includes a lower semiconductor substrate 202 and an upper semiconductor substrate 201 stacked on the lower semiconductor substrate 202.

In the upper semiconductor substrate 201, a plurality of pixel units 203 are arrayed in a 2-dimensional lattice form. In each pixel unit 203, the plurality of pixel circuits 230 are arrayed in a 2-dimensional lattice form.

In the lower semiconductor substrate 202, the same number of circuit blocks 204 as the number of pixel units 203 is disposed in a 2-dimensional lattice form. The pixel units 203 and the circuit blocks 204 are connected one-to-one by through silicon vias (TSV) or bumps, Cu—Cu connection, or the like.

In each circuit block 204, the pixel addition control unit 240 and the AD conversion unit 270 are provided. In addition, in the lower semiconductor substrate 202, the row scanning circuit 210, the timing control unit 260, the column scanning circuit 280, and the image processing unit 290 are disposed. Note that the row scanning circuit 210, the timing control unit 260, the column scanning circuit 280, and the image processing unit 290 are not illustrated in FIG. 25.

Figure 26:
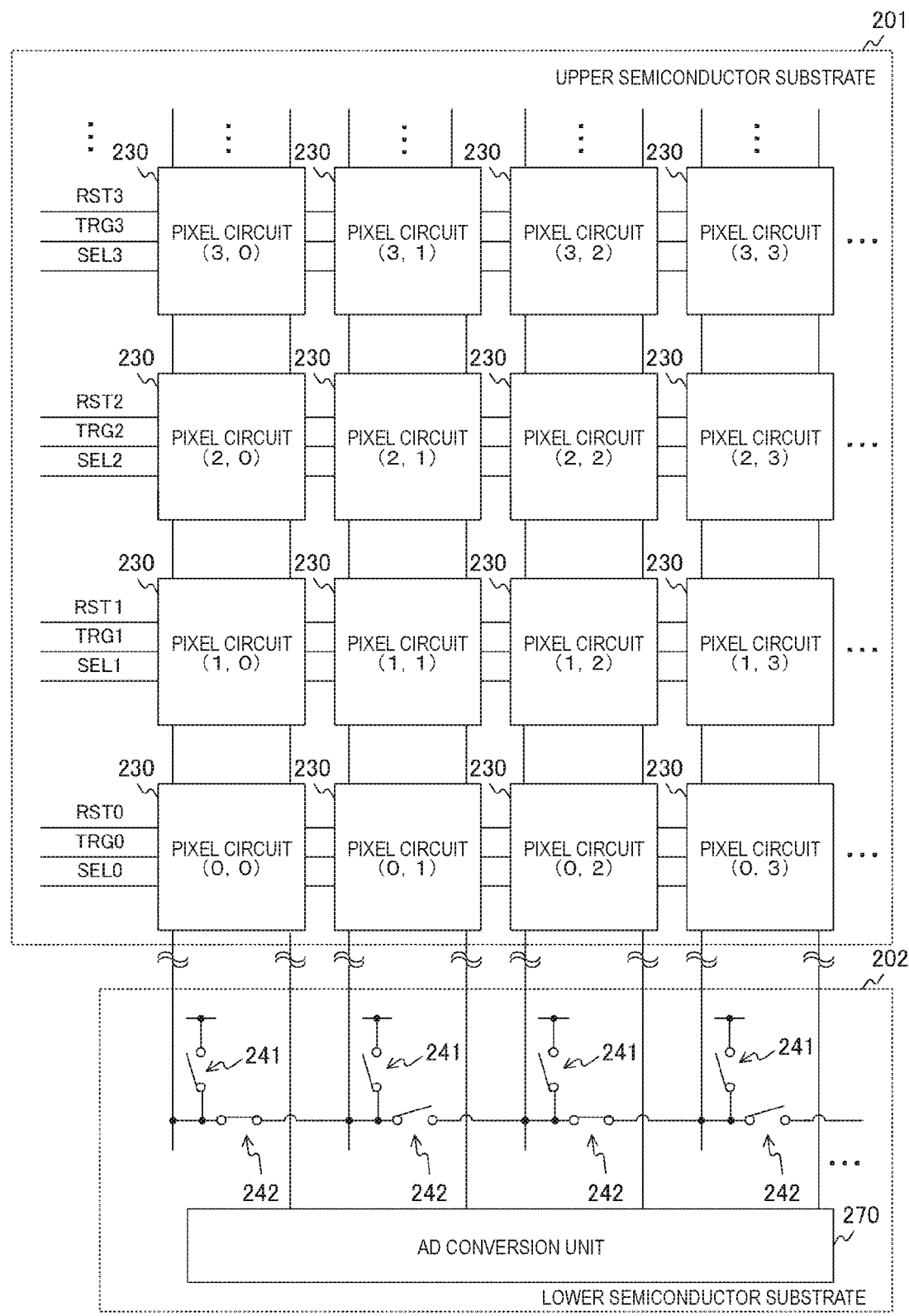
FIG. 26 is a diagram illustrating a configuration example of an upper semiconductor substrate and a lower semiconductor substrate according to the fourth embodiment of the present technology.

FIG. 26 is a diagram illustrating a configuration example of the upper semiconductor substrate 201 and the lower semiconductor substrate 202 according to the fourth embodiment. In the upper semiconductor substrate 201, the pixel circuits 230 are disposed in a 2-dimensional lattice form. In the lower semiconductor substrate 202, the pixel addition control unit 240 and the AD conversion unit 270 are provided.

Note that the pixel addition control unit 240 is disposed in the circuit block 204 inside the lower semiconductor substrate 202, but the pixel addition control unit 240 may be disposed in the upper semiconductor substrate 201. In addition, two semiconductor substrates are stacked, but three or more substrates may be stacked and circuits inside the solid-state image sensor 200 may be distributed and disposed in the substrates.

In this way, according to the fourth embodiment of the present technology, since the circuits inside the solid-state image sensor 200 are distributed and disposed in the stacked two semiconductor substrates, the area of the semiconductor substrates can be further reduced than in a case in which the semiconductor substrates are not stacked.

5. Fifth Embodiment

In the above-described solid-state image sensor 200, the floating diffusion layer 234 is provided for each pixel. In this configuration, a circuit size is larger than in a case in which a plurality of pixels share the floating diffusion layers 234. The solid-state image sensor 200 according to the fifth embodiment differs from that of the first embodiment in that the circuit size of the pixel array unit 220 is reduced.

Figure 27:
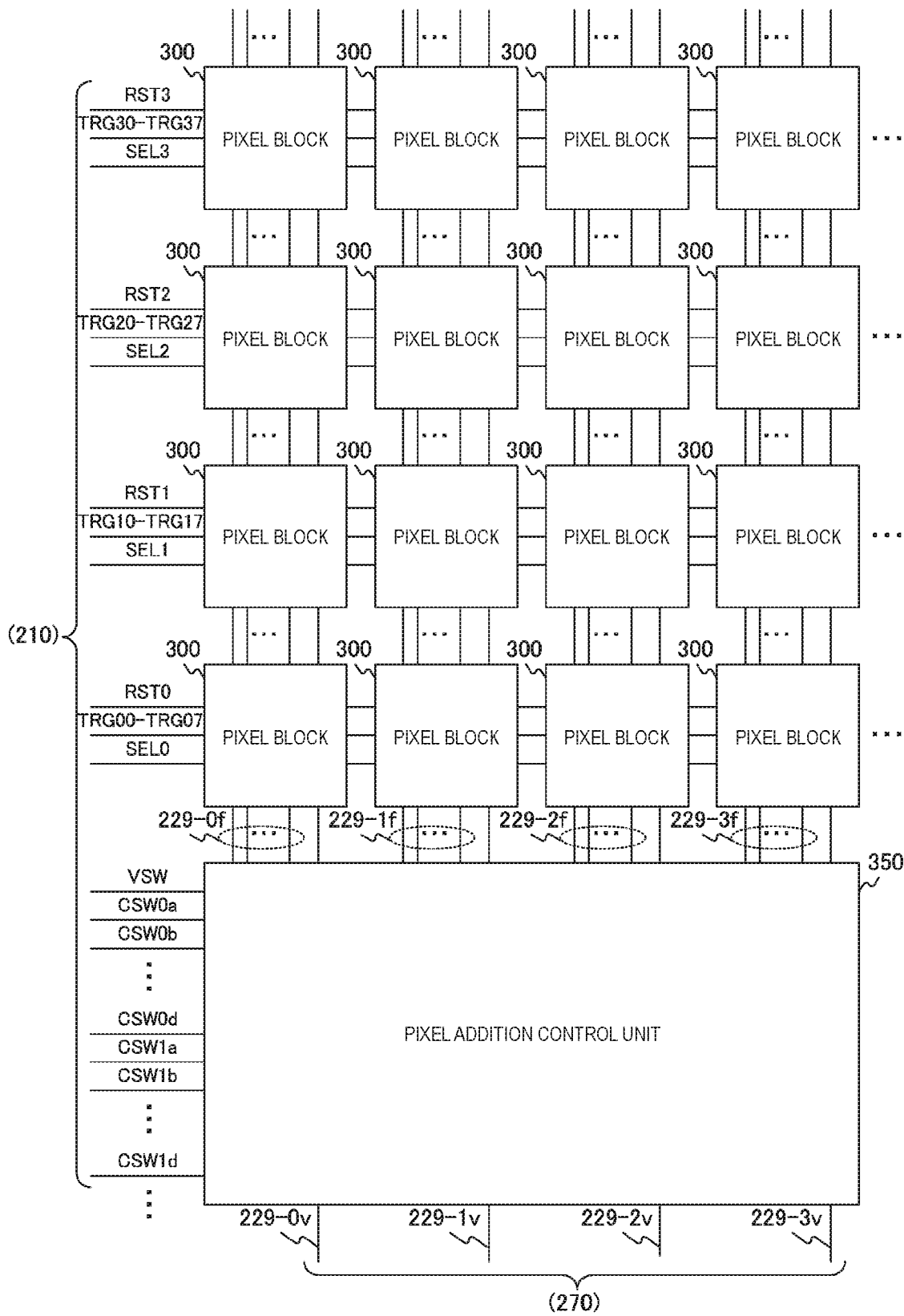
FIG. 27 is a block diagram illustrating a configuration example of a solid-state image sensor according to a fifth embodiment of the present technology.

FIG. 27 is a block diagram illustrating a configuration example of the solid-state image sensor 200 according to a fifth embodiment. In the pixel array unit 220 according to the fifth embodiment, pixel blocks 300 are disposed in a 2-dimensional lattice form. In each pixel block 300, pixels in 4 rows×2 columns are arrayed. The pixel block 300 is connected to a pixel addition control unit 350.

In addition, ten horizontal signal lines are wired for each block row. One of the ten horizontal signal lines in each row is a reset line in which a reset signal RSTn is transmitted, and eight horizontal signal lines are transmission lines in which transmission signals TRGn0 to TRGn7 are transmitted, and the remaining one horizontal signal line is a selection line in which a selection signal SELn is transmitted. In addition, connection lines 229-*ma* to 229-*me* and a vertical signal line 229-*mv* are wired for each block row.

Each solid-state image sensor 200 can perform pixel addition in units of addition blocks formed by the plurality of pixel blocks 300. Four addition blocks adjacent in the vertical direction are connected to mutually different connection lines. In addition, the number of columns of the addition block is 4 columns. Then, the four addition blocks adjacent in the vertical direction simultaneously output pixel signals from the mutually different vertical signal lines under the control of the row scanning circuit 210.

Note that the size of the pixel block is not limited to the 4 rows×2 columns. In addition, the number of connection lines for each column is not limited to 4 either and may be 1.

Figure 28:
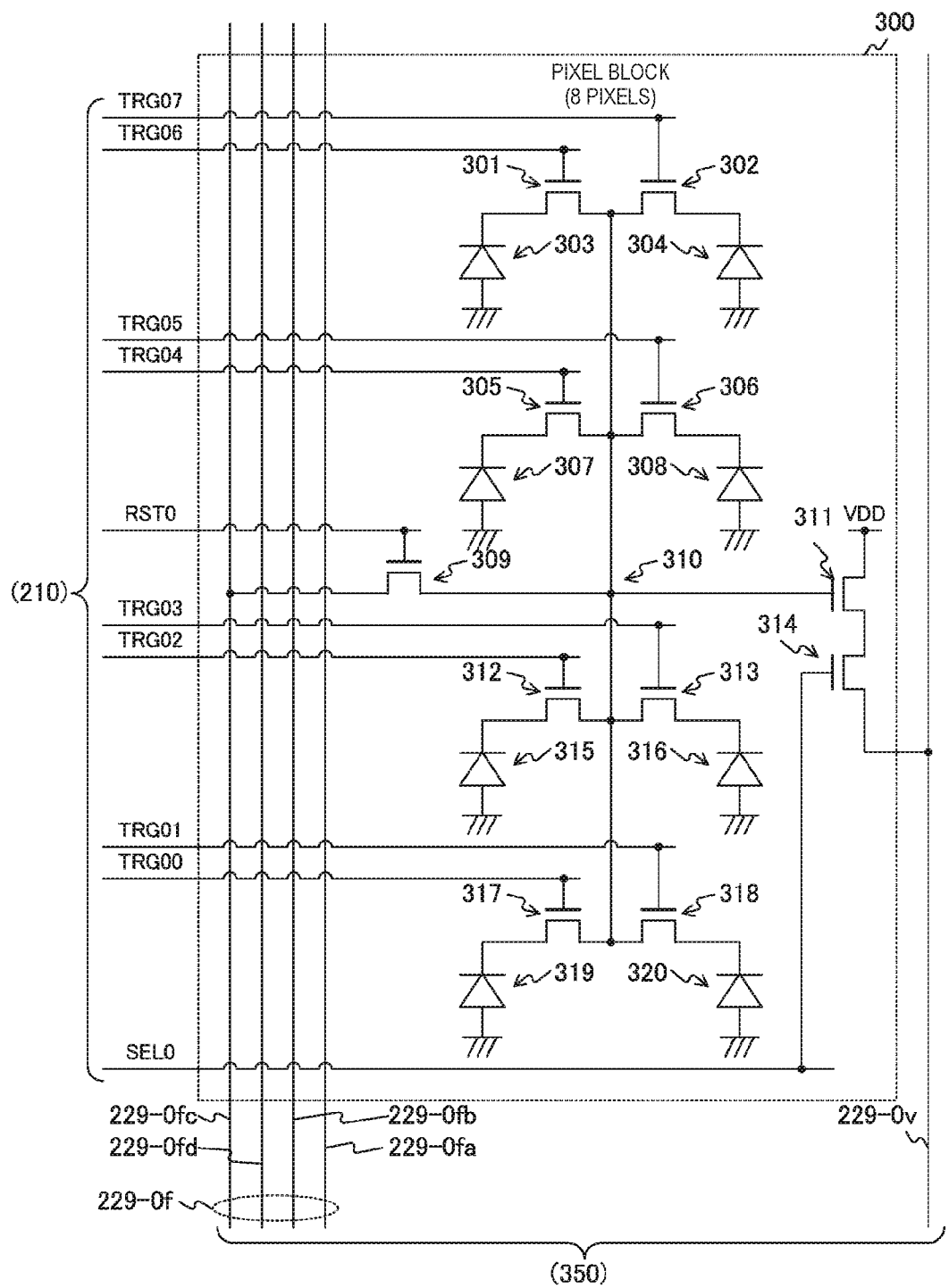
FIG. 28 is a circuit diagram illustrating a configuration example of a pixel block according to the fifth embodiment of the present technology.

FIG. 28 is a circuit diagram illustrating a configuration example of a pixel block 300 according to the fifth embodiment. The pixel block 300 includes photoelectric conversion elements 303, 304, 307, 308, 315, 316, 319, 320, and transmission transistors 301, 302, 305, 306, 312, 313, 317, and 318. In addition, the pixel block 300 includes a reset transistor 309, a floating diffusion layer 310, an amplification transistor 311, and a selection transistor 314.

The transmission transistors 301, 302, 305, 306, 312, 313, 317, and 318 are connected to mutually different photoelectric conversion elements and transmit charges from the corresponding photoelectric conversion elements to the floating diffusion layers 310. In addition, the transmission transistors are driven in accordance with the transmission signals TRGn0 to TRGn7. The reset transistor 309, the floating diffusion layer 310, the amplification transistor 311, and the selection transistor 314 are shared by eight pixels.

Figure 29:
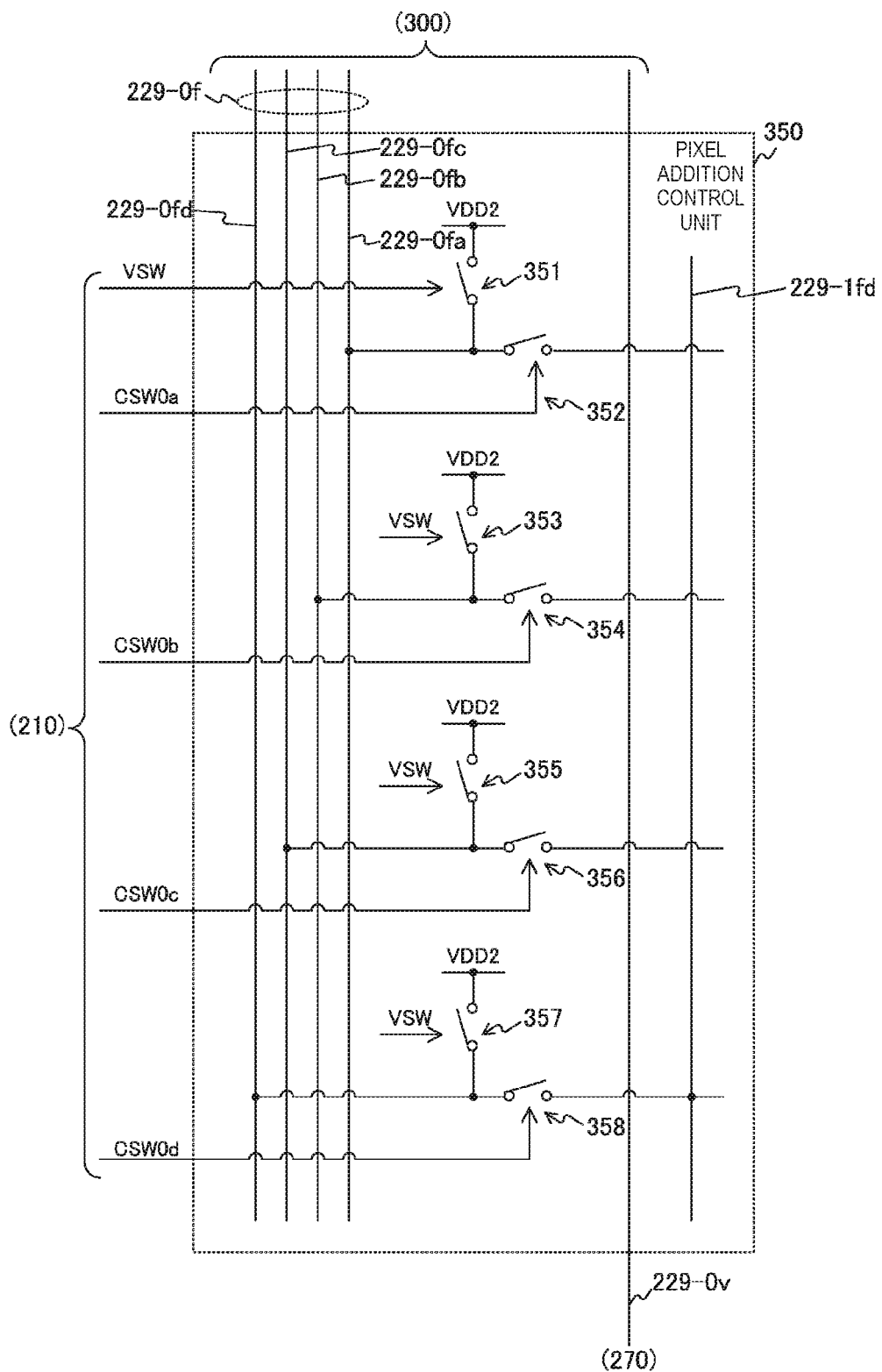
FIG. 29 is a circuit diagram illustrating a configuration example of a pixel addition control unit according to the fifth embodiment of the present technology.

FIG. 29 is a circuit diagram illustrating a configuration example of a pixel addition control unit 350 according to the fifth embodiment. The pixel addition control unit 350 includes switches 351 to 358 for each block column.

The switch 351 opens and closes a path between the connection line 229-*ma* and a power supply in accordance with the power switch signal VSW. The switch 353 opens and closes a path between the connection line 229-*mb* and the power supply in accordance with the power switch signal VSW. The switch 355 opens and closes a path between the connection line 229-*mc* and the power supply in accordance with the power switch signal VSW. The switch 357 opens and closes a path between the connection line 229-*md* and the power supply in accordance with the power switch signal VSW.

In addition, the switch 352 opens and closes a path between the connection line 229-*ma* and a connection line 229-(*m*+1)a in accordance with the column switch signal CSWma. The switch 354 opens and closes a path between the connection line 229-*mb* and a connection line 229-(*m*+1)b in accordance with the column switch signal CSWmb. The switch 356 opens and closes a path between the connection line 229-*mc* and a connection line 229-(*m*+1)c in accordance with a column switch signal CSWmc. The switch 358 opens and closes a path between the connection line 229-*md* and a connection line 229-(*m*+1)d in accordance with a column switch signal CSWmd.

In this way, according to the fifth embodiment of the present technology, the plurality of pixels inside the pixel block 300 share the transistors other than the floating diffusion layer 310 and the transmission transistor. Therefore, it is possible to reduce the circuit size of the pixel array unit 220 compared to the transistors are not shared.

First Application Example

The technology according to the present disclosure can be applied to various products. For example, the technology according to the present disclosure may be applied to an endoscopic surgical system.

Figure 30:
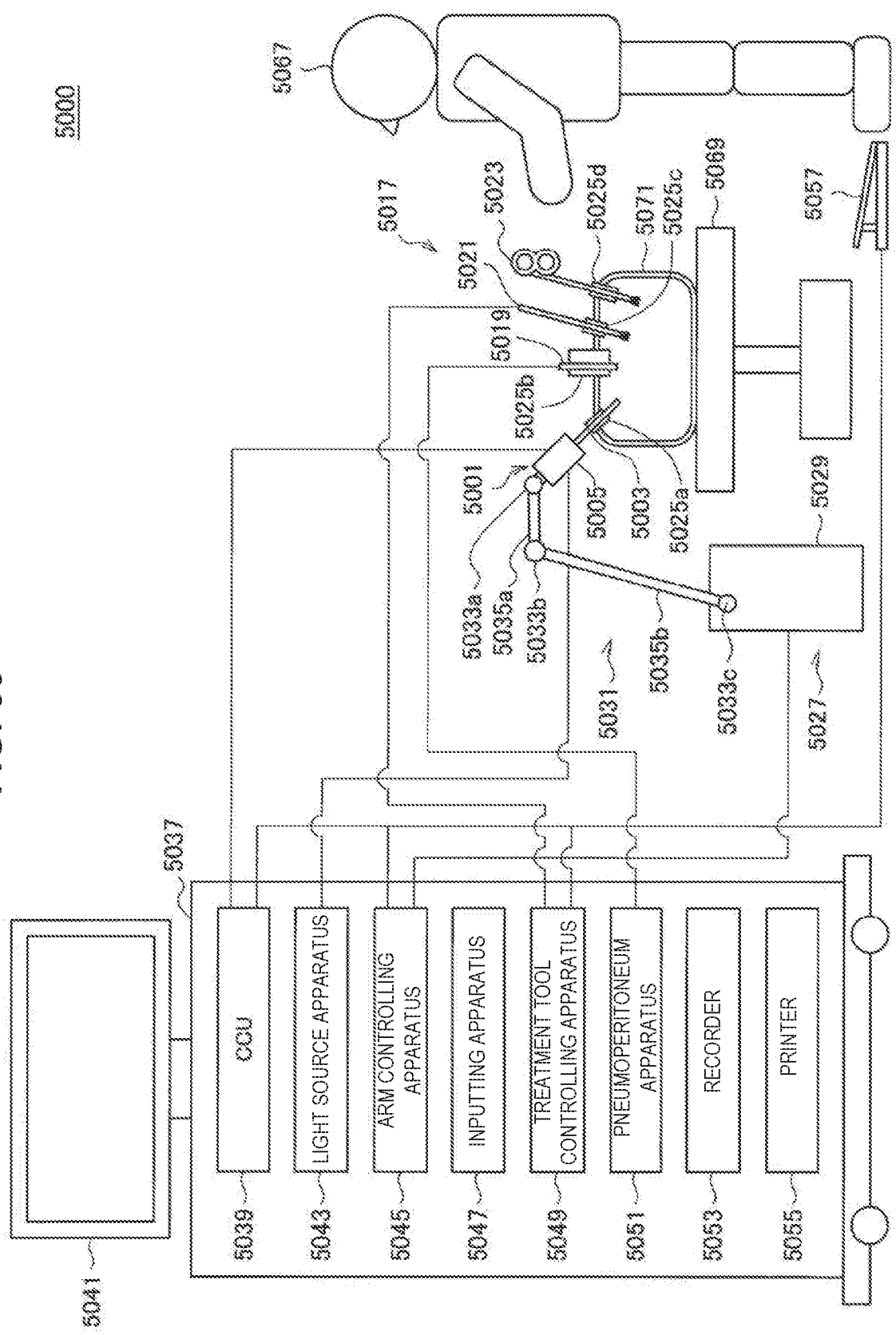
FIG. 30 is a view depicting an example of a schematic configuration of an endoscopic surgery system.

FIG. 30 is a view depicting an example of a schematic configuration of an endoscopic surgery system 5000 to which the technology according to an embodiment of the present disclosure can be applied. In FIG. 30, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body cavity of the patient 5071 through the trocars 5025a to 5025d. In the example depicted, as the other surgical tools 5017, a pneumoperitoneum tube 5019, an energy device 5021 and forceps 5023 are inserted into body cavity of the patient 5071. Further, the energy device 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, tweezers or a retractor may be used.

An image of a surgical region in a body cavity of the patient 5071 imaged by the endoscope 5001 is displayed on a display apparatus 5041. The surgeon 5067 would use the energy device 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy device 5021 and the forceps 5023 are supported by the surgeon 5067, an assistant or the like during surgery.

(Supporting Arm Apparatus)

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

(Endoscope)

The endoscope 5001 includes the lens barrel 5003 which has a region of a predetermined length from a distal end thereof to be inserted into a body cavity of the patient 5071, and a camera head 5005 connected to a proximal end of the lens barrel 5003. In the example depicted, the endoscope 5001 is depicted as a rigid endoscope having the lens barrel 5003 of the hard type. However, the endoscope 5001 may otherwise be configured as a flexible endoscope having the lens barrel 5003 of the flexible type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body cavity of the patient 5071 through the objective lens. It is to be noted that the endoscope 5001 may be a forward-viewing endoscope or may be an oblique-viewing endoscope or a side-viewing endoscope.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

(Various Apparatus Incorporated in Cart)

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy device 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy device 5021 for cautery or incision of a tissue, sealing of a blood vessel or the like. A pneumoperitoneum apparatus 5051 feeds gas into a body cavity of the patient 5071 through the pneumoperitoneum tube 5019 to inflate the body cavity in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

(Supporting Arm Apparatus)

The supporting arm apparatus 5027 includes the base unit 5029 serving as a base, and the arm unit 5031 extending from the base unit 5029. In the example depicted, the arm unit 5031 includes the plurality of joint portions 5033a, 5033b and 5033c and the plurality of links 5035a and 5035b connected to each other by the joint portion 5033b. In FIG. 30, for simplified illustration, the configuration of the arm unit 5031 is depicted in a simplified form. Actually, the shape, number and arrangement of the joint portions 5033a to 5033c and the links 5035a and 5035b and the direction and so forth of axes of rotation of the joint portions 5033a to 5033c can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body cavity of the patient 5071.

An actuator is provided in each of the joint portions 5033a to 5033c, and the joint portions 5033a to 5033c are configured such that they are rotatable around predetermined axes of rotation thereof by driving of the respective actuators. The driving of the actuators is controlled by the arm controlling apparatus 5045 to control the rotational angle of each of the joint portions 5033a to 5033c thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the operating room.

Further, where force control is applied, the arm controlling apparatus 5045 may perform power-assisted control to drive the actuators of the joint portions 5033*a* to 5033*c* such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033*a* to 5033*c* of the arm unit 5031 of the supporting arm apparatus 5027 such that the plurality of arm controlling apparatus 5045 cooperate with each other to implement driving control of the arm unit 5031.

(Light Source Apparatus)

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower wavelength band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

(Camera Head and CCU)

Figure 31:
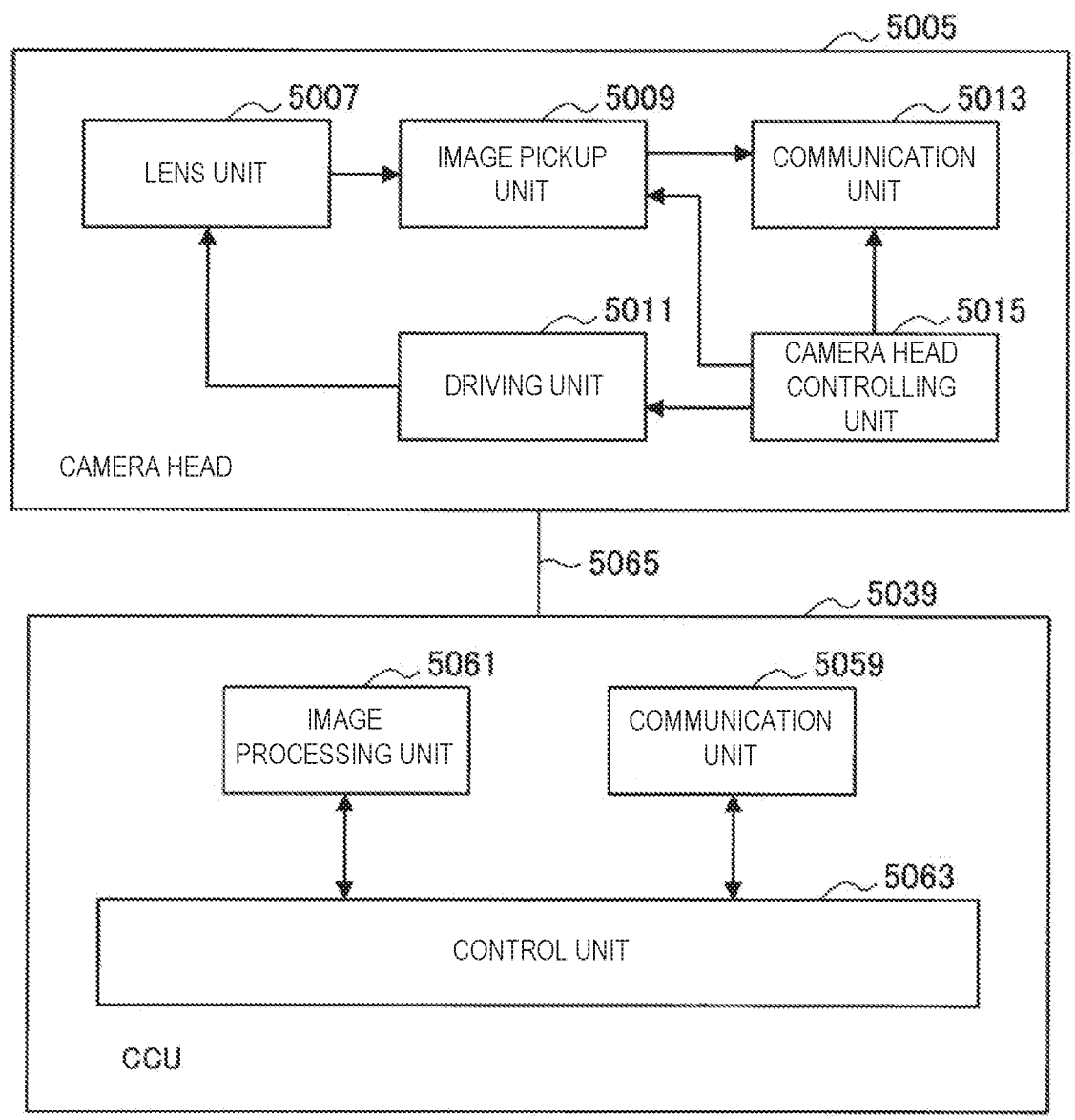
FIG. 31 is a block diagram depicting an example of a functional configuration of a camera head and a camera control unit (CCU) depicted in FIG. 30.

Functions of the camera head 5005 of the endoscope 5001 and the CCU 5039 are described in more detail with reference to FIG. 31. FIG. 31 is a block diagram depicting an example of a functional configuration of the camera head 5005 and the CCU 5039 depicted in FIG. 30.

Referring to FIG. 31, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided corresponding to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy device 5021 is used and so forth by detecting the shape, color and so forth of edges of the objects included in the surgical region image. The control unit 5063 causes, when it controls the display unit 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the operating room. Therefore, such a situation that movement of medical staff in the operating room is disturbed by the transmission cable 5065 can be eliminated.

An example of the endoscopic surgery system 5000 to which the technology according to an embodiment of the present disclosure can be applied has been described above. It is to be noted here that, although the endoscopic surgery system 5000 has been described as an example, the system to which the technology according to an embodiment of the present disclosure can be applied is not limited to the example. For example, the technology according to an embodiment of the present disclosure may be applied to a flexible endoscopic system for inspection or a microscopic surgery system.

The technology according to the present disclosure can be preferably applied to the camera head 5005 exemplified in FIG. 31 in the above-described configuration. Specifically, the solid-state image sensor 200 exemplified in FIG. 2 is used in the image pickup unit 5009 in the camera head 5005. Since the addition unit of the pixel addition can be voluntarily changed by applying the solid-state image sensor 200, convenience of the endoscopic surgery system 5000 can be improved.

Second Application Example

The technology according to the present disclosure can be applied to various products. For example, the technology according to the present disclosure may be applied to a surgery room system.

Figure 32:
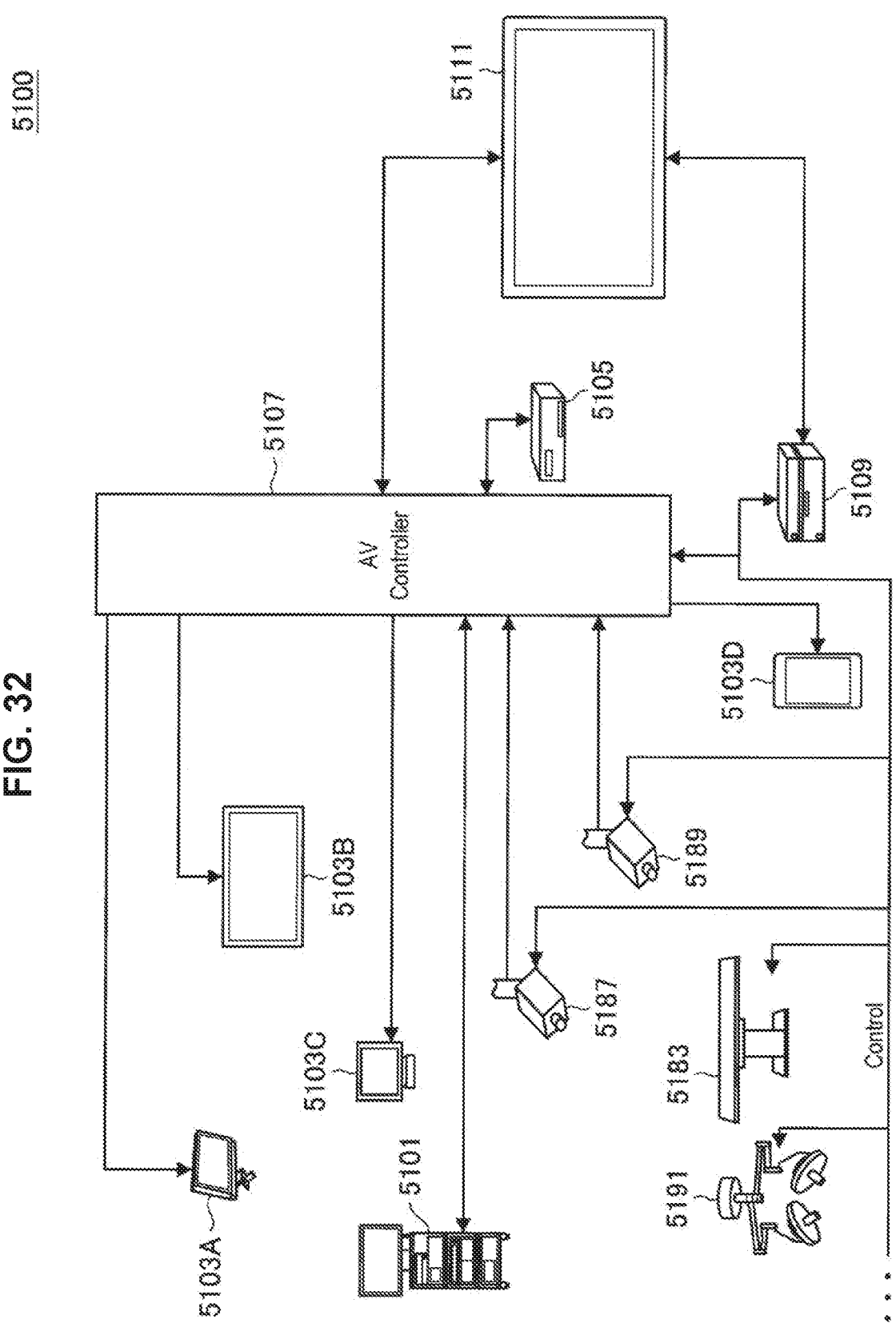
FIG. 32 is a view schematically depicting a general configuration of a surgery room system.

FIG. 32 is a view schematically depicting a general configuration of a surgery room system 5100 to which the technology according to an embodiment of the present disclosure can be applied. Referring to FIG. 32, the surgery room system 5100 is configured such that a group of apparatus installed in a surgery room are connected for cooperation with each other through an audiovisual (AV) controller 5107 and a surgery room controlling apparatus 5109.

In the surgery room, various apparatus may be installed. In FIG. 32, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of a surgery room and images the hands of a surgeon. The surgery field camera 5189 is provided on the ceiling of the surgery room and images a state of the entire surgery room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the surgery room separately from the endoscopic surgery system 5113. The apparatus which do not belong to the endoscopic surgery system 5113 are referred to also as non-medical equipment. The audiovisual controller 5107 and/or the surgery room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the surgery room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body lumen of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire surgery room may be transmitted as display information. It is to be noted that, if a different apparatus having an image pickup function exists in the surgery room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the surgery room; the display apparatus 5103B is a display apparatus installed on a wall face of the surgery room; the display apparatus 5103C is a display apparatus installed on a desk in the surgery room; and the display apparatus 5103D is a mobile apparatus (for example, a tablet personal computer (PC)) having a display function.

Further, though not depicted in FIG. 32, the surgery room system 5100 may include an apparatus outside the surgery room. The apparatus outside the surgery room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The surgery room controlling apparatus 5109 integrally controls processes other than processes relating to image display on the non-medical equipment. For example, the surgery room controlling apparatus 5109 controls driving of the patient bed 5183, the ceiling camera 5187, the surgery field camera 5189 and the illumination 5191.

In the surgery room system 5100, a centralized operation panel 5111 is provided such that it is possible to issue an instruction regarding image display to the audiovisual controller 5107 or issue an instruction regarding operation of the non-medical equipment to the surgery room controlling apparatus 5109 through the centralized operation panel 5111. The centralized operation panel 5111 is configured by providing a touch panel on a display face of a display apparatus.

Figure 33:
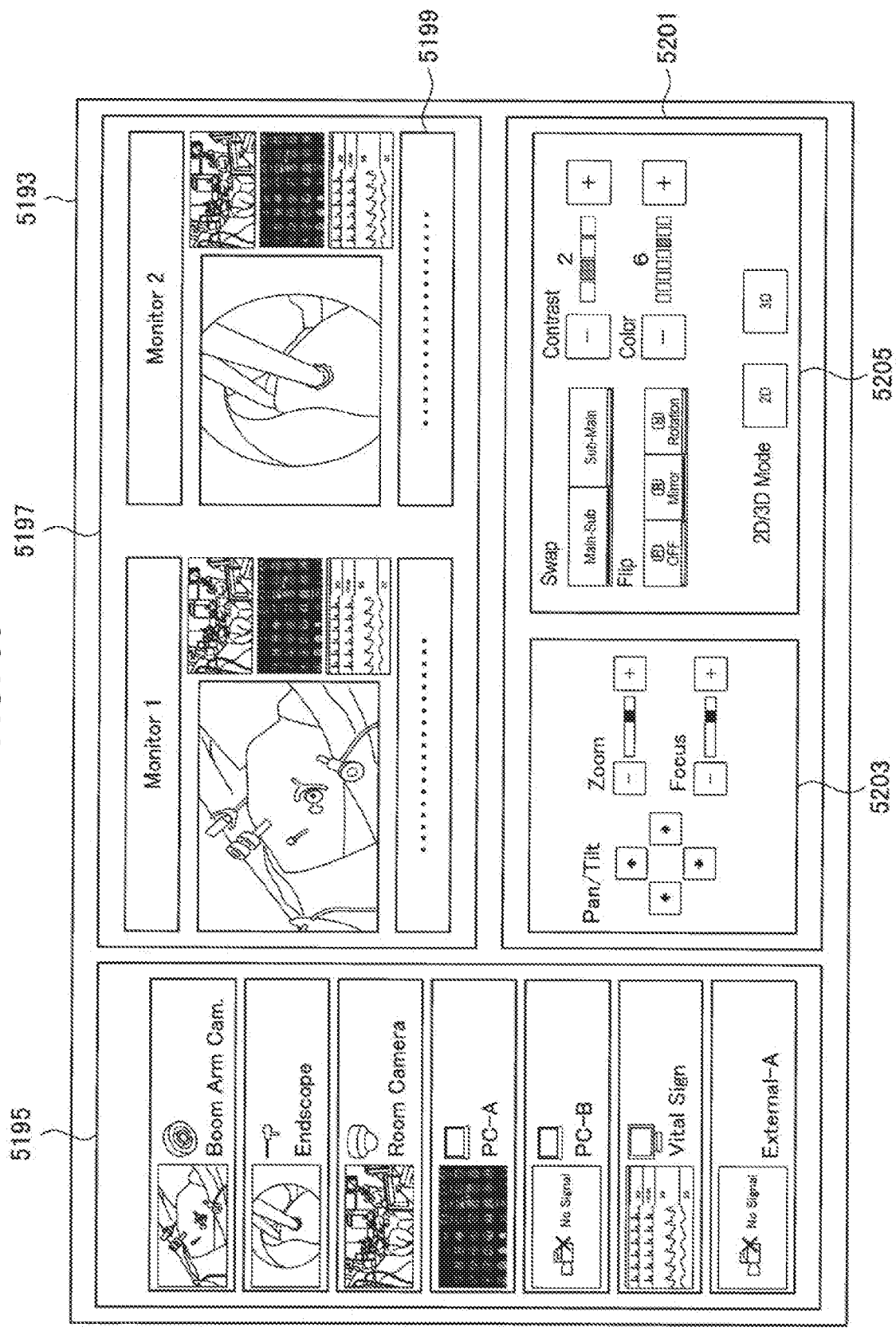
FIG. 33 is a view depicting an example of display of an operation screen image of a centralized operation panel.

FIG. 33 is a view depicting an example of display of an operation screen image on the centralized operation panel 5111. In FIG. 33, as an example, an operation screen image is depicted which corresponds to a case in which two display apparatus are provided as apparatus of an output destination in the surgery room system 5100. Referring to FIG. 33, the operation screen image 5193 includes a sending source selection region 5195, a preview region 5197 and a control region 5201.

In the sending source selection region 5195, the sending source apparatus provided in the surgery room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the surgery room controlling apparatus 5109 provided in the surgery room system 5100 through the centralized operation panel 5111.

Figure 34:
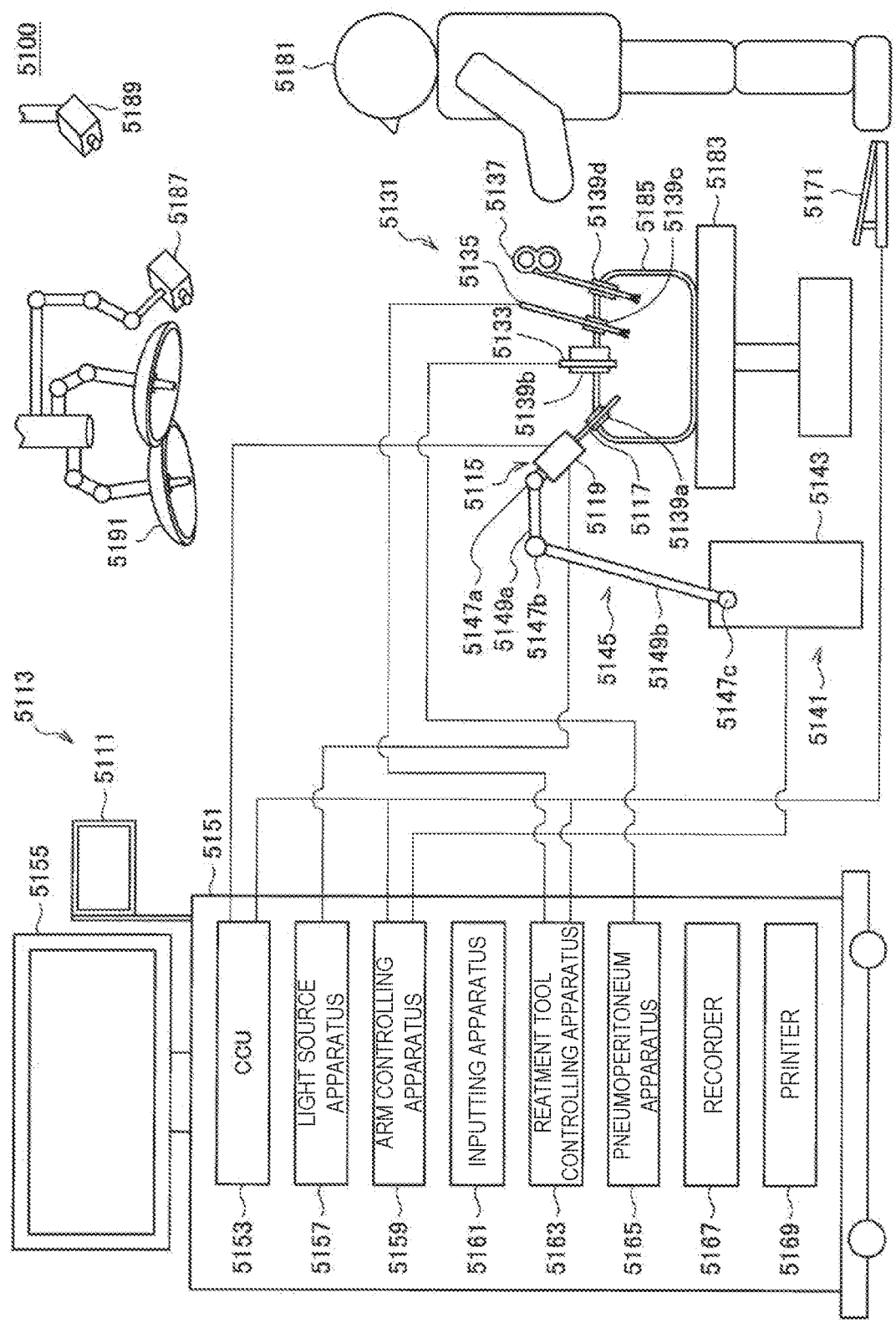
FIG. 34 is a view illustrating an example of a state of surgery to which the surgery room system is applied.

FIG. 34 is a view illustrating an example of a state of surgery to which the surgery room system described above is applied. The ceiling camera 5187 and the surgery field camera 5189 are provided on the ceiling of the surgery room such that it can image the hands of a surgeon (medical doctor) 5181 who performs treatment for an affected area of a patient 5185 on the patient bed 5183 and the entire surgery room. The ceiling camera 5187 and the surgery field camera 5189 may include a magnification adjustment function, a focal distance adjustment function, an imaging direction adjustment function and so forth. The illumination 5191 is provided on the ceiling of the surgery room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the surgery room controlling apparatus 5109 (not depicted in FIG. 34) as depicted in FIG. 32. The centralized operation panel 5111 is provided in the surgery room, and the user can suitably operate the apparatus existing in the surgery room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139*a* to 5139*d* are used to puncture the abdominal wall. Then, a lens barrel 5117 of the endoscope 5115 and the other surgical tools 5131 are inserted into body lumens of the patient 5185 through the trocars 5139*a* to 5139*d*. In the example depicted, as the other surgical tools 5131, a pneumoperitoneum tube 5133, an energy treatment tool 5135 and forceps 5137 are inserted into body lumens of the patient 5185. Further, the energy treatment tool 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, a pair of tweezers or a retractor may be used.

An image of a surgical region in a body lumen of the patient 5185 picked up by the endoscope 5115 is displayed on a display apparatus 5155. The surgeon 5181 would use the energy treatment tool 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy treatment tool 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147*a*, 5147*b* and 5147*c* and links 5149*a* and 5149*b* and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body lumen of the patient 5185, and a camera head 5119 connected to a proximal end of the lens barrel 5117. In the example depicted, the endoscope 5115 is depicted which is configured as a hard mirror having the lens barrel 5117 of the hard type. However, the endoscope 5115 may otherwise be configured as a soft mirror having the lens barrel 5117 of the soft type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body lumen of the patient 5185 through the objective lens. It is to be noted that the endoscope 5115 may be a direct view mirror or may be a perspective view mirror or a side view mirror.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 32 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy treatment tool 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy treatment tool 5135 for cautery or incision of a tissue, sealing of a blood vessel or the like. A pneumoperitoneum apparatus 5165 feeds gas into a body lumen of the patient 5185 through the pneumoperitoneum tube 5133 to inflate the body lumen in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 34, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body lumen of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the surgery room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 35:
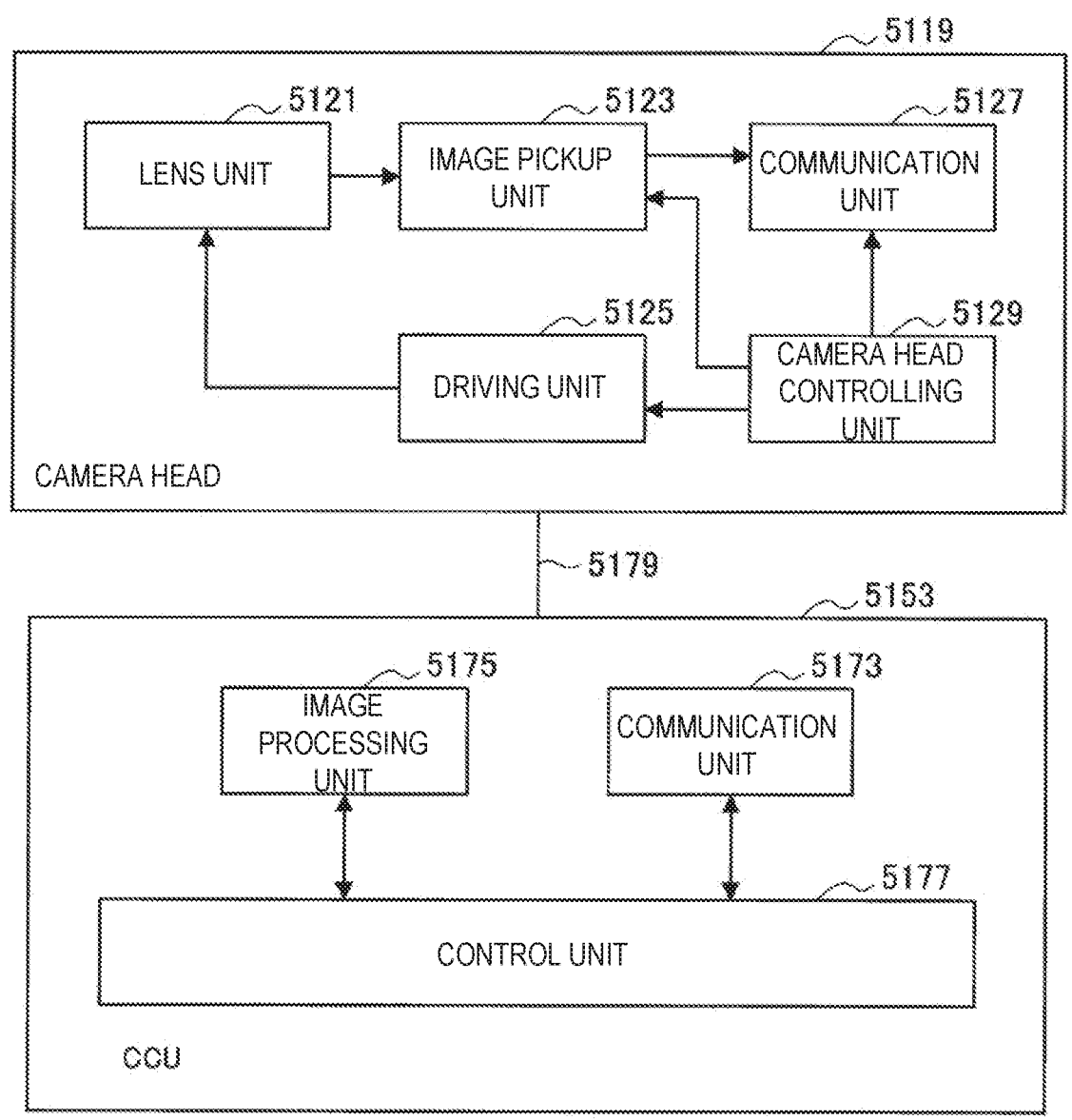
FIG. 35 is a block diagram depicting an example of a functional configuration of a camera head and a camera control unit (CCU) depicted in FIG. 34.

Functions of the camera head 5119 of the endoscope 5115 and the CCU 5153 are described in more detail with reference to FIG. 35. FIG. 35 is a block diagram depicting an example of a functional configuration of the camera head 5119 and the CCU 5153 depicted in FIG. 34.

Referring to FIG. 35, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also, the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy treatment tool 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the surgery room. Therefore, such a situation that movement of medical staff in the surgery room is disturbed by the transmission cable 5179 can be eliminated.

An example of the surgery room system 5100 to which the technology according to an embodiment of the present disclosure can be applied has been described above. It is to be noted here that, although a case in which the medical system to which the surgery room system 5100 is applied is the endoscopic surgery system 5113 has been described as an example, the configuration of the surgery room system 5100 is not limited to that of the example described above. For example, the surgery room system 5100 may be applied to a soft endoscopic system for inspection or a microscopic surgery system in place of the endoscopic surgery system 5113.

The technology according to the present disclosure can be preferably applied to the camera head 5119 exemplified in FIG. 35 in the above-described configuration. Specifically, the solid-state image sensor 200 exemplified in FIG. 2 is used in the image pickup unit 5123 in the camera head 5119. Since the addition unit of the pixel addition can be voluntarily changed by applying the solid-state image sensor 200, convenience of the surgery room system 5100 can be improved.

Third Application Example

The technology according to the present disclosure can be applied to various products. For example, the technology according to the present disclosure may be applied to a microscopic surgery system used for so-called microsurgery performed while expanding and observing a minute part of a patient.

Figure 36:
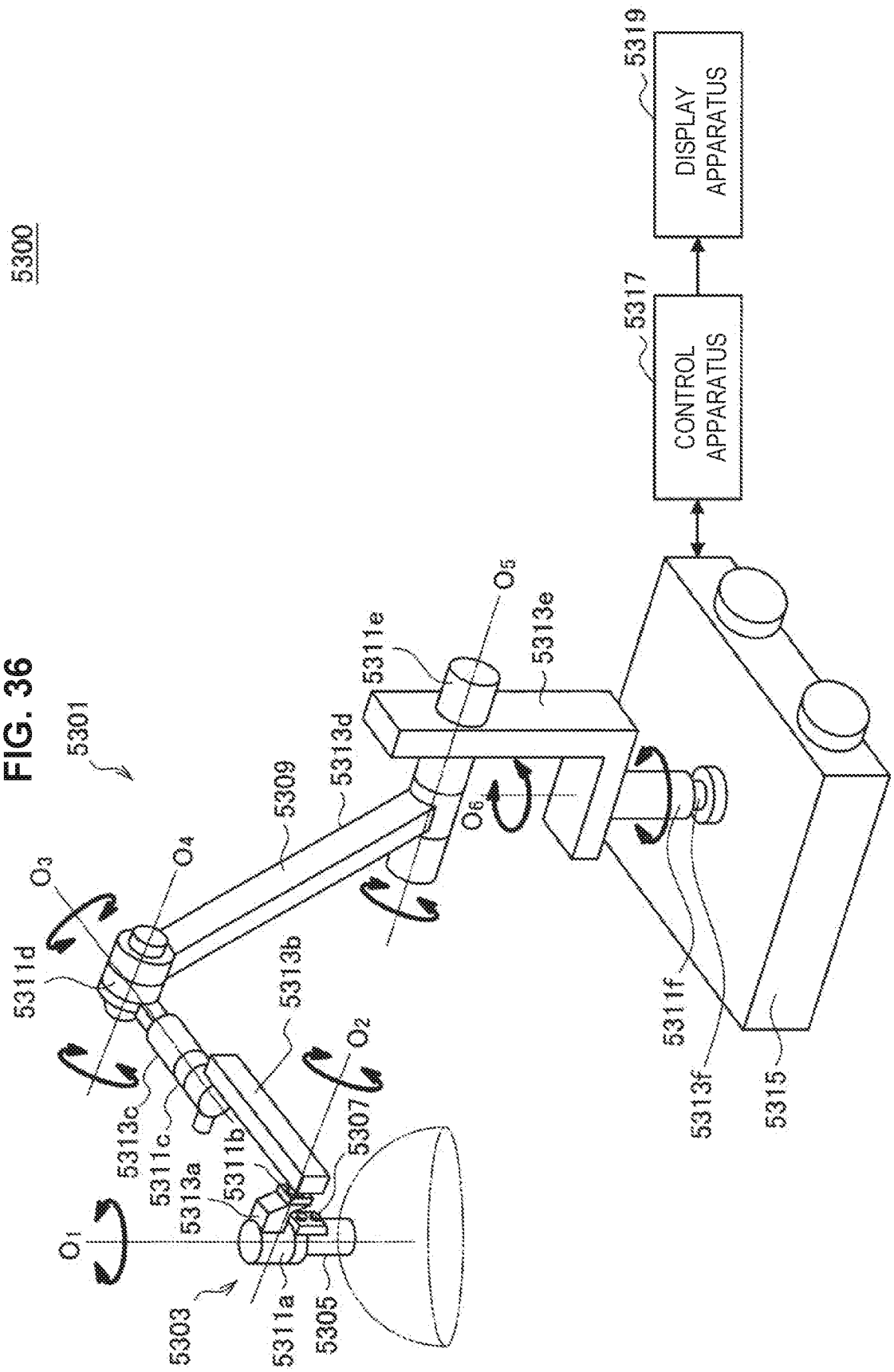
FIG. 36 is a view depicting an example of a schematic configuration of a microscopic surgery system.

FIG. 36 is a view depicting an example of a schematic configuration of a microscopic surgery system 5300 to which the technology according to an embodiment of the present disclosure can be applied. Referring to FIG. 36, the microscopic surgery system 5300 includes a microscope apparatus 5301, a control apparatus 5317 and a display apparatus 5319. It is to be noted that, in the description of the microscopic surgery system 5300, the term "user" signifies an arbitrary one of medical staff members such as a surgery or an assistant who uses the microscopic surgery system 5300.

The microscope apparatus 5301 has a microscope unit 5303 for enlarging an observation target (surgical region of a patient) for observation, an arm unit 5309 which supports the microscope unit 5303 at a distal end thereof, and a base unit 5315 which supports a proximal end of the arm unit 5309.

The microscope unit 5303 includes a cylindrical portion 5305 of a substantially cylindrical shape, an image pickup unit (not depicted) provided in the inside of the cylindrical portion 5305, and an operation unit 5307 provided in a partial region of an outer circumference of the cylindrical portion 5305. The microscope unit 5303 is a microscope unit of the electronic image pickup type (microscope unit of the video type) which picks up an image electronically by the image pickup unit.

A cover glass member for protecting the internal image pickup unit is provided at an opening face of a lower end of the cylindrical portion 5305. Light from an observation target (hereinafter referred to also as observation light) passes through the cover glass member and enters the image pickup unit in the inside of the cylindrical portion 5305. It is to be noted that a light source includes, for example, a light emitting diode (LED) or the like may be provided in the inside of the cylindrical portion 5305, and upon image picking up, light may be irradiated upon an observation target from the light source through the cover glass member.

The image pickup unit includes an optical system which condenses observation light, and an image pickup element which receives the observation light condensed by the optical system. The optical system includes a combination of a plurality of lenses including a zoom lens and a focusing lens. The optical system has optical properties adjusted such that the observation light is condensed to be formed image on a light receiving face of the image pickup element. The image pickup element receives and photoelectrically converts the observation light to generate a signal corresponding to the observation light, namely, an image signal corresponding to an observation image. As the image pickup element, for example, an image pickup element which has a Bayer array and is capable of picking up an image in color is used. The image pickup element may be any of various known image pickup elements such as a complementary metal oxide semiconductor (CMOS) image sensor or a charge coupled device (CCD) image sensor. The image signal generated by the image pickup element is transmitted as RAW data to the control apparatus 5317. Here, the transmission of the image signal may be performed suitably by optical communication. This is because, since, at a surgery site, the surgeon performs surgery while observing the state of an affected area through a picked up image, in order to achieve surgery with a higher degree of safety and certainty, it is demanded for a moving image of the surgical region to be displayed on the real time basis as far as possible. Where optical communication is used to transmit the image signal, the picked up image can be displayed with low latency.

It is to be noted that the image pickup unit may have a driving mechanism for moving the zoom lens and the focusing lens of the optical system thereof along the optical axis. Where the zoom lens and the focusing lens are moved suitably by the driving mechanism, the magnification of the picked up image and the focal distance upon image picking up can be adjusted. Further, the image pickup unit may incorporate therein various functions which may be provided generally in a microscopic unit of the electronic image pickup such as an auto exposure (AE) function or an auto focus (AF) function.

Further the image pickup unit may be configured as an image pickup unit of the single-plate type which includes a single image pickup element or may be configured as an image pickup unit of the multi-plate type which includes a plurality of image pickup elements. Where the image pickup unit is configured as that of the multi-plate type, for example, image signals corresponding to red, green, and blue colors may be generated by the image pickup elements and may be synthesized to obtain a color image. Alternatively, the image pickup unit may be configured such that it has a pair of image pickup elements for acquiring image signals for the right eye and the left eye compatible with a stereoscopic vision (three dimensional (3D) display). Where 3D display is applied, the surgeon can comprehend the depth of a living body tissue in the surgical region with a higher degree of accuracy. It is to be noted that, if the image pickup unit is configured as that of stereoscopic type, then a plurality of optical systems are provided corresponding to the individual image pickup elements.

The operation unit 5307 includes, for example, a cross lever, a switch or the like and accepts an operation input of the user. For example, the user can input an instruction to change the magnification of the observation image and the focal distance to the observation target through the operation unit 5307. The magnification and the focal distance can be adjusted by the driving mechanism of the image pickup unit suitably moving the zoom lens and the focusing lens in accordance with the instruction. Further, for example, the user can input an instruction to switch the operation mode of the arm unit 5309 (an all-free mode and a fixed mode hereinafter described) through the operation unit 5307. It is to be noted that when the user intends to move the microscope unit 5303, it is supposed that the user moves the microscope unit 5303 in a state in which the user grasps the microscope unit 5303 holding the cylindrical portion 5305. Accordingly, the operation unit 5307 is preferably provided at a position at which it can be operated readily by the fingers of the user with the cylindrical portion 5305 held such that the operation unit 5307 can be operated even while the user is moving the cylindrical portion 5305.

The arm unit 5309 is configured such that a plurality of links (first link 5313*a* to sixth link 53130 are connected for rotation relative to each other by a plurality of joint portions (first joint portion 5311*a* to sixth joint portion 5311*f*).

The first joint portion 5311*a* has a substantially columnar shape and supports, at a distal end (lower end) thereof, an upper end of the cylindrical portion 5305 of the microscope unit 5303 for rotation around an axis of rotation (first axis $O_1$) parallel to the center axis of the cylindrical portion 5305. Here, the first joint portion 5311*a* may be configured such that the first axis $O_1$ thereof is in alignment with the optical axis of the image pickup unit of the microscope unit 5303. By the configuration, if the microscope unit 5303 is rotated around the first axis $O_1$, then the field of view can be changed so as to rotate the picked up image.

The first link 5313*a* fixedly supports, at a distal end thereof, the first joint portion 5311*a*. Specifically, the first link 5313*a* is a bar-like member having a substantially L shape and is connected to the first joint portion 5311*a* such that one side at the distal end side thereof extends in a direction orthogonal to the first axis $O_1$ and an end portion of the one side abuts with an upper end portion of an outer periphery of the first joint portion 5311*a*. The second joint portion 5311*b* is connected to an end portion of the other side on the proximal end side of the substantially L shape of the first link 5313*a*.

The second joint portion 5311*b* has a substantially columnar shape and supports, at a distal end thereof, a proximal end of the first link 5313*a* for rotation around an axis of rotation (second axis $O_2$) orthogonal to the first axis $O_1$. The second link 5313*b* is fixedly connected at a distal end thereof to a proximal end of the second joint portion 5311*b*.

The second link 5313*b* is a bar-like member having a substantially L shape, and one side of a distal end side of the second link 5313*b* extends in a direction orthogonal to the second axis $O_2$ and an end portion of the one side is fixedly connected to a proximal end of the second joint portion 5311*b*. The third joint portion 5311*c* is connected to the other side at the proximal end side of the substantially L shape of the second link 5313*b*.

The third joint portion 5311*c* has a substantially columnar shape and supports, at a distal end thereof, a proximal end of the second link 5313*b* for rotation around an axis of rotation (third axis $O_3$) orthogonal to the first axis $O_1$ and the second axis $O_2$. The third link 5313*c* is fixedly connected at a distal end thereof to a proximal end of the third joint portion 5311*c*. By rotating the components at the distal end side including the microscope unit 5303 around the second axis $O_2$ and the third axis $O_3$, the microscope unit 5303 can be moved such that the position of the microscope unit 5303 is changed within a horizontal plane. In other words, by controlling the rotation around the second axis $O_2$ and the third axis $O_3$, the field of view of the picked up image can be moved within a plane.

The third link 5313*c* is configured such that the distal end side thereof has a substantially columnar shape, and a proximal end of the third joint portion 5311*c* is fixedly connected to the distal end of the columnar shape such that both of them have a substantially same center axis. The proximal end side of the third link 5313*c* has a prismatic shape, and the fourth joint portion 5311*d* is connected to an end portion of the third link 5313*c*.

The fourth joint portion 5311*d* has a substantially columnar shape and supports, at a distal end thereof, a proximal end of the third link 5313*c* for rotation around an axis of rotation (fourth axis $O_4$) orthogonal to the third axis $O_3$. The fourth link 5313*d* is fixedly connected at a distal end thereof to a proximal end of the fourth joint portion 5311*d*.

The fourth link 5313*d* is a bar-like member extending substantially linearly and is fixedly connected to the fourth joint portion 5311*d* such that it extends orthogonally to the fourth axis $O_4$ and abuts at an end portion of the distal end thereof with a side face of the substantially columnar shape of the fourth joint portion 5311*d*. The fifth joint portion 5311*e* is connected to a proximal end of the fourth link 5313*d*.

The fifth joint portion 5311*e* has a substantially columnar shape and supports, at a distal end side thereof, a proximal end of the fourth link 5313*d* for rotation around an axis of rotation (fifth axis $O_5$) parallel to the fourth axis $O_4$. The fifth link 5313*e* is fixedly connected at a distal end thereof to a proximal end of the fifth joint portion 5311*e*. The fourth axis $O_4$ and the fifth axis $O_5$ are axes of rotation around which the microscope unit 5303 can be moved in the upward and downward direction. By rotating the components at the distal end side including the microscope unit 5303 around the fourth axis $O_4$ and the fifth axis $O_5$, the height of the microscope unit 5303, namely, the distance between the microscope unit 5303 and an observation target, can be adjusted.

The fifth link 5313e includes a combination of a first member having a substantially L shape one side of which extends in the vertical direction and the other side of which extends in the horizontal direction, and a bar-like second member extending vertically downwardly from the portion of the first member which extends in the horizontal direction. The fifth joint portion 5311e is fixedly connected at a proximal end thereof to a neighboring upper end of a part extending the first member of the fifth link 5313e in the vertical direction. The sixth joint portion 5311f is connected to proximal end (lower end) of the second member of the fifth link 5313e.

The sixth joint portion 5311f has a substantially columnar shape and supports, at a distal end side thereof, a proximal end of the fifth link 5313e for rotation around an axis of rotation (sixth axis $O_6$) parallel to the vertical direction. The sixth link 5313f is fixedly connected at a distal end thereof to a proximal end of the sixth joint portion 5311f.

The sixth link 5313f is a bar-like member extending in the vertical direction and is fixedly connected at a proximal end thereof to an upper face of the base unit 5315.

The first joint portion 5311a to sixth joint portion 5311f have movable ranges suitably set such that the microscope unit 5303 can make a desired movement. Consequently, in the arm unit 5309 having the configuration described above, a movement of totaling six degrees of freedom including three degrees of freedom for translation and three degrees of freedom for rotation can be implemented with regard to a movement of the microscope unit 5303. By configuring the arm unit 5309 such that six degrees of freedom are implemented for movements of the microscope unit 5303 in this manner, the position and the posture of the microscope unit 5303 can be controlled freely within the movable range of the arm unit 5309. Accordingly, it is possible to observe a surgical region from every angle, and surgery can be executed more smoothly.

It is to be noted that the configuration of the arm unit 5309 as depicted is an example at all, and the number and shape (length) of the links including the arm unit 5309 and the number, location, direction of the axis of rotation and so forth of the joint portions may be designed suitably such that desired degrees of freedom can be implemented. For example, in order to freely move the microscope unit 5303, preferably the arm unit 5309 is configured so as to have six degrees of freedom as described above. However, the arm unit 5309 may also be configured so as to have much greater degree of freedom (namely, redundant degree of freedom). Where a redundant degree of freedom exists, it is possible to change the posture of the arm unit 5309 in a state in which the position and the posture of the microscope unit 5303 are fixed. Accordingly, control can be implemented which is higher in convenience to the surgeon such as to control the posture of the arm unit 5309 such that, for example, the arm unit 5309 does not interfere with the field of view of the surgeon who watches the display apparatus 5319.

Here, an actuator in which a driving mechanism such as a motor, an encoder which detects an angle of rotation at each joint portion and so forth are incorporated may be provided for each of the first joint portion 5311a to sixth joint portion 5311f. By suitably controlling driving of the actuators provided in the first joint portion 5311a to sixth joint portion 5311f by the control apparatus 5317, the posture of the arm unit 5309, namely, the position and the posture of the microscope unit 5303, can be controlled. Specifically, the control apparatus 5317 can comprehend the posture of the arm unit 5309 at present and the position and the posture of the microscope unit 5303 at present on the basis of information regarding the angle of rotation of the joint portions detected by the encoders. The control apparatus 5317 uses the comprehended information to calculate a control value (for example, an angle of rotation or torque to be generated) for each joint portion with which a movement of the microscope unit 5303 in accordance with an operation input from the user is implemented. Accordingly, the control apparatus 5317 drives driving mechanism of each joint portion in accordance with the control value. It is to be noted that, in this case, the control method of the arm unit 5309 by the control apparatus 5317 is not limited, and various known control methods such as force control or position control may be applied.

For example, when the surgeon performs operation inputting suitably through an inputting apparatus not depicted, driving of the arm unit 5309 may be controlled suitably in response to the operation input by the control apparatus 5317 to control the position and the posture of the microscope unit 5303. By this control, it is possible to support, after the microscope unit 5303 is moved from an arbitrary position to a different arbitrary position, the microscope unit 5303 fixedly at the position after the movement. It is to be noted that, as the inputting apparatus, preferably an inputting apparatus is applied which can be operated by the surgeon even if the surgeon has a surgical tool in its hand such as, for example, a foot switch taking the convenience to the surgeon into consideration. Further, operation inputting may be performed in a contactless fashion on the basis of gesture detection or line-of-sight detection in which a wearable device or a camera which is provided in the operating room is used. This makes it possible even for a user who belongs to a clean area to operate an apparatus belonging to an unclean area with a high degree of freedom. In addition, the arm unit 5309 may be operated in a master-slave fashion. In this case, the arm unit 5309 may be remotely controlled by the user through an inputting apparatus which is placed at a place remote from the operating room.

Further, where force control is applied, the control apparatus 5317 may perform power-assisted control to drive the actuators of the first joint portion 5311a to sixth joint portion 5311f such that the arm unit 5309 may receive external force by the user and move smoothly following the external force. This makes it possible to move, when the user holds and directly moves the position of the microscope unit 5303, the microscope unit 5303 with comparatively weak force. Accordingly, it becomes possible for the user to move the microscope unit 5303 more intuitively by a simpler and easier operation, and the convenience to the user can be improved.

Further, driving of the arm unit 5309 may be controlled such that the arm unit 5309 performs a pivot movement. The pivot movement here is a motion for moving the microscope unit 5303 such that the direction of the optical axis of the microscope unit 5303 is kept toward a predetermined point (hereinafter referred to as pivot point) in a space. Since the pivot movement makes it possible to observe the same observation position from various directions, more detailed observation of an affected area becomes possible. It is to be noted that, where the microscope unit 5303 is configured such that the focal distance thereof is fixed, preferably the pivot movement is performed in a state in which the distance between the microscope unit 5303 and the pivot point is fixed. In this case, the distance between the microscope unit 5303 and the pivot point may be adjusted to a fixed focal distance of the microscope unit 5303 in advance. By the configuration just described, the microscope unit 5303 comes to move on a hemispherical plane (schematically depicted in FIG. 36) having a diameter corresponding to the focal distance centered at the pivot point, and even if the observation direction is changed, a clear picked up image can be obtained. On the other hand, where the microscope unit 5303 is configured such that the focal distance thereof is adjustable, the pivot movement may be performed in a state in which the distance between the microscope unit 5303 and the pivot point is variable. In this case, for example, the control apparatus 5317 may calculate the distance between the microscope unit 5303 and the pivot point on the basis of information regarding the angles of rotation of the joint portions detected by the encoders and automatically adjust the focal distance of the microscope unit 5303 on the basis of a result of the calculation. Alternatively, where the microscope unit 5303 includes an AF function, adjustment of the focal distance may be performed automatically by the AF function every time the changing in distance caused by the pivot movement between the microscope unit 5303 and the pivot point.

Further, each of the first joint portion 5311a to sixth joint portion 5311f may be provided with a brake for constraining the rotation of the first joint portion 5311a to sixth joint portion 5311f. Operation of the brake may be controlled by the control apparatus 5317. For example, if it is intended to fix the position and the posture of the microscope unit 5303, then the control apparatus 5317 renders the brakes of the joint portions operative. Consequently, even if the actuators are not driven, the posture of the arm unit 5309, namely, the position and posture of the microscope unit 5303, can be fixed, and therefore, the power consumption can be reduced. When it is intended to move the position and the posture of the microscope unit 5303, the control apparatus 5317 may release the brakes of the joint portions and drive the actuators in accordance with a predetermined control method.

Such operation of the brakes may be performed in response to an operation input by the user through the operation unit 5307 described hereinabove. When the user intends to move the position and the posture of the microscope unit 5303, the user would operate the operation unit 5307 to release the brakes of the joint portions. Consequently, the operation mode of the arm unit 5309 changes to a mode in which rotation of the joint portions can be performed freely (all-free mode). On the other hand, if the user intends to fix the position and the posture of the microscope unit 5303, then the user would operate the operation unit 5307 to render the brakes of the joint portions operative. Consequently, the operation mode of the arm unit 5309 changes to a mode in which rotation of the joint portions is constrained (fixed mode).

The control apparatus 5317 integrally controls operation of the microscopic surgery system 5300 by controlling operation of the microscope apparatus 5301 and the display apparatus 5319. For example, the control apparatus 5317 renders the actuators of the first joint portion 5311a to sixth joint portion 5311f operative in accordance with a predetermined control method to control driving of the arm unit 5309. Further, for example, the control apparatus 5317 controls operation of the brakes of the first joint portion 5311a to sixth joint portion 5311f to change the operation mode of the arm unit 5309. Further, for example, the control apparatus 5317 performs various signal processes for an image signal acquired by the image pickup unit of the microscope unit 5303 of the microscope apparatus 5301 to generate image data for display and controls the display apparatus 5319 to display the generated image data. As the signal processes, various known signal processes such as, for example, a development process (demosaic process), an image quality improving process (a bandwidth enhancement process, a super-resolution process, a noise reduction (NR) process and/or an image stabilization process) and/or an enlargement process (namely, an electronic zooming process) may be performed.

It is to be noted that communication between the control apparatus 5317 and the microscope unit 5303 and communication between the control apparatus 5317 and the first joint portion 5311a to sixth joint portion 5311f may be wired communication or wireless communication. Where wired communication is applied, communication by an electric signal may be performed or optical communication may be performed. In this case, a cable for transmission used for wired communication may be configured as an electric signal cable, an optical fiber or a composite cable of them in response to an applied communication method. On the other hand, where wireless communication is applied, since there is no necessity to lay a transmission cable in the operating room, such a situation that movement of medical staff in the operating room is disturbed by a transmission cable can be eliminated.

The control apparatus 5317 may be a processor such as a central processing unit (CPU) or a graphics processing unit (GPU), or a microcomputer or a control board in which a processor and a storage element such as a memory are incorporated. The various functions described hereinabove can be implemented by the processor of the control apparatus 5317 operating in accordance with a predetermined program. It is to be noted that, in the example depicted, the control apparatus 5317 is provided as an apparatus separate from the microscope apparatus 5301. However, the control apparatus 5317 may be installed in the inside of the base unit 5315 of the microscope apparatus 5301 and configured integrally with the microscope apparatus 5301. The control apparatus 5317 may also include a plurality of apparatus. For example, microcomputers, control boards or the like may be disposed in the microscope unit 5303 and the first joint portion 5311a to sixth joint portion 5311f of the arm unit 5309 and connected for communication with each other to implement functions similar to those of the control apparatus 5317.

The display apparatus 5319 is provided in the operating room and displays an image corresponding to image data generated by the control apparatus 5317 under the control of the control apparatus 5317. In other words, an image of a surgical region picked up by the microscope unit 5303 is displayed on the display apparatus 5319. The display apparatus 5319 may display, in place of or in addition to an image of a surgical region, various kinds of information relating to the surgery such as physical information of a patient or information regarding a surgical procedure of the surgery. In this case, the display of the display apparatus 5319 may be switched suitably in response to an operation by the user. Alternatively, a plurality of such display apparatus 5319 may also be provided such that an image of a surgical region or various kinds of information relating to the surgery may individually be displayed on the plurality of display apparatus 5319. It is to be noted that, as the display apparatus 5319, various known display apparatus such as a liquid crystal display apparatus or an electro luminescence (EL) display apparatus may be applied.

Figure 37:
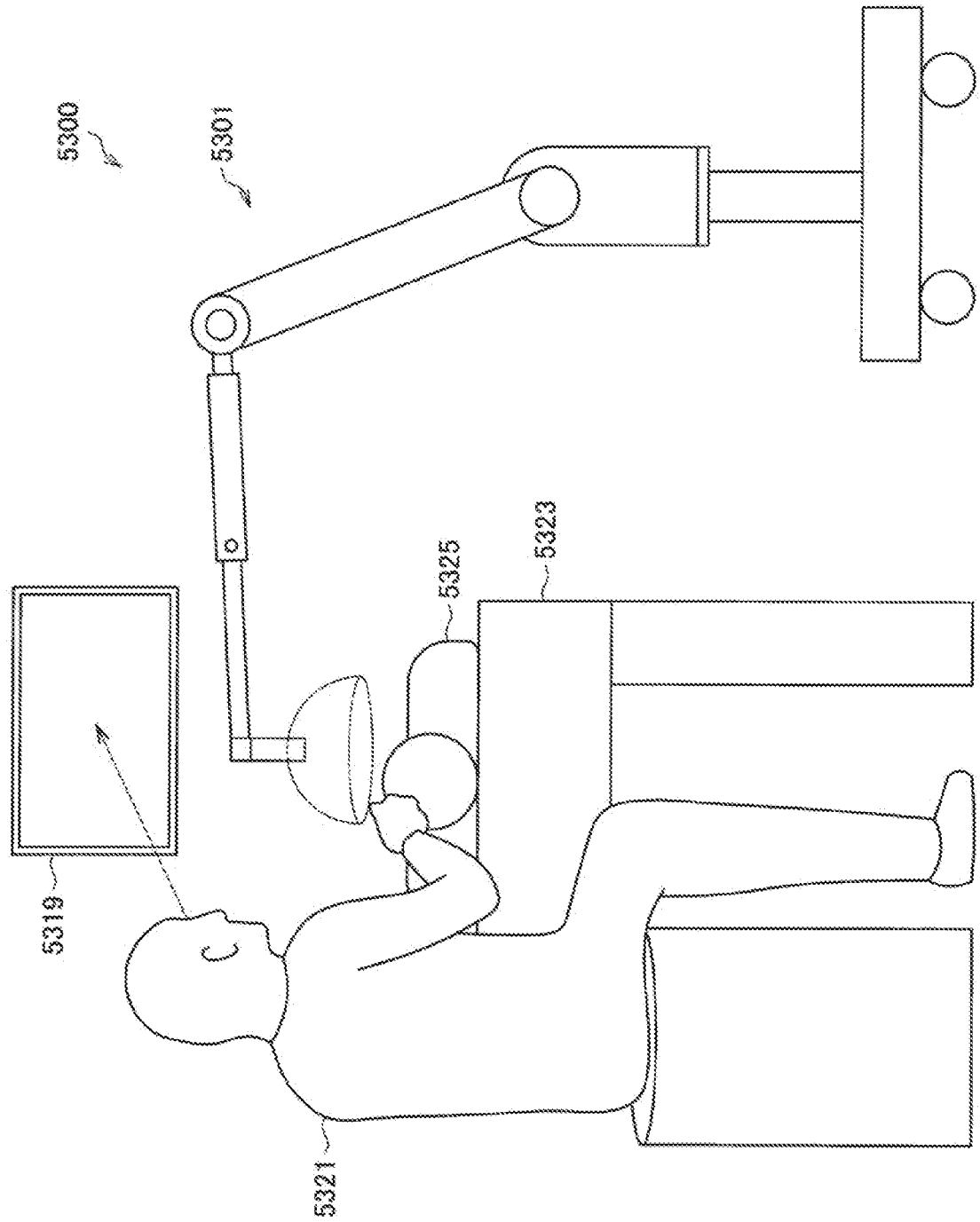
FIG. 37 is a view illustrating a state of surgery in which the microscopic surgery system depicted in FIG. 36 is used.

FIG. 37 is a view illustrating a state of surgery in which the microscopic surgery system 5300 depicted in FIG. 36 is used. FIG. 37 schematically illustrates a state in which a surgeon 5321 uses the microscopic surgery system 5300 to perform surgery for a patient 5325 on a patient bed 5323. It is to be noted that, in FIG. 37, for simplified illustration, the control apparatus 5317 from among the components of the microscopic surgery system 5300 is omitted and the microscope apparatus 5301 is depicted in a simplified from.

As depicted in FIG. 37, upon surgery, using the microscopic surgery system 5300, an image of a surgical region picked up by the microscope apparatus 5301 is displayed in an enlarged scale on the display apparatus 5319 installed on a wall face of the operating room. The display apparatus 5319 is installed at a position opposing to the surgeon 5321, and the surgeon 5321 would perform various treatments for the surgical region such as, for example, resection of the affected area while observing a state of the surgical region from a video displayed on the display apparatus 5319.

An example of the microscopic surgery system 5300 to which the technology according to an embodiment of the present disclosure can be applied has been described. It is to be noted here that, while the microscopic surgery system 5300 is described as an example, the system to which the technology according to an embodiment of the present disclosure can be applied is not limited to this example. For example, the microscope apparatus 5301 may also function as a supporting arm apparatus which supports, at a distal end thereof, a different observation apparatus or some other surgical tool in place of the microscope unit 5303. As the other observation apparatus, for example, an endoscope may be applied. Further, as the different surgical tool, forceps, tweezers, a pneumoperitoneum tube for pneumoperitoneum or an energy device for performing incision of a tissue or sealing of a blood vessel by cautery and so forth can be applied. By supporting any of such an observation apparatus and surgical tools as just described by the supporting apparatus, the position of them can be fixed with a high degree of stability in comparison with that in an alternative case in which they are supported by hands of medical staff. Accordingly, the burden on the medical staff can be reduced. The technology according to an embodiment of the present disclosure may be applied to a supporting arm apparatus which supports such a component as described above other than the microscopic unit.

The technology according to the present disclosure can be preferably applied to the cylindrical portion 5305 exemplified in FIG. 36 in the above-described configuration. Specifically, the solid-state image sensor 200 exemplified in FIG. 2 is used in the image pickup unit in the cylindrical portion 5305. Since the addition unit of the pixel addition can be voluntarily changed by applying the solid-state image sensor 200, convenience of the microscopic surgery system 5300 can be improved.

Fourth Application Example

The technology according to the present disclosure can be applied to various products. For example, the technology according to an embodiment of the present disclosure may be applied to a patient in-vivo information acquisition system using a capsule type endoscope.

Figure 38:
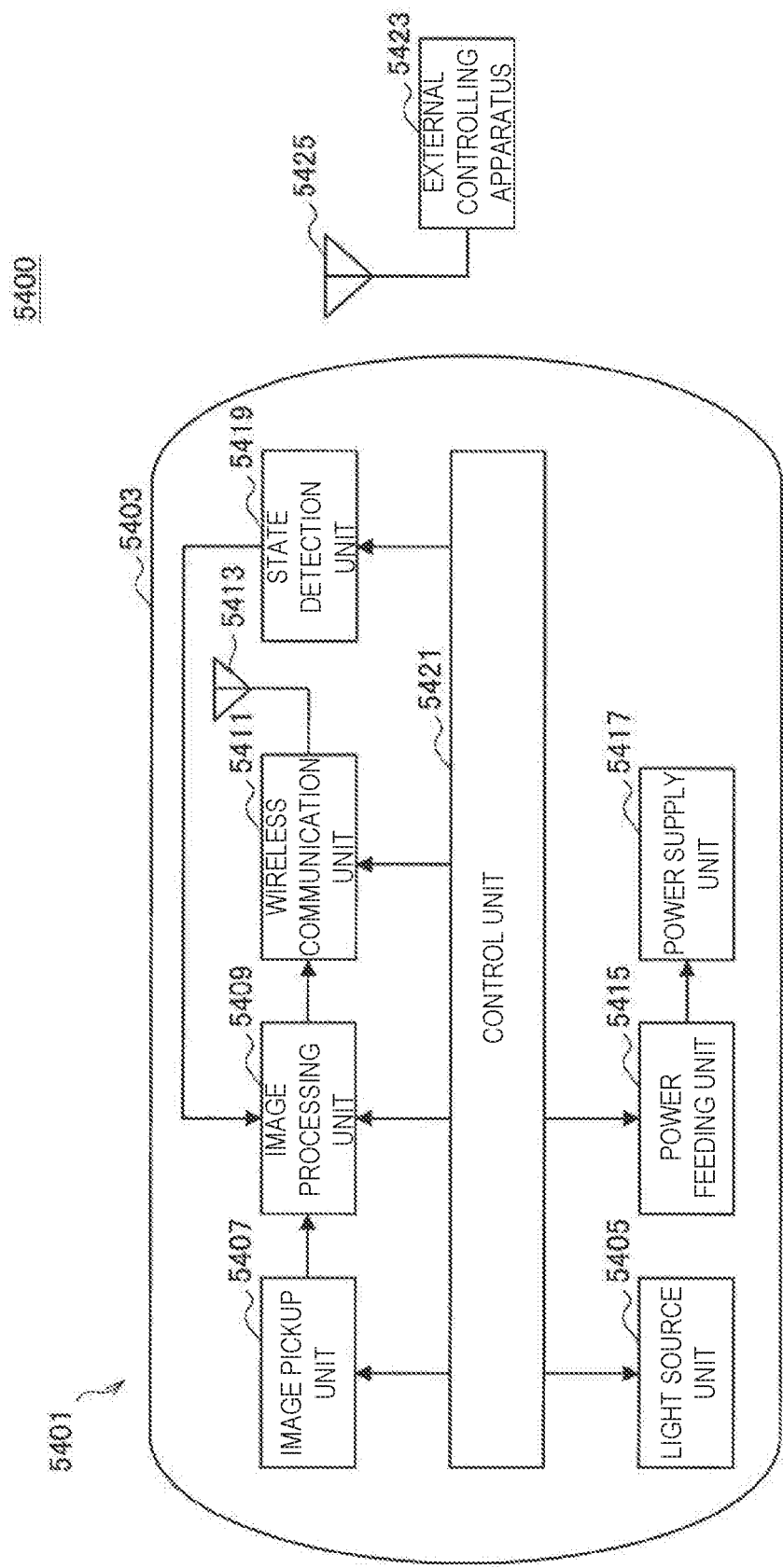
FIG. 38 is a block diagram depicting an example of a schematic configuration of an in-vivo information acquisition system.

FIG. 38 is a view depicting an example of a schematic configuration of an in-vivo information acquisition system 5400 to which the technology according to an embodiment of the present disclosure can be applied. Referring to FIG. 38, the in-vivo information acquisition system 5400 includes a capsule type endoscope 5401, and an external controlling apparatus 5423 which integrally controls operation of the in-vivo information acquisition system 5400. Upon inspection, the capsule type endoscope 5401 is swallowed by a patient. The capsule type endoscope 5401 has an image pickup function and a wireless communication function. For a period of time before the capsule type endoscope 5401 is discharged naturally from the patient, while it moves in the inside of an organ such as the stomach or the intestines by peristaltic motion, it successively picks up an image in the inside of each organ (hereinafter referred to as in-vivo image) at predetermined intervals and successively transmits information of the in-vivo images in wireless fashion to the external controlling apparatus 5423 located outside the body. The external controlling apparatus 5423 generates image data for displaying the in-vivo images on a display apparatus (not depicted) on the basis of the information of the received in-vivo images. In this manner, in the in-vivo information acquisition system 5400, a picked up image illustrating a state of the inside of the body of the patient can be obtained at any time after the capsule type endoscope 5401 is swallowed until it is discharged.

A configuration and functions of the capsule type endoscope 5401 and the external controlling apparatus 5423 are described in more detail. As depicted, the capsule type endoscope 5401 has functions of a light source unit 5405, an image pickup unit 5407, an image processing unit 5409, a wireless communication unit 5411, a power feeding unit 5415, a power supply unit 5417, a state detection unit 5419 and a control unit 5421 incorporated in a housing 5403 of the capsule type.

The light source unit 5405 includes a light source such as, for example, a light emitting diode (LED) and irradiates light upon an image pickup field of view of the image pickup unit 5407.

The image pickup unit 5407 includes an image pickup element and an optical system formed from a plurality of lenses provided at a preceding stage to the image pickup element. Reflected light (hereinafter referred to as observation light) of light irradiated upon a body tissue which is an observation target is condensed by the optical system and enters the image pickup element. The image pickup element receives and photoelectrically converts the observation light to generate an electric signal corresponding to the observation light, namely, an image signal corresponding to an observation image. The image signal generated by the image pickup unit 5407 is provided to the image processing unit 5409. It is to be noted that, as the image pickup element of the image pickup unit 5407, various known image pickup elements such as a complementary metal oxide semiconductor (CMOS) image sensor or a charge coupled device (CCD) image sensor may be used.

The image processing unit 5409 includes a processor such as a central processing unit (CPU) or a graphics processing unit (GPU) and performs various signal processes for an image signal generated by the image pickup unit 5407. The signal processes may be minimal processes for transmitting an image signal to the external controlling apparatus 5423 (for example, compression of image data, conversion of the frame rate, conversion of the data rate, and/or conversion of the format). Since the image processing unit 5409 is configured so as to perform only the minimal processes, the image processing unit 5409 can be implemented in a smaller size with lower power consumption. Therefore, the image processing unit 5409 is suitable for the capsule type endoscope 5401. However, if the space in the housing 5403 or the power consumption affords, then the image processing unit 5409 may perform a further signal process (for example, a noise removal process or some other image quality improving process). The image processing unit 5409 provides an image signal, for which the signal processes have been performed, as RAW data to the wireless communication unit 5411. It is to be noted that, when information regarding a state (motion, posture or the like) of the capsule type endoscope 5401 is acquired by the state detection unit 5419, the image processing unit 5409 may provide an image signal in a tied manner with the information to the wireless communication unit 5411. This makes it possible to associate the position inside the body at which an image is picked up, an image pickup direction of the image or the like with the picked up image.

The wireless communication unit 5411 includes a communication apparatus which can transmit and receive various kinds of information to and from the external controlling apparatus 5423. The communication apparatus includes an antenna 5413, a processing circuit which performs a modulation process and so forth for transmission and reception of a signal, and so forth. The wireless communication unit 5411 performs a predetermined process such as a modulation process for an image signal for which the signal processes have been performed by the image processing unit 5409, and transmits the resulting image signal to the external controlling apparatus 5423 through the antenna 5413. Further, the wireless communication unit 5411 receives a control signal relating to driving control of the capsule type endoscope 5401 from the external controlling apparatus 5423 through the antenna 5413. The wireless communication unit 5411 provides the received control signal to the control unit 5421.

The power feeding unit 5415 includes an antenna coil for power reception, a power regeneration circuit for regenerating electric power from electric current generated in the antenna coil, a voltage booster circuit and so forth. The power feeding unit 5415 generates electric power using the principle of non-contact charging. Specifically, if a magnetic field (electromagnetic wave) of a predetermined frequency is provided from the outside to the antenna coil of the power feeding unit 5415, then induced electromotive force is generated in the antenna coil. The electromagnetic wave may be a carrier transmitted from the external controlling apparatus 5423 through an antenna 5425. Electric power is regenerated from the induced electromotive force by the power regeneration circuit, and the potential of the electric power is suitably adjusted by the voltage booster circuit to generate electric power for charging. The electric power generated by the power feeding unit 5415 is stored into the power supply unit 5417.

The power supply unit 5417 includes a secondary battery and stores electric power generated by the power feeding unit 5415. In FIG. 38, in order to avoid complicated illustration, an arrow mark indicative of a supplying destination of electric power from the power supply unit 5417 and so forth are not depicted. However, electric power stored in the power supply unit 5417 is supplied to the light source unit 5405, the image pickup unit 5407, the image processing unit 5409, the wireless communication unit 5411, the state detection unit 5419 and the control unit 5421 and can be used for driving of them.

The state detection unit 5419 includes a sensor for detecting a state of the capsule type endoscope 5401 such as an acceleration sensor and/or a gyro sensor. The state detection unit 5419 can acquire information relating to a state of the capsule type endoscope 5401 from a result of detection by the sensor. The state detection unit 5419 provides the acquired information regarding a state of the capsule type endoscope 5401 to the image processing unit 5409. The image processing unit 5409 can tie the information regarding a state of the capsule type endoscope 5401 with an image signal as described hereinabove.

The control unit 5421 includes a processor such as a CPU and operates in accordance with a predetermined program to integrally control operation of the capsule type endoscope 5401. The control unit 5421 suitably controls driving of the light source unit 5405, the image pickup unit 5407, the image processing unit 5409, the wireless communication unit 5411, the power feeding unit 5415, the power supply unit 5417 and the state detection unit 5419 in accordance with a control signal transmitted thereto from the external controlling apparatus 5423 to implement such functions of the components as described above.

The external controlling apparatus 5423 may be a processor such as a CPU or a GPU, a microcomputer or a control board in which a processor and a storage element such as a memory are mixedly incorporated. The external controlling apparatus 5423 is configured such that it has an antenna 5425 and can transmit and receive various kinds of information to and from the capsule type endoscope 5401 through the antenna 5425. Specifically, the external controlling apparatus 5423 transmits a control signal to the control unit 5421 of the capsule type endoscope 5401 to control operation of the capsule type endoscope 5401. For example, an irradiation condition of light upon an observation target of the light source unit 5405 can be changed in accordance with a control signal from the external controlling apparatus 5423. Further, an image pickup condition (for example, a frame rate, an exposure value or the like of the image pickup unit 5407) can be changed in accordance with a control signal from the external controlling apparatus 5423. Further, the substance of processing by the image processing unit 5409 or a condition for transmitting an image signal from the wireless communication unit 5411 (for example, a transmission interval, a transmission image number or the like) may be changed in accordance with a control signal from the external controlling apparatus 5423.

Further, the external controlling apparatus 5423 performs various image processes for an image signal transmitted from the capsule type endoscope 5401 to generate image data for displaying a picked up in-vivo image on the display apparatus. As the image processes, various known signal processes may be performed such as, for example, a development process (demosaic process), an image quality improving process (bandwidth enhancement process, super-resolution process, noise reduction (NR) process, and/or image stabilization process) and/or an enlargement process (electronic zoom process) or the like. The external controlling apparatus 5423 controls driving of the display apparatus (not depicted) to cause the display apparatus to display a picked up in-vivo image on the basis of generated image data. Alternatively, the external controlling apparatus 5423 may control a recording apparatus (not depicted) to record generated image data or control a printing apparatus (not depicted) to output generated image data by printing.

Fifth Application Example

The technology according to the present disclosure can be applied to various products. For example, the technology according to the present disclosure is implemented as apparatuses mounted on any type of mobile bodies such as automobiles, electric vehicles, hybrid electric vehicles, motorcycles, bicycles, personal mobilities, airplanes, drones, ships, robots, construction machines, and agricultural machines (tractors).

Figure 39:
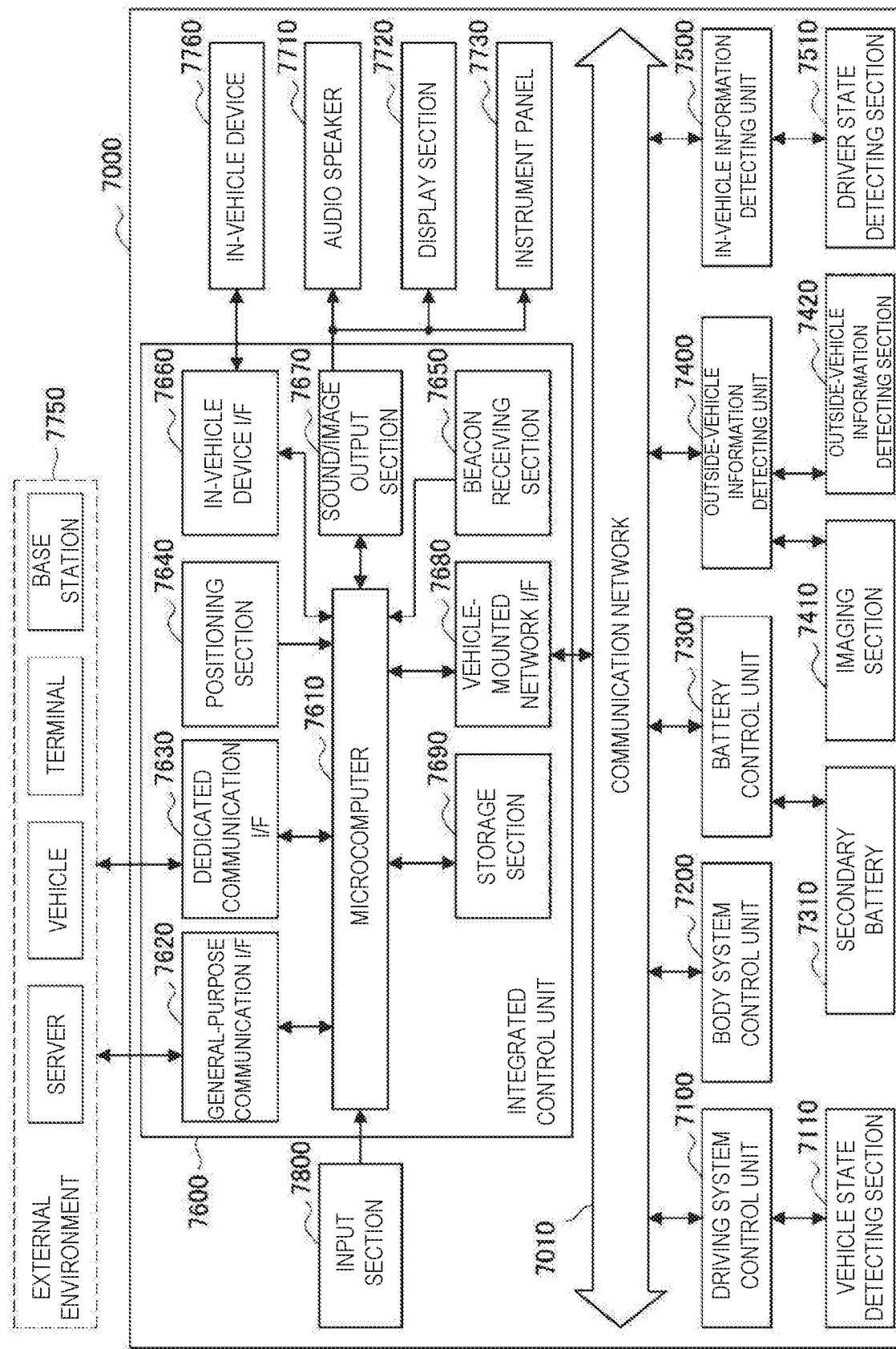
FIG. 39 is a block diagram depicting an example of schematic configuration of a vehicle control system.

FIG. 39 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 39, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 39 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 40:
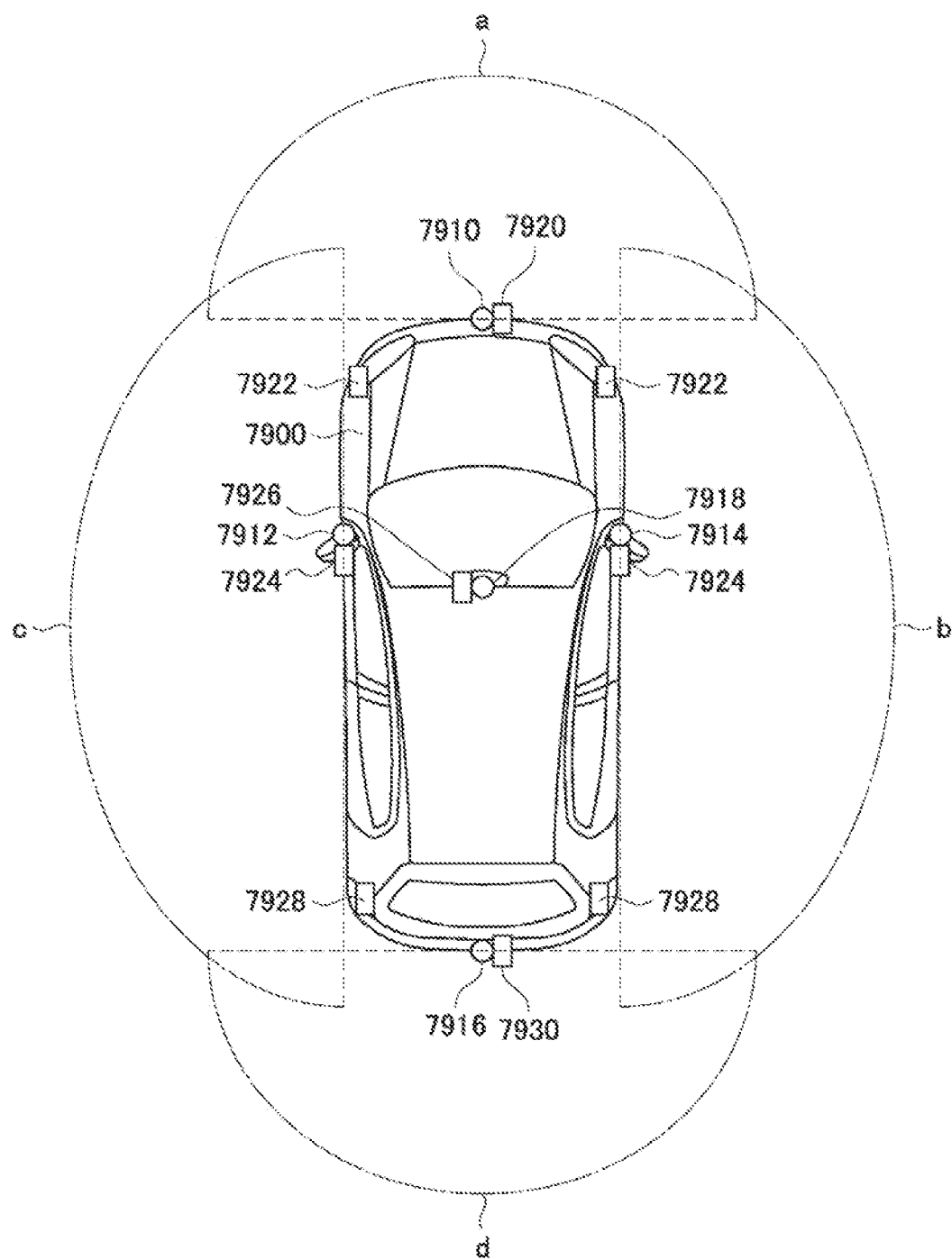
FIG. 40 is a diagram of assistance in explaining an example of installation positions of an outside-vehicle information detecting section and an imaging section.

FIG. 40 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 40 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 39, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 39, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 39 may be integrated into one control unit.

Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the above-described vehicle control system 7000, the solid-state image sensor 200 according to the embodiment described with reference to FIG. 2 can be applied to the integrated control unit 7600 of the application example illustrated in FIG. 39. For example, the solid-state image sensor 200 is equivalent to the imaging section 7410 of the integrated control unit 7600. For example, under the control of the integrated control unit 7600, the solid-state image sensor 200 can voluntarily change an addition unit of the pixel addition.

The example of the in-vivo information acquisition system 5400 to which the technology of the present disclosure can be applied has been described above. The technology according to the present disclosure can be appropriately applied to the image pickup unit 5407 exemplified in FIG. 40 in the above-described configuration. Specifically, the solid-state image sensor 200 exemplified in FIG. 2 is applied to the image pickup unit 5407. Since the addition unit of the pixel addition can be voluntarily changed by applying the solid-state image sensor 200, convenience of the in-vivo information acquisition system 5400 can be improved.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

Note that the effects described herein are not necessarily limitative and may refer to any one of the effects described in this specification.

Additionally, the present technology may also be configured as below.

(1)

A solid-state image sensor including:

an array unit in which a predetermined number of charge storage units that store charges generated through photoelectric conversion are arrayed in a 2-dimensional lattice form;

a connection line wired for each set of the charge storage units arrayed in a predetermined direction;

a connection path opening and closing unit configured to open and close a path between each of the charge storage units and the connection line corresponding to the charge storage unit;

an inter-line path opening and closing unit configured to open and close a path between the connection lines; and a scanning circuit configured to control the connection path opening and closing unit and the inter-line path opening and closing unit so that amounts of the charges of the charge storage units of an addition target are caused to be added.

(2)

The solid-state image sensor according to (1), in which the charge storage unit is a floating diffusion layer.

(3)

The solid-state image sensor according to (2), in which the connection path opening and closing unit includes, for each charge storage unit, a reset transistor configured to open and close the charge storage unit and the connection line corresponding to the charge storage unit.

(4)

The solid-state image sensor according to (2), further including:

a reset transistor configured to initialize the charge storage unit for each charge storage unit.

(5)

The solid-state image sensor according to any one of (2) to (4), further including:

a power path opening and closing unit configured to open and close a path between a power supply and the connection line.

(6)

The solid-state image sensor according to any one of (2) to (5), in which, in the array unit, a plurality of pixels are arrayed in a 2-dimensional lattice form, and the plurality of adjacent pixels share the floating diffusion layer.

(7)

The solid-state image sensor according to (1), in which the charge storage unit is a photoelectric conversion element.

(8)

The solid-state image sensor according to any one of (1) to (7), further including:

a signal line wired for each set; and a selection unit configured to open and close a path between each of the charge storage units and the signal line corresponding to the charge storage unit.

(9)

The solid-state image sensor according to (8), further including:

a signal path opening and closing unit configured to open and close a path between the mutually adjacent signal lines and the connection line.

(10)

The solid-state image sensor according to (8) or (9), further including:

a signal processing unit configured to perform predetermined signal processing on an analog signal output from each of the signal lines.

(11)

The solid-state image sensor according to any one of (1) to (10), in which a predetermined number of the connection lines are wired for each set, the array unit is partitioned into a plurality of addition units, the predetermined number of addition units adjacent in the predetermined direction are connected to mutually different connection lines and the predetermined number of signal lines wired in the predetermined direction, and the scanning circuit causes the predetermined number of addition units adjacent in the predetermined direction to output pixel signals from mutually different signal lines.

(12)

The solid-state image sensor according to any one of (1) to (11), in which the array unit and the connection transistor are disposed in a predetermined semiconductor substrate, and the inter-line path opening and closing unit is disposed in a semiconductor substrate stacked on the predetermined semiconductor substrate.

(13)

An imaging device including:

an array unit in which a predetermined number of charge storage units that store charges generated through photoelectric conversion are arrayed in a 2-dimensional lattice form;

a connection line wired for each set of the charge storage units arrayed in a predetermined direction;

a connection path opening and closing unit configured to open and close a path between each of the charge storage units and the connection line corresponding to the charge storage unit;

an inter-line path opening and closing unit configured to open and close a path between the connection lines;

a scanning circuit configured to control the connection path opening and closing unit and the inter-line path opening and closing unit so that amounts of the charges of the charge storage units of an addition target are caused to be added; and a recording unit configured to record image data including pixel signals in accordance with the amounts of the charges.

(14)

A method of controlling a solid-state image sensor, including:

a connection procedure of opening and closing a path between a connection line wired for each set of charge storage units arrayed in a predetermined direction in an array unit in which a predetermined number of charge storage units that store charges generated through photoelectric conversion are arrayed in a 2-dimensional lattice form, and the charge storage unit; and an inter-line path opening and closing procedure of opening and closing a path between the connection lines.

REFERENCE SIGNS LIST 100 imaging device
110 imaging lens
120 recording unit
130 imaging control unit
200 solid-state image sensor
201 upper semiconductor substrate
202 lower semiconductor substrate
203 pixel unit
204 circuit block
210 row scanning circuit
220 pixel array unit
230 pixel circuit
231, 303, 304, 307, 308, 315, 316, 319, 320 photoelectric conversion element
232, 301, 302, 305, 306, 312, 313, 317, 318 transmission transistor
233, 309 reset transistor
234, 310 floating diffusion layer
235, 311 amplification transistor
236, 314 selection transistor
237 connection transistor
240, 350 pixel addition control unit
241, 242, 245, 246, 247, 351 to 360 switch
243, 244 MOS transistor
260 timing control unit
270 AD conversion unit
271 AD converter
280 column scanning circuit
290 image processing unit
300 pixel block
5009, 5123, 5407, 7410 image pickup unit
5305 cylindrical portion

The invention claimed is:

1. A solid-state image sensor, comprising:
an array unit including a plurality of sets of charge storage units, wherein
each set of the plurality of sets of charge storage units includes a specific number of a plurality of charge storage units in a 2-dimensional lattice arrangement,
each set of the plurality of sets of charge storage units is in a specific direction, and
each of the plurality of charge storage units is configured to store charges generated through photoelectric conversion;
a first connection line for a first set of the plurality of sets of charge storage units;
a second connection line for a second set of the plurality of sets of charge storage units;
a connection path opening and closing unit configured to open and close a first path between a respective charge storage unit of the plurality of charge storage units and one of the first connection line or the second connection line that corresponds to the respective charge storage unit;
an inter-line path opening and closing unit comprising a switch configured to open and close a second path between the first connection line and the second connection line; and
a scanning circuit configured to:
control the connection path opening and closing unit and the inter-line path opening and closing unit; and
cause addition of an amount of the charges of the specific number of the plurality of charge storage units of an addition target based on the control of the connection path opening and closing unit and the inter-line path opening and closing unit.

2. The solid-state image sensor according to claim 1, wherein
each of the plurality of charge storage units is a floating diffusion layer.

3. The solid-state image sensor according to claim 2,
wherein the connection path opening and closing unit includes, for each charge storage unit of the plurality of charge storage units, a reset transistor configured to open and close the respective charge storage unit of the plurality of charge storage units and one of the first connection line or the second connection line corresponding to the respective charge storage unit.

4. The solid-state image sensor according to claim 2, further comprising
a reset transistor configured to initialize the respective charge storage unit of the plurality of charge storage units.

5. The solid-state image sensor according to claim 2, further comprising
a power path opening and closing unit configured to open and close a third path between a power supply and one of the first connection line or the second connection line.

6. The solid-state image sensor according to claim 2, wherein
the array unit further comprises
a plurality of pixels in a 2-dimensional lattice form, and adjacent pixels of the plurality of pixels share the floating diffusion layer.

7. The solid-state image sensor according to claim 1, wherein
each of the plurality of charge storage units is a photoelectric conversion element.

8. The solid-state image sensor according to claim 1, further comprising:
a signal line for each set of the plurality of sets of charge storage units; and
a selection unit configured to open and close a fourth path between the respective charge storage unit of the plurality of charge storage units and the signal line corresponding to the respective charge storage unit.

9. The solid-state image sensor according to claim 8, further comprising
a signal path opening and closing unit configured to open and close a fifth path between a respective signal line of a plurality of signal lines and one of the first connection line or the second connection line, wherein
the respective signal line of the plurality of signal lines is adjacent to one of the first connection line or the second connection line.

10. The solid-state image sensor according to claim 8, further comprising
a signal processing unit configured to execute a specific signal process on an analog signal output from each signal line of a plurality of signal lines.

11. The solid-state image sensor according to claim 1, wherein
a specific number of connection lines are for each set of the plurality of sets of charge storage units,
the specific number of connection lines are in the specific direction,
the array unit comprises a plurality of addition units,
a specific number of addition units adjacent in the specific direction are connected to mutually different connection lines of the specific number of connection lines and a specific number of signal lines, and
the scanning circuit is further configured to control the specific number of addition units, adjacent in the specific direction, to output pixel signals from mutually different signal lines of the specific number of signal lines.

12. The solid-state image sensor according to claim 1, wherein
the array unit and the connection path opening and closing unit are in a first semiconductor substrate, and
the inter-line path opening and closing unit is in a second semiconductor substrate stacked on the first semiconductor substrate.

13. An imaging device, comprising:
an array unit including a plurality of sets of charge storage units, wherein
each set of the plurality of sets of charge storage units includes a specific number of a plurality of charge storage units in a 2-dimensional lattice arrangement,
each set of the plurality of sets of charge storage units is in a specific direction, and
each of the plurality of charge storage units is configured to store charges generated through photoelectric conversion;
a first connection line for a first set of the plurality of sets of charge storage units;
a second connection line for a second set of the plurality of sets of charge storage units;
a connection path opening and closing unit configured to open and close a first path between a respective charge storage unit of the plurality of charge storage units and one of the first connection line or the second connection line that corresponds to the respective charge storage unit;
an inter-line path opening and closing unit comprising a switch configured to open and close a second path between the first connection line and the second connection line;
a scanning circuit configured to:
control the connection path opening and closing unit and the inter-line path opening and closing unit; and
cause addition of an amount of the charges of the specific number of the plurality of charge storage units of an addition target based on the control of the connection path opening and closing unit and the inter-line path opening and closing unit; and
a recording unit configured to record image data, wherein the image data includes pixel signals based on the amount of the charges.

14. A method of controlling a solid-state image sensor, the method comprising:
opening and closing, by a connection path opening and closing unit, a first path between a respective charge storage unit and one of a first connection line or a second connection line that corresponds to the respective charge storage unit, wherein
the first connection line is for a first set of a plurality of sets of charge storage units in an array unit,
the second connection line is for a second set of the plurality of sets of charge storage units in the array unit,
each set of the plurality of sets of charge storage units includes a specific number of a plurality of charge storage units in a two-dimensional lattice arrangement,
each set of the plurality of sets of charge storage units is in a specific direction, and
each of the plurality of charge storage units is configured to store charges generated through photoelectric conversion; and
opening and closing, by an inter-line path opening and closing unit comprising a switch, a second path between the first connection line and the second connection line.

* * * * *